United States Patent
Twitchell, Jr.

(10) Patent No.: US 10,652,153 B2
(45) Date of Patent: May 12, 2020

(54) APPARATUS, SYSTEMS AND METHODS UTILIZING DISPERSIVE NETWORKING

(71) Applicant: DISPERSIVE NETWORKS, INC., Alpharetta, GA (US)

(72) Inventor: Robert W. Twitchell, Jr., Alpharetta, GA (US)

(73) Assignee: DISPERSIVE NETWORKS, INC., Alpharetta, GA (US)

( * ) Notice: Subject to any disclaimer, the term of this patent is extended or adjusted under 35 U.S.C. 154(b) by 130 days.

(21) Appl. No.: 15/838,027

(22) Filed: Dec. 11, 2017

(65) Prior Publication Data

US 2018/0139266 A1    May 17, 2018

Related U.S. Application Data

(63) Continuation of application No. 14/816,424, filed on Aug. 3, 2015, now Pat. No. 9,843,620, which is a (Continued)

(51) Int. Cl.
*H04L 12/803* (2013.01)
*H04L 12/853* (2013.01)
(Continued)

(52) U.S. Cl.
CPC ........ *H04L 47/125* (2013.01); *G06F 9/45558* (2013.01); *H04L 41/00* (2013.01);
(Continued)

(58) Field of Classification Search
CPC . G06F 2009/45562; G06F 2009/45595; G06F 9/45558; H04L 41/00; H04L 41/0896; H04L 43/028; H04L 45/586; H04L 47/125; H04L 47/15; H04L 47/2416; H04L 67/06; H04L 67/10; H04L 67/14; H04L 67/141; H04L 69/14; H04L 69/18; H04L 69/32; H04W 4/18; H04W 4/21
See application file for complete search history.

(56) References Cited

U.S. PATENT DOCUMENTS 5,274,762 A * 12/1993 Peterson ............... G06F 13/385
                                                          709/219
7,441,270 B1 * 10/2008 Edwards ............... H04L 63/029
                                                          709/206
(Continued)

*Primary Examiner* — Alina A Boutah
(74) *Attorney, Agent, or Firm* — Chad D Tillman; Jeremy C Doerre; Tillam Wright, PLLC

(57) ABSTRACT

An electronic device configured for electronic communications utilizing virtual dispersive networking includes: a network interface for communicating over a network; an application loaded onto the electronic device programmed to communicate over a network; and virtual dispersive networking software configured to create, for such application, a virtual machine comprising a virtual interface for the network interface of the electronic device; select a network protocol out of a plurality of available network protocols based on current communication requirements of the application; and cause network communications of the application to occur via the virtual network interface of the electronic device using the determined network protocol.

19 Claims, 38 Drawing Sheets

Related U.S. Application Data continuation of application No. 14/049,290, filed on Oct. 9, 2013, now Pat. No. 9,100,405, which is a continuation of application No. 13/007,595, filed on Jan. 14, 2011, now Pat. No. 8,560,634, which is a continuation-in-part of application No. 12/499,075, filed on Jul. 7, 2009, now Pat. No. 8,539,098, and a continuation-in-part of application No. 12/253,926, filed on Oct. 17, 2008, now Pat. No. 7,895,348.

(60) Provisional application No. 61/133,935, filed on Jul. 7, 2008, provisional application No. 60/999,603, filed on Oct. 17, 2007.

(51) Int. Cl.

| | | |
|---|---|---|
| *H04W 4/21* | (2018.01) | |
| *H04L 29/08* | (2006.01) | |
| *H04L 12/713* | (2013.01) | |
| *H04L 12/24* | (2006.01) | |
| *G06F 9/455* | (2018.01) | |
| *H04W 4/18* | (2009.01) | |
| *H04L 12/26* | (2006.01) | |
| *H04L 12/801* | (2013.01) | |
| *H04L 29/06* | (2006.01) | |

(52) U.S. Cl.
CPC ........ *H04L 41/0896* (2013.01); *H04L 43/028* (2013.01); *H04L 45/586* (2013.01); *H04L 47/15* (2013.01); *H04L 47/2416* (2013.01); *H04L 67/06* (2013.01); *H04L 67/10* (2013.01); *H04L 67/14* (2013.01); *H04L 67/141* (2013.01); *H04L 69/32* (2013.01); *H04W 4/18* (2013.01); *H04W 4/21* (2018.02); *G06F 2009/45562* (2013.01); *G06F 2009/45595* (2013.01); *H04L 69/14* (2013.01); *H04L 69/18* (2013.01)

(56) References Cited

U.S. PATENT DOCUMENTS

| | | | | |
|---|---|---|---|---|
| 2006/0184631 | A1* | 8/2006 | Izdepski | H04L 67/2823 709/206 |
| 2008/0189395 | A1* | 8/2008 | Stremel | G06Q 50/01 709/219 |
| 2008/0209011 | A1* | 8/2008 | Stremel | G06Q 20/20 709/219 |
| 2009/0325602 | A1* | 12/2009 | Higgins | H04W 4/023 455/456.2 |
| 2010/0211868 | A1* | 8/2010 | Karmarkar | H04M 1/72547 715/234 |
| 2010/0257239 | A1* | 10/2010 | Roberts | G06Q 10/10 709/204 |
| 2010/0274858 | A1* | 10/2010 | Lindberg | G06F 3/0481 709/206 |

* cited by examiner

No. of Hops | Packet

1

2

3

4

Layer 2

| Bytes | | Description |
|---|---|---|
| 6 | : | Destination MAC Address |
| 6 | : | Source MAC Address |

Layer 3

| Bytes | | Description |
|---|---|---|
| 1 | : | Version |
| 1 | : | Type of Service |
| 1 | : | Time to Live, Control Flag |
| 1 | : | Protocol Number |
| 4-16 | : | Destination IP Address |
| 4-16 | : | Source IP Address |

Layer 4

| Bytes | | Description |
|---|---|---|
| 2 | : | Source Port |
| 2 | : | Destination Port |
| 1 | : | TCP Flag |

Layer 5

| Bytes | | Description |
|---|---|---|
| 2 | : | DNI Flag |
| 4 | : | DNI SHA-1/MD5 Hash |

| Download Requests | Potential Downloads Completed by Client | Percent Reduction in Resources |
|---|---|---|
| 1 | 0 | 0% |
| 2 | 1 | 50% |
| 3 | 2 | 66.67% |
| 4 | 3 | 75% |
| 5 | 4 | 80% |

Table 2

*FIG. 14*

OS – Operating System
TVM – Thin Virtual Machine
VM – Virtual Machine
VDRC – Virtual Dispersive Routing Client
VDRS – Virtual Dispersive Routing Server VDR Client and Server Architectures Network Watermark
Path: C7 -> C5 -> C1 -> C3
C7 -> C5  Port 2330 (2.3ms)
C5 -> C1  Port 625 (2.9ms)
C1 -> C3   Port 7000 (2.1ms)
Server Log: 090409 21:25.4

VM – Virtual Machine
OS – Operating System
VDR – Virtual Dispersive Routing
HW - Hardware

| File Name | Creation Date | Size in Bytes | Description |
|---|---|---|---|
| readme.txt | 01/12/2011 – 12:00 PM | 2,577 | Instructions |
| ascify.txt | 01/12/2011 – 12:00 PM | 37,473 | Assembly Source |
| source.txt | 01/13/2011 – 7:18 PM | 6,204,428 | Compressed File in ASCII Format |

Table

*FIG. 23*

APPARATUS, SYSTEMS AND METHODS UTILIZING DISPERSIVE NETWORKING

CROSS-REFERENCE TO RELATED APPLICATIONS

The present application is a U.S. continuation of, and claims priority under 35 U.S.C. § 120 to, U.S. patent application Ser. No. 14/816,424, filed Aug. 3, 2015, which '424 application issued as U.S. Pat. No. 9,843,620 on Dec. 12, 2017, and which '424 application is continuation of, and claims priority under § 120 to, U.S. patent application Ser. No. 14/049,290, filed Oct. 9, 2013, which '290 application issued as U.S. Pat. No. 9,100,405 on Aug. 4, 2015, and which '290 application is a U.S. continuation patent application of, and claims priority under § 120 to, U.S. patent application Ser. No. 13/007,595 filed Jan. 14, 2011, which '595 application published as U.S. patent application publication no. 2011/0179136 and issued as U.S. Pat. No. 8,560,634 on Oct. 15, 2013, and which '595 application is a continuation-in-part patent application of, and claims priority under § 120 to, U.S. nonprovisional patent application Ser. No. 12/499,075, filed Jul. 7, 2009, which '075 application published as U.S. patent application publication no. 2010/0009758, which '075 application issued as U.S. Pat. No. 8,539,098, and which '075 application is:

(a) a continuation-in-part patent application of, and claims priority under § 120 to, U.S. patent application Ser. No. 12/253,926, filed Oct. 17, 2008, which '926 application published as U.S. patent application publication no. 2009/0106439, which '926 application issued as U.S. Pat. No. 7,895,348, and which '926 application is a nonprovisional patent application of, and claims priority under 35 U.S.C. § 119(e) to, each of U.S. provisional patent application Ser. No. 60/999,603, filed Oct. 17, 2007, and U.S. provisional patent application Ser. No. 61/133,935, filed Jul. 7, 2008; and (b) a U.S. nonprovisional patent application of, and claims priority under § 119(e) to, U.S. provisional patent application Ser. No. 61/133,935, filed Jul. 7, 2008.

The disclosure of the '595 application, which itself includes a disclosure of each of the '603 and '935 provisional applications, is set forth in Appendix A hereof. The disclosure of this Appendix, all of the priority applications, any patents issuing therefrom, and any publications thereof, including the patent application publications referenced above, are hereby incorporated herein by reference.

COPYRIGHT STATEMENT

All of the material in this patent document, including the computer program listing, is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

COMPUTER PROGRAM LISTING

Submitted concurrently herewith via the USPTO's electronic filing system, and incorporated herein by reference, are computer program files including instructions, routines, and contents of several computer programs. A table setting forth the name and size of each file included in the computer program listing is included in FIG. 23. A first of these files, "readme.txt", contains instructions for utilizing a second of the files "ascify.txt" to extract information from the remaining file. This remaining file is a compressed binary file that has been converted to ASCII format. This file can be converted back to binary format utilizing the assembly conversion program source code contained in "ascify.txt". The readme file includes instructions for compiling and running this conversion program, as well as instructions for converting the other text file to compressed binary files. The compressed binary files include source code written in C. The source code includes code for a proof of concept program for routing at a client computer, the target hardware for which includes a managed switch, two Cisco® routers, and three computers running Linux; and code for file transfer programs including software for servers and clients, including client software configured to be executed on a standard personal computer running Windows, client software configured to be executed on a standard personal computer running Mac OS X, and server software configured to be executed on a standard Linux server. The computer program files include the computer program files of the parent patent applications from which priority is claimed, and newer computer program files representing a current version of an embodiment of one or more aspects of the invention.

BACKGROUND OF THE INVENTION

The present invention generally relates to networking—including network routing and network communications. Conventional networks, such as the Internet, rely heavily on centralized routers to perform routing tasks in accomplishing network communications. It is believed that improvements in networking are needed, including improvements in areas such as networking efficiency, networking security, and robustness. One or more of these needs is addressed by one or more aspects of the present invention.

SUMMARY OF THE INVENTION

The present invention includes many aspects and features. Moreover, while many aspects and features relate to, and are described in, a particular context or another, such as, for example, the context of networking associated with the Internet, including network routing and network communications, the present invention is not limited to use only in any one particular context and is applicable in other contexts as well, as will become apparent from the following summaries and detailed descriptions of aspects, features, and one or more embodiments of the present invention. Indeed, each of the independent claims as filed herewith represents an aspect of the invention and each dependent claim represents a feature of such aspect. In addition, it should be noted that the present invention further encompasses the various possible combinations and subcombinations of such aspects and features. Thus, for example, any aspect may be combined with an aforementioned feature in accordance with the present invention without requiring any other aspect or feature.

Furthermore, the invention relates to such aspects and features as applied in various particular implementations described hereinbelow, and additional aspects and features disclosed in association therewith.

A first aspect of the present invention relates to a computer arranged in electronic communication with one or more computer networks, the computer running an operating system and running a plurality of applications, each of the applications programmed to communicate over the computer network. The computer is characterized in that, the computer performs a method comprising the steps of, for each application, creating, for such application, a virtual machine that is configured to send and receive communications over the computer network, determining, for such application, a network protocol out of a plurality of available network protocols, the determined network protocol representing an appropriate network protocol, out of the plurality of available network protocols, for current communication requirements of the application, and causing the application, when communicating over the network, to send and receive communications via the created virtual machine using the determined network protocol. Multiple virtual machine instances are created and simultaneously maintained by the computer, each virtual machine instance handling communications of one of the plurality of applications via a networking protocol that has been determined to be appropriate for the current communication requirements of the application.

In a feature of one or more aspects of the invention, the computer performs the method by executing a virtual dispersive routing program.

In a feature of one or more aspects of the invention, the computer is a personal computer.

In a feature of one or more aspects of the invention, the computer is a personal desktop computer.

In a feature of one or more aspects of the invention, the computer is a personal laptop or notebook computer.

In a feature of one or more aspects of the invention, the plurality of applications includes an email application, an internet browser application, and a streaming audio or video application.

In a feature of one or more aspects of the invention, the plurality of applications include a computer game.

In a feature of one or more aspects of the invention, the plurality of applications includes a massive multiplayer online role playing game.

In a feature of one or more aspects of the invention, the plurality of applications includes a video game.

In a feature of one or more aspects of the invention, the computer is a video game console.

In a feature of one or more aspects of the invention, the computer comprises a plurality of processing cores.

In a feature of one or more aspects of the invention, the computer comprises a plurality of processing cores, and wherein the computer performs the method by executing a multi-core virtual dispersive routing program.

In a feature of one or more aspects of the invention, different communication requirements differ at least in terms of maximum latency requirements and minimum bandwidth requirements.

Another aspect of the present invention relates to a computer arranged in electronic communication with one or more computer networks, the computer running an operating system and running a plurality of applications, each of the applications programmed to communicate over the computer network. The computer is characterized in that, the computer performs a method comprising the steps of, for each application, creating, for such application, a first virtual machine that is configured to send and receive communications over the computer network, determining, for such application, a first network protocol out of a plurality of available network protocols, the first network protocol representing an appropriate network protocol, out of the plurality of available network protocols, for a first set of communication requirements of the application, and causing the application, when communicating over the network under the first set of communication requirements of the application, to send and receive communications via the first virtual machine using the first network protocol, creating, for such application, a second virtual machine that is configured to send and receive communications over the computer network, the second virtual machine being a separate virtual machine instance from that of the first virtual machine, determining, for such application, a second network protocol out of a plurality of available network protocols, the second network protocol representing an appropriate network protocol, out of the plurality of available network protocols, for a second set of communication requirements of the application, the second set of communication requirements being different from the first set, and causing the application, when communicating over the network under the second set of communication requirements of the application, to send and receive communications via the second virtual machine using the second network protocol. Multiple virtual machine instances are created and simultaneously maintained by the computer for each of the plurality of applications, each virtual machine instance handling communications under a set of communication requirements of one of the plurality of applications via a networking protocol that has been determined to be appropriate for such set of communication requirements of the application.

In a feature of one or more aspects of the invention, the computer performs the method by executing a virtual dispersive routing program.

In a feature of one or more aspects of the invention, the computer is a personal computer.

In a feature of one or more aspects of the invention, the computer is a personal desktop computer.

In a feature of one or more aspects of the invention, the computer is a personal laptop or notebook computer.

In a feature of one or more aspects of the invention, the plurality of applications includes an email application, an internet browser application, and a streaming audio or video application.

In a feature of one or more aspects of the invention, the plurality of applications includes a computer game.

In a feature of one or more aspects of the invention, the plurality of applications includes a massive multiplayer online role playing game.

In a feature of one or more aspects of the invention, the plurality of applications includes a video game.

In a feature of one or more aspects of the invention, the computer is a video game console.

In a feature of one or more aspects of the invention, the computer comprises a plurality of processing cores.

In a feature of one or more aspects of the invention, the computer comprises a plurality of processing cores, and wherein the computer performs the method by executing a multi-core virtual dispersive routing program.

In a feature of one or more aspects of the invention, different communication requirements differ at least in terms of maximum latency requirements and minimum bandwidth requirements.

Another aspect of the present invention relates to a method of routing data over a network at a client device using virtualization. The method includes the steps of receiving a request for a network connection from an application running on the client device; spawning a virtual machine adapted to virtualize network capabilities of the client device; selecting a routing protocol from among a plurality of available routing protocols; determining a first node to communicate with, said determination being informed by network information stored on the client device; and communicating, using the selected routing protocol, data of the application to the first node.

In a feature of this aspect of the invention, said selection of a routing protocol is informed by information associated with the application.

In a feature of this aspect of the invention, the method further includes spawning another virtual machine adapted to virtualize network capabilities of the client device; selecting a second routing protocol from among a plurality of available routing protocols; determining a second node to communicate with, said determination being informed by network information stored on the client device; and communicating, using the selected second routing protocol, data of the application to the second node.

In a feature of this aspect of the invention, the method further includes, prior to said step of spawning another virtual machine, the step of determining that the application requires another network connection.

In a feature of this aspect of the invention, the step of determining that the application requires another network connection comprises determining whether a current network connection can meet performance requirements of the application.

In a feature of this aspect of the invention, said step of communicating comprises transmitting packets of data.

In a feature of one or more aspect of the invention, said packets are IP packets.

In a feature of this aspect of the invention, the method further includes, prior to the step of receiving a request for a network connection, the steps of querying a network for the network information; storing the network information in a computer readable medium.

In a feature of this aspect of the invention, the method further includes, prior to the step of receiving a request for a network connection, the steps of querying a network for data relating to the network, generating a routing table based on the data relating to the network, and storing the routing table in a computer readable medium. The network information that informs said determining step comprises information stored in the routing table.

In a feature of one or more aspects of the invention, the plurality of available routing protocols includes the Interior Gateway Routing Protocol (IGRP).

In a feature of one or more aspects of the invention, the plurality of available routing protocols includes the Enhanced Interior Gateway Routing Protocol (EIGRP).

In a feature of one or more aspects of the invention, the plurality of available routing protocols includes the Border Gateway Protocol (BGP).

In a feature of one or more aspects of the invention, the plurality of available routing protocols includes the Constrained Shortest Path First (CSPF) protocol.

In a feature of one or more aspects of the invention, the selected routing protocol is ported to run on a chip core.

In a feature of one or more aspects of the invention, the selected routing protocol is run multiple cores.

In a feature of one or more aspects of the invention, the plurality of available routing protocols includes pro-active routing algorithms.

In a feature of one or more aspects of the invention, the plurality of available routing protocols includes reactive routing algorithms.

In a feature of one or more aspects of the invention, the plurality of available routing protocols includes flow oriented routing algorithms.

In a feature of one or more aspects of the invention, the plurality of available routing protocols includes adaptive routing algorithms.

In a feature of one or more aspects of the invention, the plurality of available routing protocols includes hybrid routing algorithms.

In a feature of one or more aspects of the invention, the plurality of available routing protocols includes hierarchical routing algorithms.

In a feature of one or more aspects of the invention, the plurality of available routing protocols includes geographical routing algorithms.

In a feature of one or more aspects of the invention, the plurality of available routing protocols includes power aware routing algorithms.

Another aspect of the present invention relates to a method for providing information relating to a node along a network path. The method includes receiving, at a first node, a packet transmitted by a client device, the packet including a header and a payload; storing, at the first node, information from the packet in a computer readable medium; appending, to the payload of the packet, information associated with the first node; determining a second node to transmit the packet to, said determination being informed by network information stored on the first node; and transmitting the packet to the second node.

In a feature of this aspect of the invention, the information from the packet includes information relating to a routing protocol, and wherein said transmitting step comprises transmitting the packet utilizing the routing protocol.

Another aspect of the present invention relates to a method of determining a path of a packet. The method includes receiving a packet including a header and a payload, the payload including information appended to the payload by each of a plurality of nodes, the information appended to the payload by each of the plurality of nodes including information associated with the node that appended it; storing the payload in a computer readable medium; and analyzing the information appended to the payload by each of the plurality of nodes to determine a path of the packet.

In a feature of this aspect of the invention, the method further includes determining whether the path of the packet satisfies previously defined connection requirements.

Another aspect of the present invention relates to a method of responding to a dropped connection. The method includes transmitting a packet to a first node using a first routing protocol for communication to a destination device; setting a predefined timer, the predefined timer having a value corresponding to an amount of time greater than an average response time of the destination device; and upon expiration of the predefined timer, automatically transmitting the packet to a second node using a second routing protocol for communication to the destination device.

In a feature of this aspect of the invention, the first routing protocol and the second routing protocol are the same routing protocol.

In a feature of this aspect of the invention, the first node and the second node are the same node.

Another aspect of the present invention relates to a method of responding to a corrupted packet. The method includes receiving a packet from a transmitting device at a first virtual machine of a destination device; determining whether the packet has been tampered with, said determination being informed by information from an application running on the client device; quarantining the packet; spawning a new virtual machine at the destination device; and communicating, using the new virtual machine, with the transmitting device.

In a feature of this aspect of the invention, said step of communicating comprises communicating using a routing protocol different from a routing protocol used to transmit the packet.

In a feature of this aspect of the invention, said step of communicating comprises communicating using a path different from a path used to transmit the packet.

In a feature of this aspect of the invention, the method further includes shutting down the first virtual machine.

Another aspect of the present invention relates to a method of responding to a network attack. The method includes communicating with a remote device through a first virtual machine of a client device; detecting a network attack at the first virtual machine of the client device; spawning a second virtual machine at the client device; and communicating with the remote device through the second virtual machine of the client device.

In a feature of this aspect of the invention, said step of communicating through a first virtual machine comprises communicating via a path and said step of communicating through the second virtual machine comprises communicating via a different path.

In a feature of this aspect of the invention, said step of communicating through a first virtual machine comprises communicating via a network protocol and said step of communicating through the second virtual machine comprises communicating via a different network protocol.

In a feature of this aspect of the invention, the method further includes shutting down the first virtual machine.

In a feature of this aspect of the invention, the method further includes monitoring communications received through the first virtual machine.

In a feature of this aspect of the invention, the method further includes generating a third virtual machine; determining a source of the network attack; and initiating a retaliatory network attack through the third virtual machine against the source of the network attack.

Another aspect of the present invention relates to a method of routing data over a network at a client device using virtualization. The method includes detecting a request for a network connection from an application running on the client device; determining, from the application, application-specific information associated with the application; using the application-specific information, selecting a routing protocol from among a plurality of available routing protocols; and using the selected routing protocol, transmitting data of the application from the client device over the network.

Another aspect of the present invention relates to a method of routing data over a network at a client device using virtualization. The method includes the steps of detecting, at a virtual router on the client device, a request for a network connection from an application running on the client device; spawning, by the virtual router, a virtual machine adapted to virtualize network capabilities of the client device; selecting, by the virtual router, a routing protocol from among a plurality of available routing protocols; and communicating, using the selected routing protocol, data of the application to the first node.

Another aspect of the present invention relates to a method of routing data over a network at a client device using virtualization. The method includes the steps of detecting, at a virtual router on the client device, a request for a network connection from an application running on the client device; selecting, by the virtual router, a routing protocol from among a plurality of available routing protocols; determining, by the virtual router, a first node to communicate with, said determination being informed by network information stored on the client device; and using a virtual machine on the client device, communicating, using the selected routing protocol, data of the application to the first node.

Another aspect of the present invention relates to a method of routing data over a network at a client device using virtualization. The method includes detecting, at a virtual router on the client device, a request for a network connection from an application running on the client device; spawning, by the virtual router, a virtual machine adapted to virtualize network capabilities of the client device; selecting, by the virtual router, a routing protocol from among a plurality of available routing protocols; determining, by the virtual router, a first node to communicate with according to the selected routing protocol; and, using a virtual machine on the client device, communicating data of the application to the first node.

Another aspect of the present invention relates to a method of routing data over a network at client devices using virtualization. The method includes the steps of detecting, at a first virtual router on a first client device, a request for a network connection from an application running on the first client device; selecting, by the first virtual router, a routing protocol from among a plurality of available routing protocols; using a virtual machine on the first client device, transmitting, according to the routing protocol selected by the first virtual router, data of the first client device application from the first client device over the network; receiving the data at a second client device; detecting, at a second virtual router on the second client device, a request for a network connection from an application running on the second client device; selecting, by the second virtual router, a routing protocol from among a plurality of available routing protocols; and using a virtual machine on the second client device, transmitting, according to the routing protocol selected by the second virtual router, data of the second client device application from the second client device over the network.

In a feature of this aspect of the invention, the first routing protocol is different from the second routing protocol.

Another aspect of the present invention relates to a method of determining a routing path of a packet. The method includes receiving, at a client device in a network, a packet including a header and a payload, the payload including information appended to the payload by at least one other node in the network, the information appended to the payload by each of the at least one network node including information associated with the node that appended it; analyzing, at a virtual router on the client device, the information appended to the payload by each of the at least one network node; based at least partly on the analyzed information, selecting, by the virtual router, a routing protocol from among a plurality of available routing protocols; and transmitting, according to the routing protocol selected by the virtual router, the packet over the network.

Another aspect of the present invention relates to a method of determining a routing path of a packet, comprising: receiving, at a client device in a network, a packet including a header and a payload, the payload including information appended to the payload by at least one other node in the network, the information appended to the payload by each of the at least one network node including information associated with the node that appended it; based at least partly on content of the payload, selecting, by a virtual router on the client device, a routing protocol from among a plurality of available routing protocols; appending additional information, including information associated with the client device, to the payload; and transmitting, according to the routing protocol selected by the virtual router, the packet, included the appended payload, over the network.

Another aspect of the present invention relates to a virtual dispersive routing software client stored in a computer readable medium of a client device. The virtual dispersive routing software includes a virtual machine manager, adapted to spawn virtual machines; a routing platform including software adapted to implement a plurality of routing protocols; a controller adapted to intercept network requests intended for a network card; and an application interface adapted to communicate information relating to an application running on the client device to the controller.

Another aspect of the present invention relates to the application interface.

Another aspect of the present invention relates to a spider comprising a connective link between an upper level and a lower level of a protocol stack.

In a feature of one or more aspects of the present invention, the computer is a handheld mobile device.

In a feature of one or more aspects of the present invention, the computer is a mobile phone.

In a feature of one or more aspects of the present invention, the plurality of available routing protocols includes the Open Shortest Path First (OSPF) protocol.

In a feature of one or more aspects of the present invention, the network is a wireless network.

In a feature of one or more aspects of the present invention, the network is a Wi-Fi network.

Another aspect of the present invention relates to a method of utilizing information from one layer of a protocol stack to inform decisions at another layer of the protocol stack.

The method includes loading a spider configured to thread together an upper application layer and a lower layer of a protocol stack; receiving a packet at the lower layer; running a checksum on the packet; and determining whether a value returned from the checksum corresponds to a value associated with the application layer.

Another aspect of the present invention relates to a method of utilizing a spider. The method includes loading a spider configured to thread together a first layer and a second layer of a protocol stack; and utilizing information associated with the first layer to inform a decision at the second layer.

Another aspect of the present invention relates to a dispersive storage area network.

Another aspect of the present invention relates to a method for a dispersive storage area network.

Another aspect of the present invention relates to a dispersive storage area network that includes an electronic device having software loaded thereon configured to spawn a virtual machine that virtualizes network capabilities of the electronic device; and a plurality of storage devices, each storage device having data stored thereon, and each storage device having software loaded thereon configured to spawn a virtual machine that virtualizes network capabilities of the respective storage device. The first electronic device is configured to access data stored on one or more of the plurality of storage devices by receiving data over one or more connections with one or more of the plurality of storage devices, each connection associated with a virtual machine spawned at the electronic device that virtualizes network capabilities of the electronic device.

In a feature of this aspect, portions of information are stored as data on two or more of the plurality of storage devices, and wherein the electronic device is configured to access the information via one or more connections to each of the two or more of the plurality of storage devices.

In a feature of this aspect, portions of information are stored as data on three or more of the plurality of storage devices, and wherein at least some of the portions of information are cumulative for redundancy, and wherein the electronic device is configured to access the information via one or more connections to some of the three or more of the plurality of storage devices.

Another aspect of the present invention relates to a method for a dispersive storage area network. The method includes spawning, by an electronic device, a plurality of virtual machines that virtualize network capabilities of the electronic device; and receiving, from a plurality of storage devices, data, data from each storage device of the plurality of storage devices being received over a connection associated with a virtual machine that virtualizes network capabilities of the electronic device.

Another aspect of the present invention relates to a dispersive storage area network for medical data.

Another aspect of the present invention relates to a method for a dispersive storage area network for medical data.

Another aspect of the present invention relates to a system that includes an electronic device having software loaded thereon configured to spawn a virtual machine that virtualizes network capabilities of the electronic device; and a plurality of storage devices, each storage device having medical data stored thereon, and each storage device having software loaded thereon configured to spawn a virtual machine that virtualizes network capabilities of the respective storage device. The first electronic device is configured to access data stored on one or more of the plurality of storage devices by receiving medical data over one or more connections with one or more of the plurality of storage devices, each connection associated with a virtual machine spawned at the electronic device that virtualizes network capabilities of the electronic device.

Another aspect of the present invention relates to a system for accessing medical data that includes an electronic device having software loaded thereon configured to spawn a virtual machine that virtualizes network capabilities of the electronic device. The first electronic device is configured to access data stored on one or more of a plurality of storage devices by receiving medical data over one or more connections with one or more of the plurality of storage devices, each connection associated with a virtual machine spawned at the electronic device that virtualizes network capabilities of the electronic device.

Another aspect of the present invention relates to a system for sharing medical data that includes an electronic device having medical data stored thereon, and having software loaded thereon configured to spawn a virtual machine that virtualizes network capabilities of the electronic device. The electronic device is configured to communicate stored medical data over one or more connections, each connection being associated with a virtual machine spawned at the electronic device that virtualizes network capabilities of the electronic device.

Another aspect of the present invention relates to a method for receiving medical data that includes spawning, by an electronic device, a virtual machine that virtualizes network capabilities of the electronic device; and receiving, from a storage device, medical data, the medical data being received over a connection associated with a virtual machine that virtualizes network capabilities of the electronic device.

Another aspect of the present invention relates to a method for sharing medical data that includes spawning, by a first electronic device, a virtual machine that virtualizes network capabilities of the first electronic device; and communicating, to a second electronic device, medical data stored at the first electronic device, the medical data being communicated over a connection associated with a virtual machine that virtualizes network capabilities of the first electronic device.

Another aspect of the present invention relates to an electronic device including software thereon configured to gather information and forward gathered information to a search engine.

Another aspect of the present invention relates to a method of serving content as disclosed.

Another aspect of the present invention relates to a method of providing information to a search engine as disclosed.

Another aspect of the present invention relates to an electronic device including software loaded thereon configured to serve stored content; and software loaded thereon configured to search the stored content and communicate information obtained based on such search to a search engine.

Another aspect of the present invention relates to an electronic device including software loaded thereon configured to spawn a virtual machine that virtualizes network capabilities of the electronic device, and serve stored content; and software loaded thereon configured to search the stored content and communicate information obtained based on such search to a search engine.

Another aspect of the present invention relates to an electronic device including one or more electronic storage mediums collectively including public and private content; and software loaded thereon configured to spawn a first virtual machine that virtualizes network capabilities of the electronic device for serving stored public content, and spawn a second virtual machine that virtualizes network capabilities of the electronic device for serving stored private content. The electronic device further includes software loaded thereon configured to search the stored content and communicate information obtained based on such search to a search engine.

Another aspect of the present invention relates to an electronic device that includes one or more electronic storage mediums collectively including public and private content; and software loaded thereon configured to spawn a first virtual machine that virtualizes network capabilities of the electronic device for serving stored public content, and spawn a second virtual machine that virtualizes network capabilities of the electronic device for serving stored private content. The electronic device further includes software loaded thereon configured to search the stored public content and communicate information obtained based on such search to a search engine.

An aspect of the present invention relates to an electronic device configured for electronic communications utilizing virtual dispersive networking that includes a network interface for communicating over a network; an application loaded onto the electronic device programmed to communicate over a network; and virtual dispersive networking software configured to, create, for such application, a virtual machine comprising a virtual interface for the network interface of the electronic device, select a network protocol out of a plurality of available network protocols based on current communication requirements of the application, and cause network communications of the application to occur via the virtual network interface of the electronic device using the determined network protocol.

In a feature of this aspect, the software is further configured to create multiple virtual machines, each virtual machine being associated with communications of a respective application of a plurality of applications of the electronic device, each respective application being programmed to communicate with the network, wherein communications via each virtual machine uses a networking protocol that has been selected in accordance with the software based on the current communication requirements of the respective application.

In a feature of this aspect, the electronic device comprises a personal computer.

In a feature of this aspect, the electronic device comprises a desktop computer.

In a feature of this aspect, the electronic device comprises a portable computer.

In a feature of this aspect, the electronic device comprises a mobile communications device.

Another aspect of the present invention relates to an electronic device configured for electronic communications utilizing virtual dispersive networking that includes a network interface for communicating with a network; an operating system for running applications; an application programmed to communicate with the network; and software configured to create, for such application, a virtual machine comprising a virtual interface for the network interface of the electronic device, select a network protocol out of a plurality of available network protocols based on current communication requirements of the application, and cause network communications of the application to occur via the virtual network interface of the electronic device using the determined network protocol.

Another aspect of the present invention relates to a locally-controlled social media distribution and management system.

Another aspect of the present invention relates to a method for local control of social media distribution and management.

Another aspect of the present invention relates to a method of transferring a social media file between first and second end-user devices via network communications, the social media file pertaining to a user of the first end-user device. The method includes the steps of first, (i) communicating by the first end-user device, to a server, network contact information of the first end-user device, and (ii) communicating by the second end-user device, to the server, network contact information of the second end-user device; and thereafter, transferring the file from the first end-user device to the second end-user device by, (i) communicating, by the first end-user device, a request to the server to engage in a file transfer with the second end-user device by the first end-user device, (ii) communicating, by the server, the file transfer request received from the first end-user device, (iii) communicating, by the second end-user device, acceptance to the server of the request to engage in a file transfer with the first end-user device, (iv) communicating connection information, by the server, to the first and second end-user devices for enabling an open network connection between the first and second end-user devices, and (v) initiating, by the first and second end-user devices, through the open network connection, the file transfer based on the connection information received from the server.

In a feature of this aspect, the social media file is a first social media file, and the method further includes transferring a second social media file from the first end-user device to a third end-user device, the second social media file also pertaining to the user but being different in content from the first social media file, and includes the further steps of first, (i) communicating by the first end-user device, to a server, network contact information of the first end-user device, and (ii) communicating by the third end-user device, to the server, network contact information of the third end-user device; and thereafter, transferring the file from the first end-user device to the third end-user device by, (i) communicating, by the first end-user device, a request to the server to engage in a file transfer with the third end-user device by the first end-user device, (ii) communicating, by the server, the file transfer request received from the first end-user device, (iii) communicating, by the third end-user device, acceptance to the server of the request to engage in a file transfer with the first end-user device, (iv) communicating connection information, by the server, to the first and third end-user devices for enabling an open network connection between the first and third end-user devices, and (v) initiating, by the first and third end-user devices, through the open network connection, the file transfer based on the connection information received from the server. In some implementations of this feature, the user controls distribution and management of social media pertaining to the user, via the first end-user device, to multiple users.

Another aspect of the present invention relates to a retail transaction system using direct communication between customer device and point of sale terminal.

Another aspect of the present invention relates to a method for completing a retail transaction using direct communication between customer device and point of sale terminal.

Another aspect of the present invention relates to an electronic device configured for electronic communications with a point of sale terminal utilizing virtual dispersive networking. The electronic device includes a network interface for communicating over a network; an application loaded onto the electronic device programmed to communicate over a network with a point of sale terminal; and virtual dispersive networking software configured to, create, for such application, a virtual machine comprising a virtual interface for the network interface of the electronic device, select a network protocol out of a plurality of available network protocols based on current communication requirements of the application, and cause network communications of the application to occur via the virtual network interface of the electronic device using the determined network protocol. The application loaded onto the electronic device is further programmed to execute a retail transaction, using the virtual dispersive networking software, with the point of sale terminal.

Another aspect of the present invention relates to a virtual check system.

Another aspect of the present invention relates to a method for managing and securing the transmission of a virtual check.

Another aspect of the present invention relates to a method of transferring a virtual check image between first and second end-user devices via network communications. The method includes the steps of first, (i) communicating by the first end-user device, to a server, network contact information of the first end-user device, and (ii) communicating by the second end-user device, to the server, network contact information of the second end-user device; separating the virtual check image into a plurality of data files; and thereafter, separately transferring each data file from the first end-user device to the second end-user device by, (i) communicating, by the first end-user device, a request to the server to engage in a file transfer with the second end-user device by the first end-user device, (ii) communicating, by the server, the file transfer request received from the first end-user device, (iii) communicating, by the second end-user device, acceptance to the server of the request to engage in a file transfer with the first end-user device, (iv) communicating connection information, by the server, to the first and second end-user devices for enabling an open network connection between the first and second end-user devices, and (v) initiating, by the first and second end-user devices, through the open network connection, the file transfer based on the connection information received from the server; and combining, at the second end-user device, the plurality of data files to reproduce the virtual check image for printing.

One or more aspects of the present invention relate to the use of virtual dispersive routing in a medical context.

One or more aspects of the present invention relate to the use of virtual dispersive routing to communicate medical data.

One or more aspects of the present invention relate to the use of virtual dispersive routing to access medical data stored on an electronic device at a remote location.

One or more aspects of the present invention relate to the use of virtual dispersive routing for a dispersive storage area network.

One or more aspects of the present invention relate to the use of virtual dispersive routing in a search engine context.

One or more aspects of the present invention relate to the use of virtual dispersive routing to serve content.

One or more aspects of the present invention relate to the use of virtual dispersive routing to serve a web page.

One or more aspects of the present invention relate to the use of virtual dispersive routing in a social media context.

One or more aspects of the present invention relate to the use of virtual dispersive routing to serve a social media profile.

One or more aspects of the present invention relate to the use of virtual dispersive routing in a smart grid context.

One or more aspects of the present invention relate to the use of virtual dispersive routing to improve carrier efficiency.

One or more aspects of the present invention relate to the use of virtual dispersive routing in a gaming context.

One or more aspects of the present invention relate to the use of virtual dispersive routing in an MMORPG context.

One or more aspects of the present invention relate to the use of virtual dispersive routing in a retail transaction context.

One or more aspects of the present invention relate to the use of virtual dispersive routing in an audio and/or video conferencing context.

One or more aspects of the present invention relate to the use of virtual dispersive routing in a file sharing context.

One or more aspects of the present invention relate to the use of virtual dispersive routing in a media server context.

One or more aspects of the present invention relate to the use of virtual dispersive routing in an auction or procurement context.

One or more aspects of the present invention relate to the use of virtual dispersive routing in an electronic check context.

Additional aspects and features are found in the patent applications from which priority is claimed and which are incorporated by reference herein.

In addition to the aforementioned aspects and features of the present invention, it should once again be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, now briefly described.

FIG. 4 is a tabular representation of data stored by a node in the payload of a packet.

FIG. 14 includes a table illustrating potential resource reductions that may be achieved in accordance with one or more embodiments of the invention.

FIG. 23 includes a table setting forth the name and size of each file included in the computer program listing incorporated herein by reference.

FIG. 34 illustrates the receipt of a plurality of data streams from each of a plurality of devices that portions of data are stored on.

DETAILED DESCRIPTION

Figure 1:
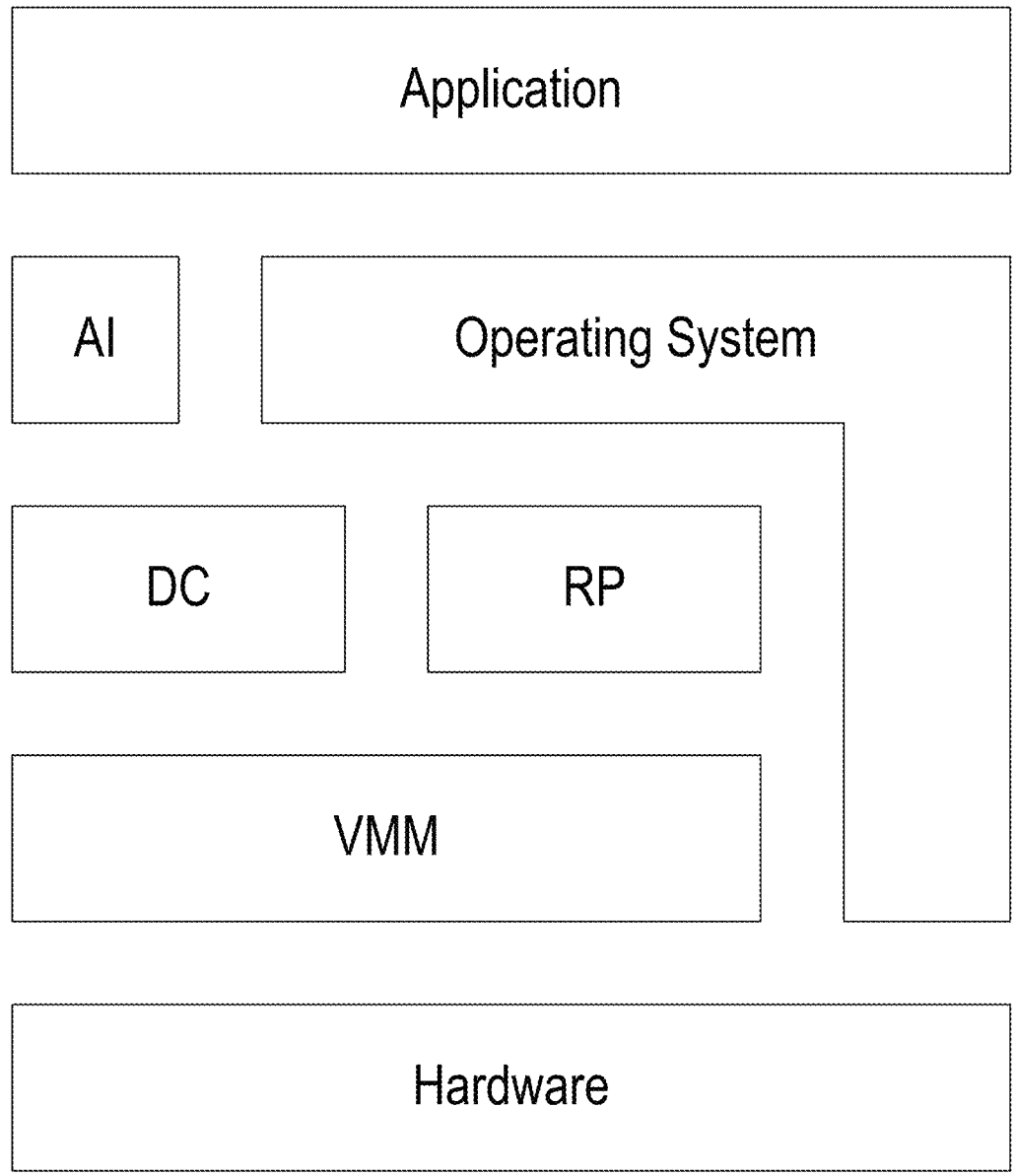
FIG. 1 illustrates components of a VDR software client loaded onto a client device in accordance with one or more embodiments of the invention.

As a preliminary matter, it will readily be understood by one having ordinary skill in the relevant art ("Ordinary Artisan") that the present invention has broad utility and application. Furthermore, any embodiment discussed and identified as being preferred is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Further, as used herein, the term server may be utilized to refer to a single server, a plurality of servers working together, or both.

Additionally, as used herein, "an open network connection" generally means a network pathway of one or more router nodes that extends between two end-user devices whereby data is sent from one of the end-user devices to the other end-user device without connecting to a server, or an equivalent pathway where the data that is sent is neither stored nor forwarded by a server.

Referring now to the drawings, one or more preferred embodiments of the present invention are next described. The following description of one or more preferred embodiments is merely exemplary in nature and is in no way intended to limit the invention, its implementations, or uses.

VDR

Virtual dispersive routing (hereinafter, "VDR") relates generally to providing routing capabilities at a plurality of client devices using virtualization. Whereas traditional routing calls for most, if not all, routing functionality to be carried out by centrally located specialized routing devices, VDR enables dispersed client devices to assist with, or even take over, routing functionality, and thus is properly characterized as dispersive. Advantageously, because routing is performed locally at a client device, a routing protocol is selected by the client based upon connection requirements of the local application initiating the connection. A protocol can be selected for multiple such connections and multiple routing protocols can even be utilized simultaneously. The fragile nature of the routing protocols will be appreciated, and thus virtualization is utilized together with the localization of routing to provide a much more robust system. Consequently, such dispersive routing is properly characterized as virtual.

More specifically, preferred VDR implementations require that a VDR software client be loaded on each client device to help control and optimize network communications and performance. Preferably, VDR is implemented exclusively as software and does not include any hardware components. Preferably, the basic components of a VDR software client include a routing platform (sometimes referred to hereinafter as an "RP"); a virtual machine monitor (sometimes referred to hereinafter as a "VMM"); a dispersive controller (sometimes referred to hereinafter as a "DC"); and an application interface (sometimes referred to hereinafter as an "AI"). FIG. 1 illustrates each of these components loaded onto a client device. Each of these components is now discussed in turn.

The Routing Platform (RP) and Multiple Routing Protocols

Despite eschewing the traditional routing model utilizing central points of control, VDR is designed to function with existing routing protocols. Supported routing protocols, together with software necessary for their use, are included in the routing platform (RP) component of the VDR software, which can be seen in FIG. 1. For example, the RP includes software to implement and support the Interior Gateway Routing Protocol ("IGRP"), the Enhanced Interior Gateway Routing Protocol ("EIGRP"), the Border Gateway Protocol ("BGP"), the Open Shortest Path First ("OSPF") protocol, and the Constrained Shortest Path First ("CSPF") protocol. It will be appreciated that in at least some embodiments, a port will be needed to allow conventional routing software to run on a chip core (for example, a core of an Intel chip) at a client device. Preferably, multi-core components are used to allow routing protocols to be run on multiple cores to improve overall performance.

Moreover, it will be appreciated that the ability to support multiple routing protocols allows VDR to meet the needs of applications having varying mobility requirements. Applications can be supported by ad hoc algorithms such as proactive (table driven) routing, reactive (on-demand) routing, flow oriented routing, adaptive (situation aware) routing, hybrid (proactive/reactive) routing, hierarchical routing, geographical routing, and power aware routing. Further, the use of multiple protocols supports broadcasting, multicasting, and simulcasting. It will be appreciated that the use of multiple protocols provides support for multi-threaded networking as well.

The Virtual Machine Monitor (VMM) and Virtualization

It will be appreciated that virtualization is known in some computing contexts, such as virtualization of memory and processing. Virtualization enables the abstraction of computer resources and can make a single physical resource appear, and function, as multiple logical resources. Traditionally, this capability enables developers to abstract development of an application so that it runs homogenously across many hardware platforms. Additionally, this capability enables multiple virtual machines to be created and run on a single real computer, wherein each virtual machine corresponds to a different computer including its own operating system. More generally, virtualization is geared toward hiding technical detail through encapsulation. This encapsulation provides the mechanism to support complex networking and improved security that is required to enable routing at client devices.

More specifically, and as used herein, a virtual machine (sometimes referred to hereinafter as a "VM") essentially comprises a software copy of a real machine interface, and may include additional virtualization of a computer's resources—including additional interfaces for network communications, or even virtualization of a computer itself. The purpose of running a VM is to provide an environment that enables a computer to isolate and control access to its services. The virtual machine monitor (VMM) component is used to run a plurality of VMs on a real machine and to interface directly with that real machine. In a VDR implementation, the VMM creates a VM for each distinct connection for a client on the computer, with the VM comprising the communication interface for making the connection. It is helpful to explain at this juncture that what comprises a connection can vary, but in general includes a transfer of data in the form of packets from a first end device to a second end device along a path (or route). It will be appreciated that a single application can require multiple connections. For example, an application may require multiple connections because of bandwidth application requirements and performance requirements; in this event each connection preferably interfaces with its own VM and the connections can utilize (sometimes referred to as being tied to) the same routing protocol or different routing protocols, even though the connections are themselves necessitated by the same application. Similarly, although two connections may at times travel along an identical path, the connections themselves are nevertheless distinct, and each will preferably still continue to interface with its own VM. The VMM creates and manages the VMs in making these connections.

The Dispersive Controller (DC) and Optimizing Performance

When the client is in need of a new connection, a dispersive controller (DC), located between an operating system and a driver that controls network hardware (such as a NIC card), intercepts the request for a new connection and tells the VMM to spawn a new VM associated with the desired connection. The DC then queries the application interface (AI) and utilizes any information obtained to select a routing protocol from among those supported by the RP. This selected routing protocol, however, is currently believed to be generally useless without knowledge of the surrounding network. To this end, the DC allows each client to find other clients, interrogate network devices, and utilize system resources. Thus, each VDR client is "network aware," in that routing information is gathered and maintained at each client by the DC.

Figure 2:
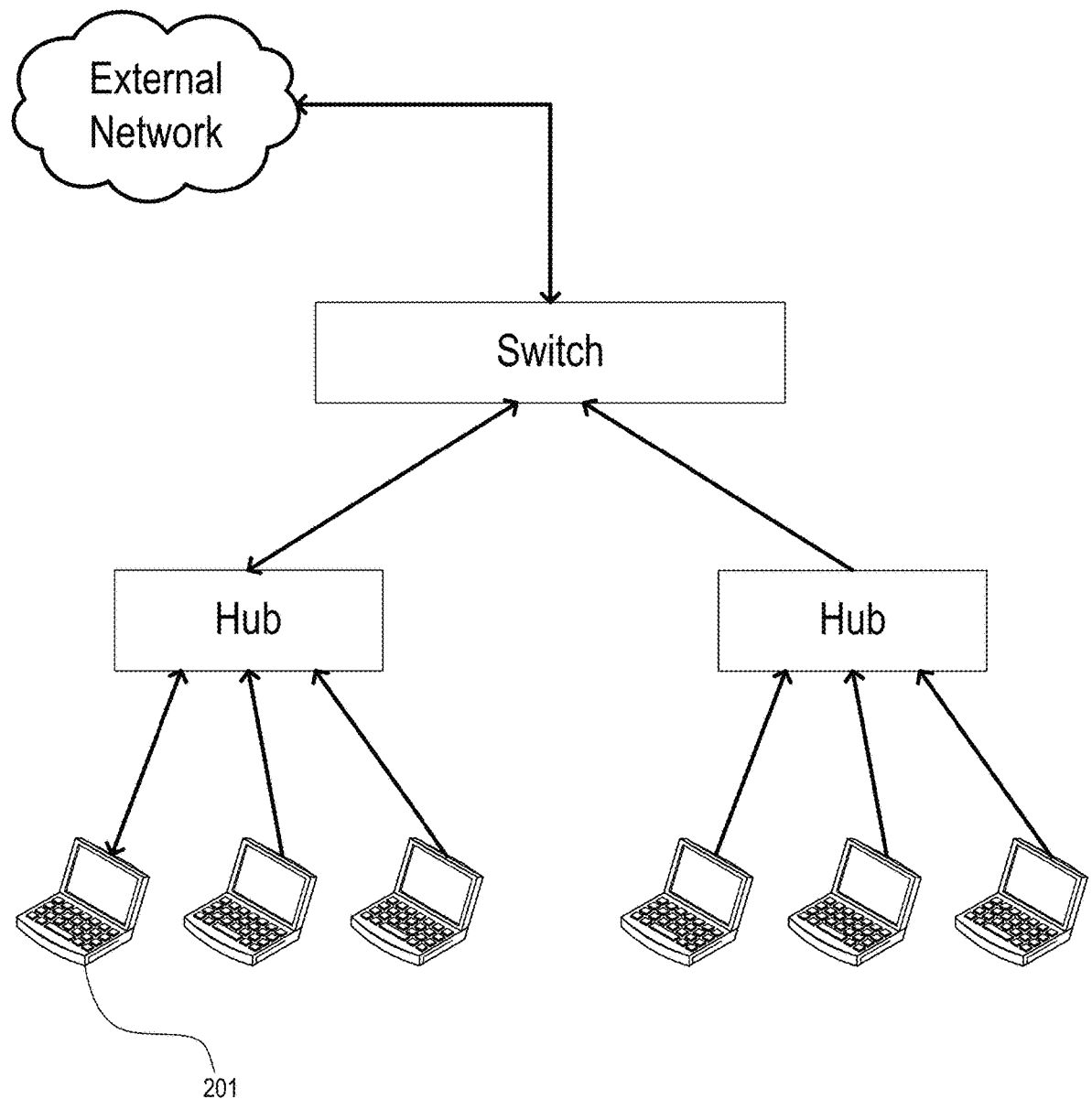
FIG. 2 illustrates a possible network topology in which a VDR client gathers LAN routing information and queries an external network for backbone information and application-specific routing information in accordance with one or more embodiments of the invention.

FIG. 2 illustrates how a VDR client 201 gathers LAN routing information and queries an external network for backbone information and application-specific routing information. In response to these queries, routing information is returned. This returned routing information is cached, processed, data mined, compared to historical data, and used to calculate performance metrics to gauge and determine the overall effectiveness of the network. This is possible because the resources available at a VDR client will typically be greater than those available at a conventional router.

In at least some embodiments, a VDR network functions in some ways similarly to a conventional network. In a conventional network, data, in the form of packets, is sent to a router to be routed according to a routing table maintained at the router. Similarly, in a VDR network, after utilizing gathered network information to generate a routing table, a client device utilizes this generated routing table to select a route and transmit a packet accordingly, which packet is then received by another client device and routed according to that client's routing table, and so on, until the packet reaches its destination.

However, rather than simply passing on received packets from client to client, in a manner akin to a traditional router, VDR, via the DC, instead takes advantage of the storage and processing resources available at each client, while still remaining compatible with existing network architecture, by attaching lower level protocol data to the payload of transmitted packets for subsequent client analysis.

Figure 3:
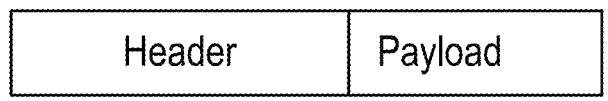
FIG. 3 illustrates the addition of data to the payload of a packet on each of a plurality of hops in accordance with one or more embodiments of the invention.
Figure 3:
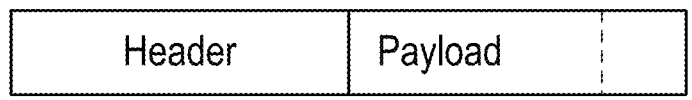
Figure 3:
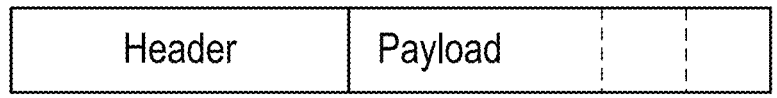
Figure 3:
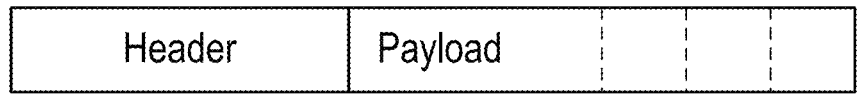

More specifically, when a packet is received at a VDR client, a virtual machine (VM) intercepts the packet passed from the networking hardware (for example, a NIC card) and places it in memory. The VDR client then processes the packet data. When the data is subsequently passed on, this processed data is appended to the payload of the packet, together with information relating to the VDR client, for analysis at the destination. As can be seen in FIG. 3, the result of this process is that each "hop" causes additional information to be added to the payload of a packet, and thus results in a direct increase in payload size proportionate to the number of hops taken by the packet. Specifically, each hop is believed to result in an increase of 35 bytes for an IPv4 implementation, and 59 bytes for an IPv6 implementation. The table of FIG. 4 details the information stored from each layer, along with the number of bytes allotted for each field. It will be appreciated that different or additional information could be stored in alternative embodiments.

Currently, 128-bit addressing provides support for IPv4 and IPv6 addressing, but support for additional addressing schemes is contemplated. It will be appreciated that for a typical communication over the Internet, i.e., one consisting of around 20 hops, the overhead appended to the payload will be around 700 bytes utilizing IPv4 and around 1180 bytes utilizing IPv6. It is believed that, in a worst case scenario, an extra IP datagram could be required for every datagram sent. Although some of this data may seem redundant at first blush, some repetition is tolerable and even necessary because network address translation ("NAT") can change source or destination fields. That being said, it is contemplated that some implementations use caching to lower this overhead. Additionally, in at least some implementations, the VDR client utilizes application specific knowledge to tailor the information that is appended to the needs of a specific application.

Conventionally, when a packet is received at a router, routing information is typically stripped off each packet by the router and disregarded. This is because each router has limited memory and handles an enormous number of packets. When a packet is received at a destination VDR client, however, the destination client has sufficient resources to store and process the information delivered to it. Additionally, to the extent that client resources may be taxed, the VDR client need not always store this information in every packet received, as in at least some embodiments application knowledge provides the client with an understanding of which packets are important to applications running on the client. Regardless of whether some or all of this information delivered in the payload of each data packet is processed, the information that is processed is analyzed to create a "network fingerprint," or network watermark (as described in more detail hereinbelow), of the nodes involved in the communication link. Thus, VDR software loaded on nodes along a path enables the nodes to append information regarding a path of a packet, which in turn enables the generation of a network fingerprint at the destination device, which network fingerprint represents a historical record that is stored and maintained for later forensic analysis. In addition to forensic analysis by the client, the maintenance of network information on the client enables forensic analysis by a server as well.

The Application Interface (AI) & Application Knowledge

One of the benefits of providing routing functionality at a client device is that the client is able to utilize its knowledge of the application initiating a connection to enhance routing performance for that application. This knowledge is provided to the DC via an application interface (AI), as can be seen in FIG. 1. Utilizing application knowledge to enhance routing performance could be useful to a variety of applications, such, as for example, computer games including massively multiplayer online role playing games.

The virtualization of routing functionality at a client device, as described hereinabove, allows multiple routing protocols and algorithms to be run simultaneously on a client device. Thus, the DC utilizes the application interface to obtain required criteria for an application connection and then chooses from among the protocols and algorithms available via the RP.

For example, a client may run two applications, referred to as Application "A" and Application "B." Application "A" may need to communicate very large amounts of data, and thus requires a routing protocol that optimizes bandwidth, while Application "B" may only need to communicate very small amounts of data at very fast speeds, and thus requires a routing protocol that minimizes latency irrespective of bandwidth. A traditional router cannot tell the difference between packets originating from Application "A" and those originating from Application "B," and thus will utilize the same routing protocol for packets from each application. A VDR client, however, is aware of applications running locally, and thus can be aware, through the AI, of various connection criteria for each application. These connection criteria can then be utilized by the VDR client in selecting a routing protocol or algorithm. Furthermore, as described hereinabove, both the selected routing protocol and the originating application associated with a packet can be communicated to other client nodes via data appended to the payload of the packet. Thus, the protocol selected at a source client can be utilized to route the packet throughout its path to a destination client. Further, because virtualization allows multiple routing protocols to be run on a single client, each application can utilize its own routing protocol.

Moreover, a VDR client can utilize knowledge of the path of a specific connection to further optimize performance. Because a network fingerprint can be gathered detailing the nodes in a communication path, a VDR client running on a client device can analyze each network fingerprint to determine whether the associated connection satisfies the connection criteria of the application desiring to utilize the connection. If the connection does not satisfy the connection criteria, then the client can attempt to find a connection that does satisfy the criteria by switching to a different protocol and/or switching to a different first node in its routing table. Combinations utilizing various protocols and selecting a variety of first nodes can be attempted, and the resultant paths evaluated until a path is found that does satisfy connection criteria. Additionally, combinations utilizing various protocols and selecting a variety of first nodes can be utilized to create route redundancy. Such route redundancy can provide to an application both higher bandwidth and controllable quality of service.

Although connection criteria for source and destination clients will often be identical, there are many situations where this will not be the case. For example, if one client is downloading streaming video from another client, then the connection requirements for each client will likely not be identical. In this and other situations, connections between two clients may be asymmetrical, i.e., client "A" transmits packets to client "B" over path 1, but client "B" transmits packets to client "A" over path 2. In each case, because path information gleaned from the payload of packets is stored and processed at the destination client, the evaluation of whether the path meets the required connection criteria is made at the destination client. In the example above, client "B" would determine whether path 1 satisfies its application's connection criteria, while client "A" would determine whether path 2 satisfies its application's connection criteria.

Perhaps the epitome of a connection that does not satisfy connection criteria is a broken, or failed, connection. In the event of a connection break, VDR enjoys a significant advantage over more traditional routing. Conventionally, recognition of a connection break would require a timeout at an upper level application, with either the path being re-routed subsequent to the timeout or a connection failure message being presented to a user. A VDR client, however, is aware of generally how long it should take to receive a response to a transmitted communication, and can utilize this awareness to speed up route convergence for additional network connections to insure application robustness and performance requirements, where performance requirements are defined as criteria that must be met to allow the application to run properly (e.g., video conferencing can't wait too long for packets to show up or else the audio "crackles" and the image "freezes"). For example, a VDR client may be aware that it should receive a response to a communication in 500 ms. If a response has not been received after 500 ms, the VDR client can initiate a new connection utilizing a different routing protocol and/or a different first node as outlined above with respect to finding a satisfactory connection path.

In addition to performance optimization, application knowledge can also be utilized to enhance network security. For example, an application may have certain security requirements. A VDR client aware of these requirements can create a "trusted network" connection that can be used to transfer information securely over this connection in accordance with the requirements of the application. A more traditional routing scheme could not ensure such a trusted connection, as it could not differentiate between packets needing this secure connection and other packets to be routed in a conventional manner.

But before elaborating on security measures that may be built in to a VDR implementation, it is worth noting that a VDR client is able to work in concert with an existing client firewall to protect software and hardware resources. It will be appreciated that conventional firewalls protect the flow of data into and out of a client and defend against hacking and data corruption. Preferably, VDR software interfaces with any existing client firewall for ease of integration with existing systems, but it is contemplated that in some implementations VDR software can include its own firewall. In either implementation, the VDR software can interface with the firewall to open and close ports as necessary, thereby controlling the flow of data in and out.

In addition to this firewall security, the VDR software can utilize application knowledge to filter and control packets relative to applications running on the client. Thus, packets are checked not only to ensure a correct destination address, but further are checked to ensure that they belong to a valid client application.

One way VDR software can accomplish this is by utilizing "spiders" to thread together different layers of the protocol stack to enable data communication, thereby reducing delays and taking advantage of network topologies. Each spider represents software that is used to analyze data from different layers of the software stack and make decisions. These threaded connections can be used to speed data transfer in static configurations and modify data transfer in dynamic circumstances. As an example, consider a client device running a secure email application which includes a security identification code. Packets for this application include a checksum that when run will come up with this identification code. A spider would allow this upper level application security identification code to be connected to the lower layer. Thus, the lower layer could run a checksum on incoming packets and discard those that do not produce the identification code. It will be appreciated that a more complex algorithm, such as an MD5 hash algorithm, could be utilized as well.

Moreover, because the VDR software is knowledgeable of the application requiring a particular connection, the software can adaptively learn and identify atypical behavior from an outside network and react by quarantining an incoming data stream until it can be verified. This ability to match incoming data against application needs and to isolate any potential security issues significantly undermines the ability of a hacker to gain access to client resources.

Additionally, when such a security issue is identified, a VDR client can take appropriate steps to ensure that it does not compromise the network. Because a VDR client is network aware and keeps track of other clients with which it has been communicating, when a security issue is identified, the VDR client can not only isolate the suspect connection but can further initiate a new connection utilizing a different routing protocol and/or a different first node as outlined above with respect to finding a satisfactory connection path. Alternatively, or additionally, the VDR client could simply choose to switch protocols on the fly and communicate this change to each client with which it is in communication.

Figure 5A:
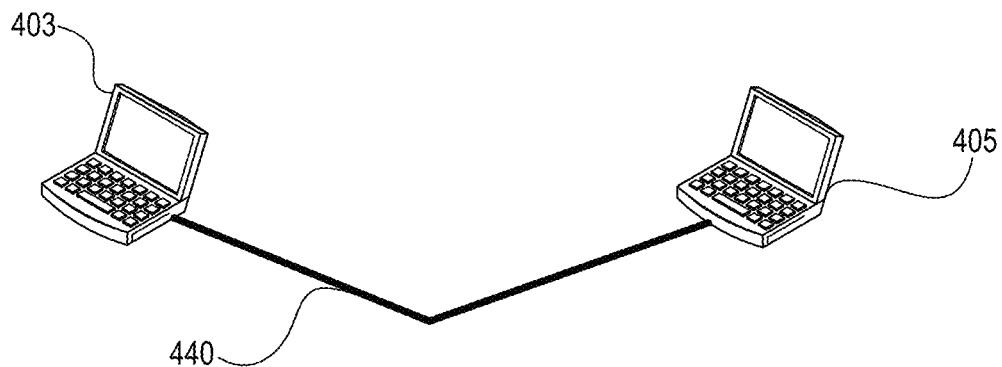
FIGS. 5A-5C provide a simplified example of a VDR software response to a network attack in accordance with one or more embodiments of the invention.
Figure 5B:
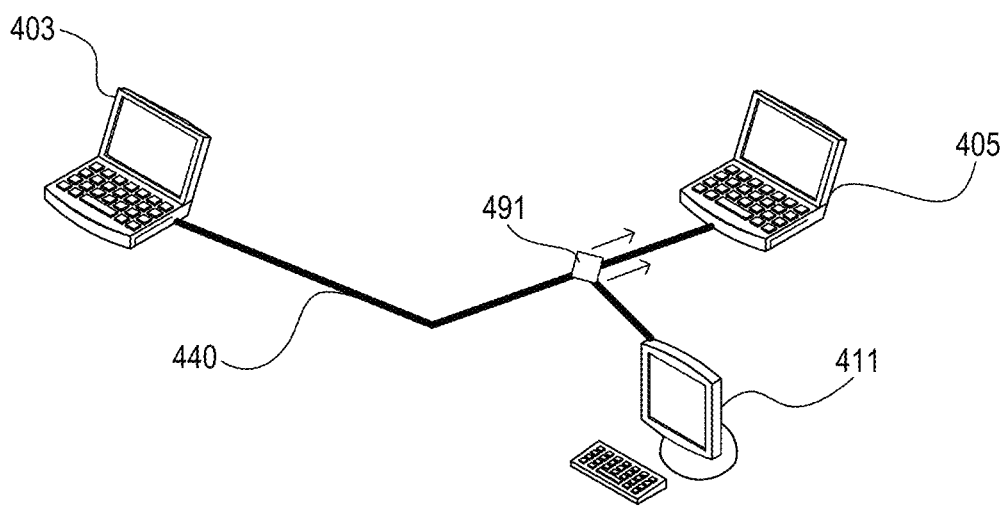
Figure 5C:
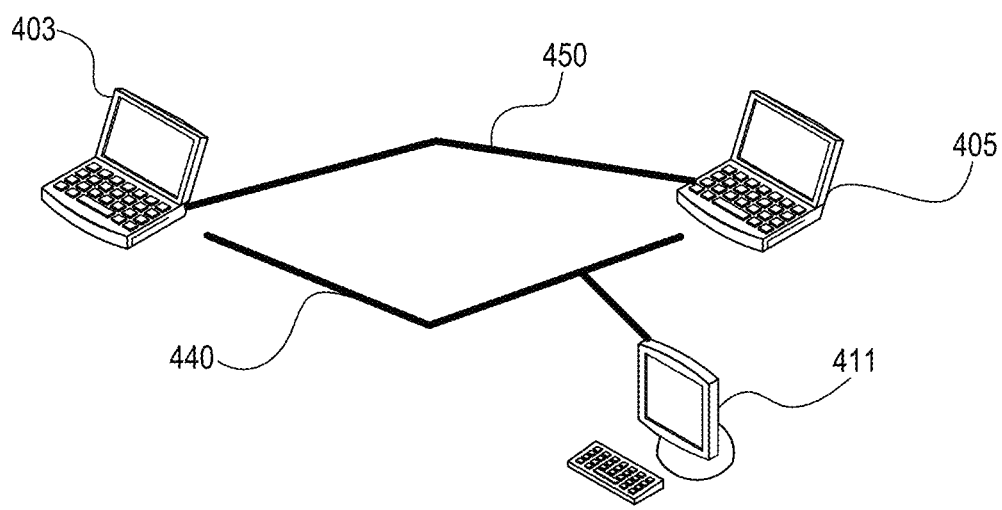

FIGS. 5A-5C provide a simplified example of such action for illustrative effect. In FIG. 5A, VDR client 403 is communicating with VDR client 405 over connection 440. In FIG. 5B, external computer 411 tries to alter packet 491 transmitted from client 403 to client 405. Client 405 runs a hashing algorithm on the received packet 491 and identifies that it has been corrupted. Client 405 then quarantines packets received via connection 440 and, as can be seen in FIG. 5C, establishes a new connection 450 with client 403.

Upon discovery of an "attack" on a network or specific network connection, a VDR client can monitor the attack, defend against the attack, and/or attack the "hacker". Almost certainly, a new, secure connection will be established as described above. However, after establishing a new connection, the VDR client can then choose to simply kill the old connection, or, alternatively, leave the old connection up so that the attacker will continue to think the attack has some chance of success. Because each connection is virtualized, as described hereinabove, a successful attack on any single connection will not spill over and compromise the client as a whole, as crashing the VM associated with a single connection would not affect other VMs or the client device itself. It is contemplated that a VDR client will attempt to trace back the attack and attack the original attacker, or alternatively, and preferably, communicate its situation to another VDR client configured to do so.

An Exemplary Implementation

Traditionally, wired and wireless networks have tended to be separate and distinct. Recently, however, these types of networks have begun to merge, with the result being that the routing of data around networks has become much more complex. Further, users utilizing such a merged network desire a high level of performance from the network regardless of whether they are connected wirelessly or are connected via a fixed line. As discussed hereinabove, VDR enables a client to monitor routing information and choose an appropriate routing protocol to achieve the desired performance while still remaining compatible with existing network architecture. VDR can be implemented with wired networks, wireless networks (including, for example, WiFi), and networks having both wired and wireless portions.

Figure 6A:
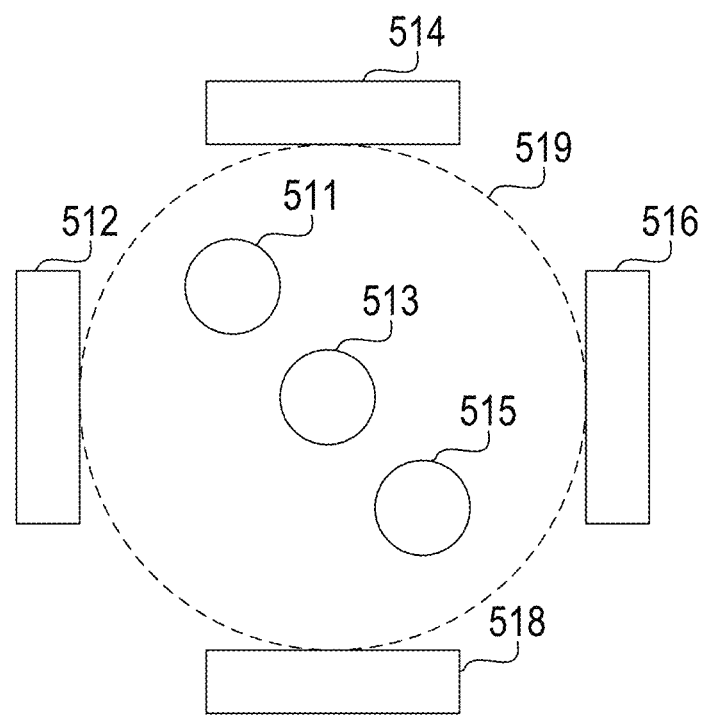
FIGS. 6A-6C illustrate an exemplary VDR implementation in accordance with one or more embodiments of the invention.

FIG. 6A illustrates an exemplary local area network 510 (hereinafter, "LAN") utilizing VDR. The LAN 510 includes three internal nodes 511, 513, 515, each having VDR software loaded onto a client of the respective node. The internal nodes 511, 513, 515 can communicate with one another, and further can communicate with edge nodes 512, 514, 516, 518, each also having VDR software loaded onto a client of the respective node. The coverage area 519 of the LAN 510 is represented by a dashed circle. It will be appreciated that the edge nodes 512, 514, 516, 518 are located at the periphery of the coverage area 519. The primary distinction between the internal nodes 511, 513, 515 and the edge nodes 512, 514, 516, 518 is that the internal nodes 511, 513, 515 are adapted only to communicate over the LAN 510, while the edge nodes 512, 514, 516, 518 are adapted to communicate both with the internal nodes 511, 513, 515 and with edge nodes of other LANs through one or more wide area networks (hereinafter, "WANs"). As one of the nodes 511, 513, 515 moves within the LAN 510 (or, if properly adapted, moves to another LAN or WAN), VDR allows it to shift to ad hoc, interior, and exterior protocols. This ability to shift protocols allows the node to select a protocol which will provide the best performance for a specific application.

Figure 6B:
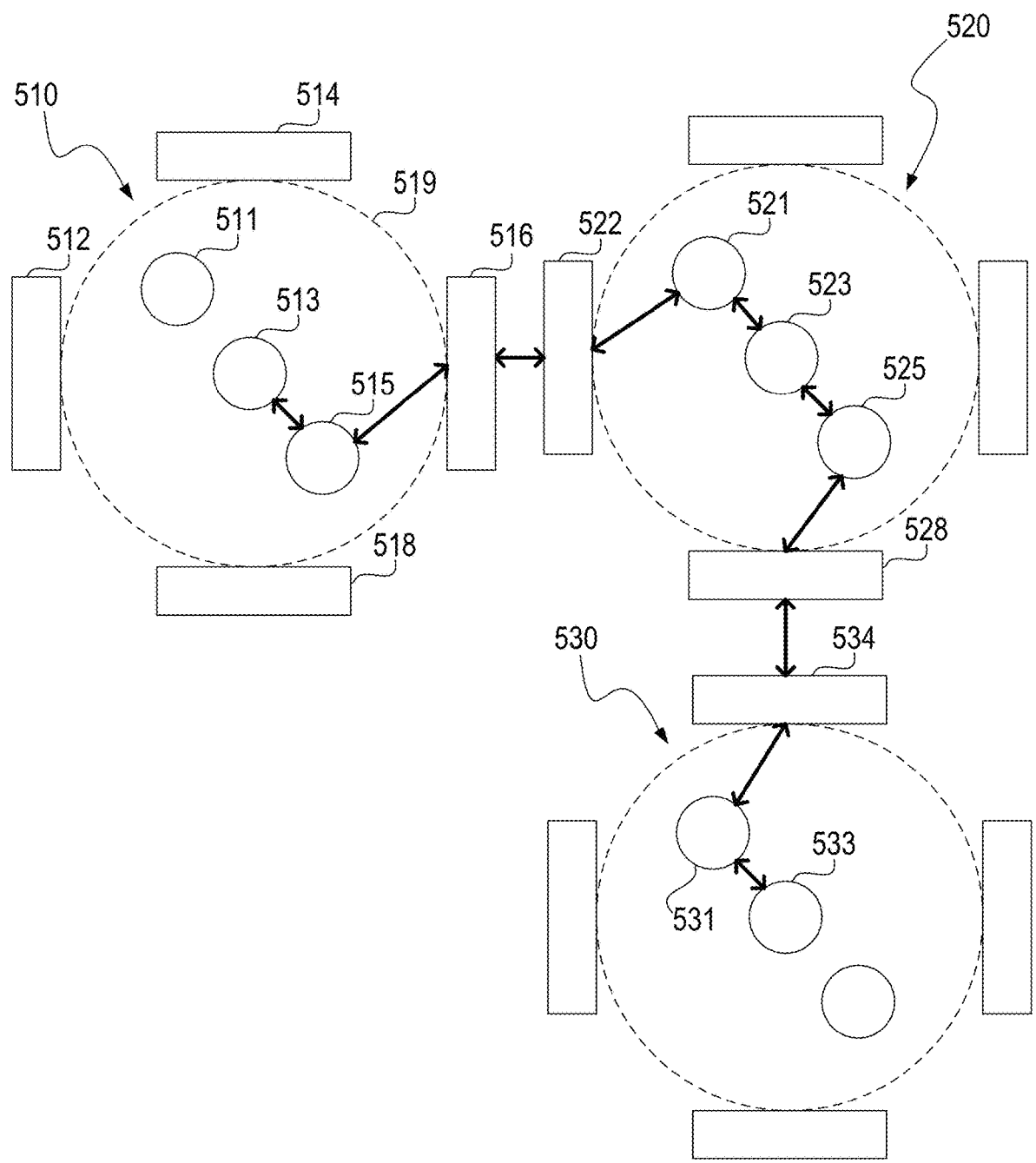

FIG. 6B illustrates an exemplary path between an internal node 513 in LAN 510 and an internal node 533 in LAN 530. It will be appreciated that an "interior" protocol is utilized for communications inside each LAN, and an "exterior" protocol is utilized for communications between edge nodes of different LANs. Thus, it will likewise be appreciated that each edge node must utilize multiple protocols, including an interior protocol to communicate with interior nodes and an exterior protocol to communicate with other edge nodes of different LANs. Further, at any time an ad hoc protocol could be set up which is neither a standard interior nor exterior protocol.

In FIG. 6B, LAN 510 and LAN 530 are both using CSPF as an interior protocol, while LAN 520 and LAN 540 (seen in FIG. 6C) are utilizing EIGRP as an interior protocol. All edge nodes of each of the LANs 510, 520, 530 (as well as the additional LAN 540 in FIG. 6C) are connected to a WAN utilizing BGP to communicate between edge nodes.

Referring to FIG. 6B, the exemplary path between node 513 and node 533 includes an internal node 515, an edge node 518, an edge node 522 in a second LAN 520, internal nodes 521, 523, 525 in the second LAN, another edge node 528, an edge node 534 in a third LAN 530, and an internal node 531 in the third LAN. Further, because a particular protocol was not selected and propagated by the transmitting node, this connection utilizes CSPF for internal communications within the first LAN 510 and the third LAN 530, EIGRP for internal communications within the second LAN 520, and BGP for external communications between edge nodes. At one or both end nodes 513,533, the VDR software can analyze this information and determine whether the combination of protocols along this path is satisfactory for the communicating application. It will be appreciated that the VDR software can further analyze the information gathered and determine whether the path meets application requirements for throughput, timing, security, and other important criteria.

In a static environment, this path may represent a connection that meets application requirements, in which case no further adjustment would be needed. However, if a network outage were to occur, a network or a node were to move, or another dynamic event was to occur, the path could need to be altered.

Figure 6C:
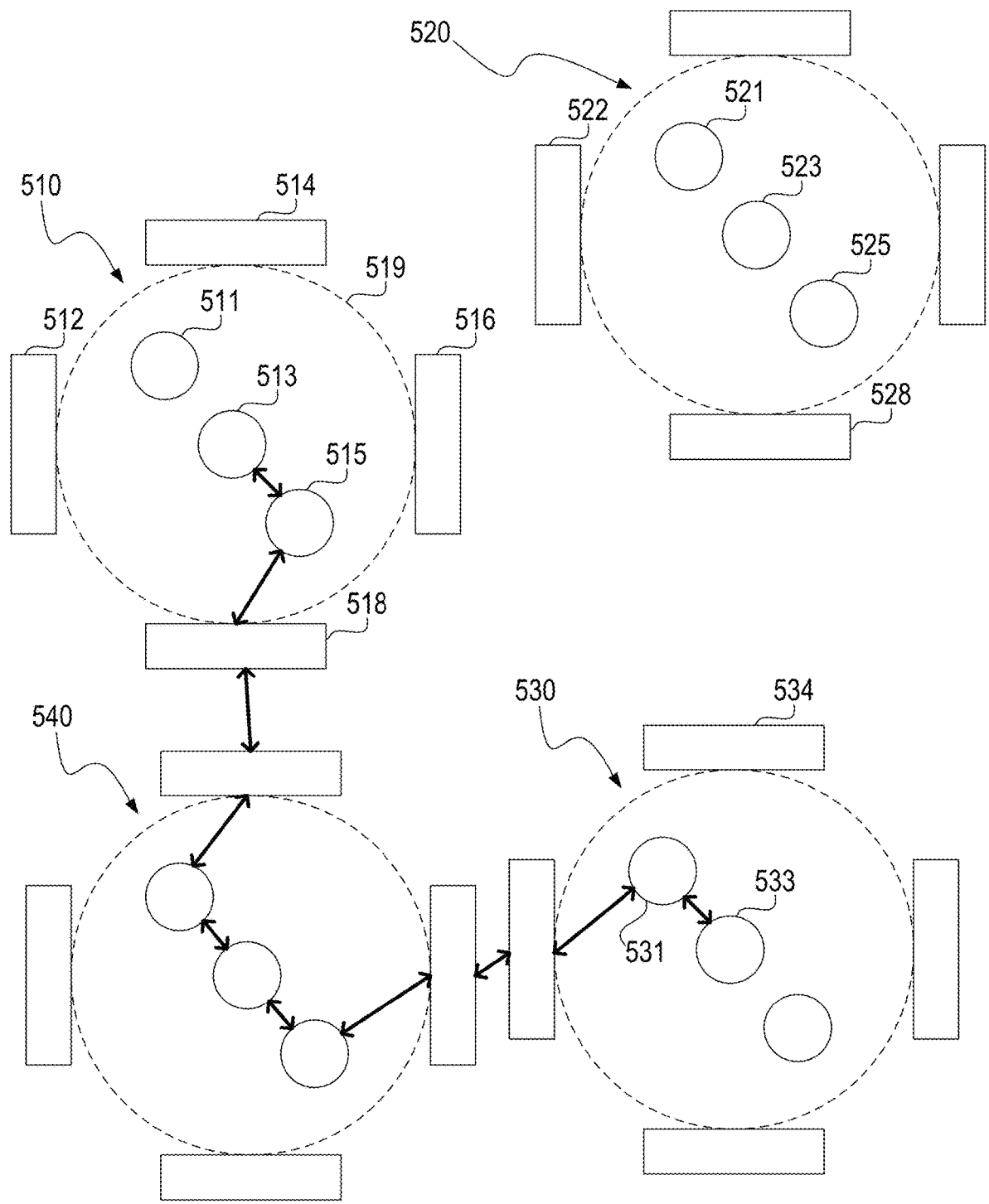

For example, if the second LAN 520 were to move out of range, then the end node 533 might analyze the path information appended to a packet received after such movement and determine that increased latency resulting from this movement rendered this path unsuitable per application requirements. The node 533 would then attempt to establish a new connection utilizing a different route that would satisfy application requirements. FIG. 6C illustrates such a new connection, which remains between the same end nodes 513,533, but rather than being routed through LAN 520 that moved out of range, as with the path illustrated in FIG. 6B, the path is instead routed through a fourth LAN 540.

It will be appreciated that the ability to influence path selection based on client application needs significantly enhances the performance, flexibility, and security of the network.

It will further be appreciated from the above description that one or more aspects of the present invention are contemplated for use with end, client, or end-client devices. A personal portable computer, such as a notebook or laptop computer, are examples of such a device, but a mobile communications device—such as a mobile phone, and a video game console are also examples of such a device. Still further, it will be appreciated that one or more aspects of the present invention are contemplated for use with financial transactions, as the increased security that can be provided by VDR is advantageous to these transactions.

Network Data Transfer

It will be appreciated that the transmission of data over the Internet, or one or more similar networks, often utilizes precious server processing, memory, and bandwidth, as the data is often delivered from, or processed at, a server. In implementations in accordance with one or more preferred embodiments of the present invention, some of this server load is mitigated by use of a direct connection between two end-user devices, such as, for example two end-user devices having virtualized routing capabilities as described hereinabove. Preferably, packets are then routed between the two end-user devices without passing through a conventional server.

Figure 7:
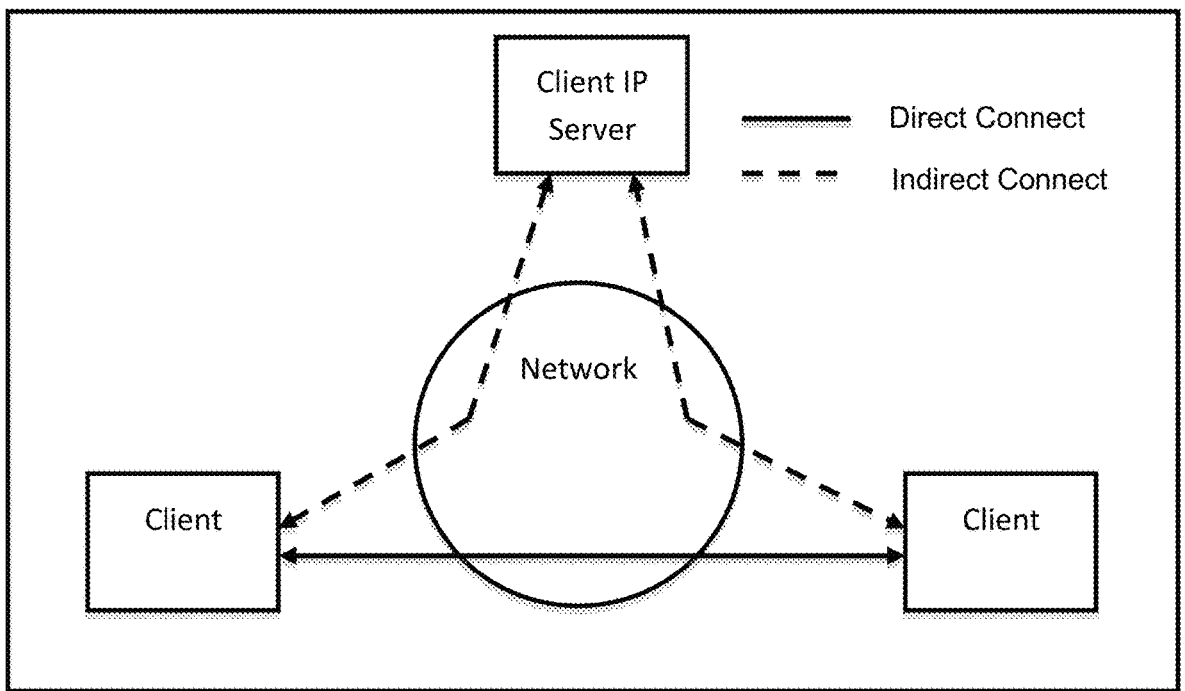
FIG. 7 illustrates a direct connection between two clients facilitated by a control server in accordance with one or more embodiments of the invention.

Notably, however, although transferred data packets do not pass through a server, a server may still be utilized to establish, monitor, and control a connection, as illustrated in FIG. 7. Specifically, FIG. 7 illustrates two clients and an IP server which determines that the clients are authorized to communicate with one another, and which passes connection information, to the clients, that is utilized to establish a direct connection between the clients. Importantly, the IP server is not involved in this direct connection, i.e. data transferred via this direct connection is not routed through or processed by the IP server, which would require the use of additional resources of the IP server. Issues that must be resolved in establishing a direct connection include the traversal of NATs (network address translations) and firewalls, LAN and WAN efficient networking, security, robustness, and hand-off.

Figure 8:
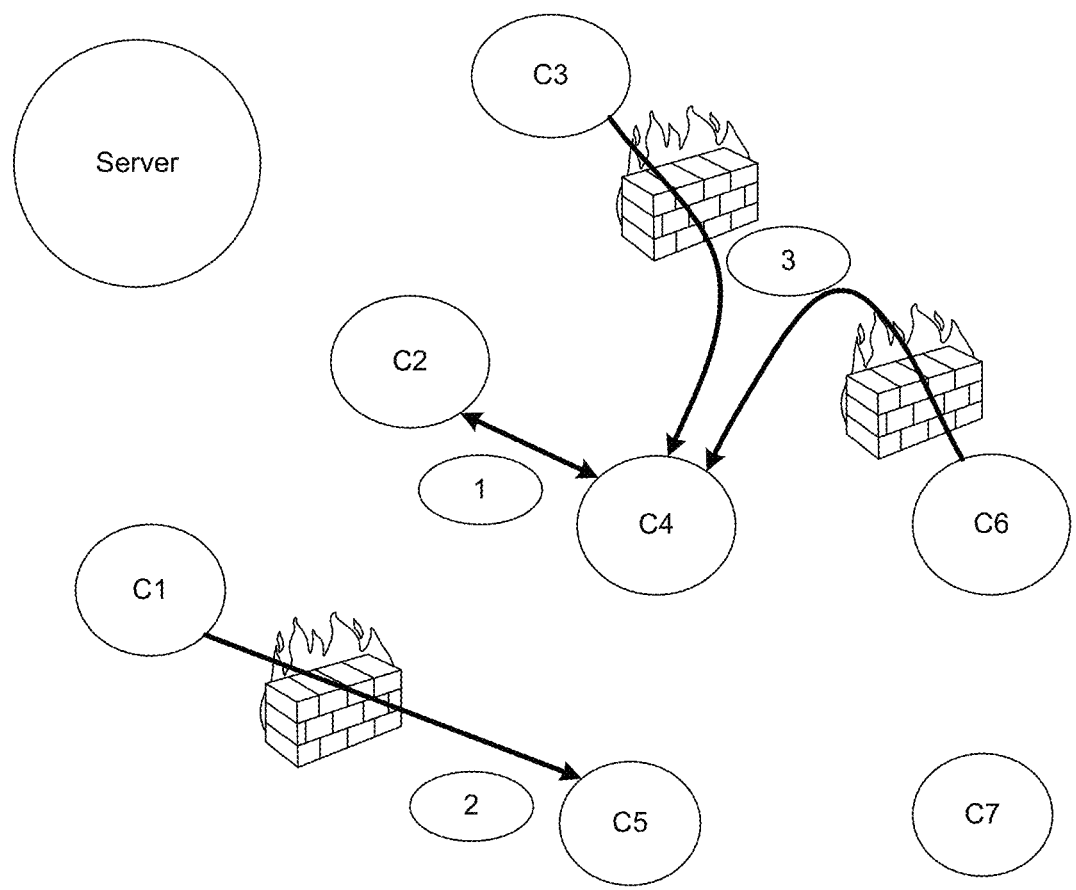
FIG. 8 is a block diagram, of a plurality of nodes, illustrating three scenarios that might be encountered in setting up a direct connection between nodes, or clients, of a peer-to-peer network in accordance with one or more embodiments of the invention.

For example, with respect to firewalls, it will be appreciated that, in some networks, a firewall may be set up to prevent an end-user device from accepting connections from incoming requests. In this regard, there are three basic scenarios that can occur. FIG. 8 is a block diagram, of a plurality of nodes, illustrating the three scenarios that might be encountered in setting up a direct connection between nodes, or clients, of a peer-to-peer network.

In a first case (scenario 1 in FIG. 8), there is no firewall obstruction. In this first case, either client can initiate a connection for the direct connection, as both clients are allowed to accept a connection. In this case, the client initiating communication, e.g. a file transfer, will preferably request the connection, connect, and start the communication, e.g. transfer the file.

In a second case (scenario 2 in FIG. 8), one (but not the other) of two clients to be involved in a direct connection has a firewall obstructing the connection. In this case, the client behind the firewall must initiate the connection. For example, in preferred implementations utilizing an IP server, a client that is obstructed from accepting a connection is instructed by the IP Server to initiate a connection to the client that is not obstructed by a firewall.

In a third case (scenario 3 in FIG. 8), both clients have firewalls obstructing the connection. In this case, a software router (sometimes referred to hereinafter as an "SWRT"), or software switch or "cross connect," is used to accept a connection of the two clients and pass packets through to the clients. Preferably, a software router truly acts as a switch, and does not modify the payload as it passes the packet through.

A software router can reside on a client or a server. In various preferred implementations, a software router can be selected according to a variety of methodologies. For example, in some implementations, software routers residing on clients are preferably utilized when possible to maintain scalability. In some implementations, a software router residing on a client that is on a contact list (as described in more detail hereinbelow) of a connecting client is preferably utilized at times. In some implementations, a software router residing on a server is preferably utilized at times, for example for security reasons. In some implementations, a software router residing on a client that is unrelated to a communication that is to be made is used at times, for example for efficiency or anonymity. In at least some preferred implementations, multiple software routers are utilized to split up packets and reduce resources utilized at any particular software router client.

In at least some preferred implementations, a software router is implemented utilizing field programmable gate arrays (FPGAs) or other specific hardware designed to implement such cross-connect functionality.

Figure 9:
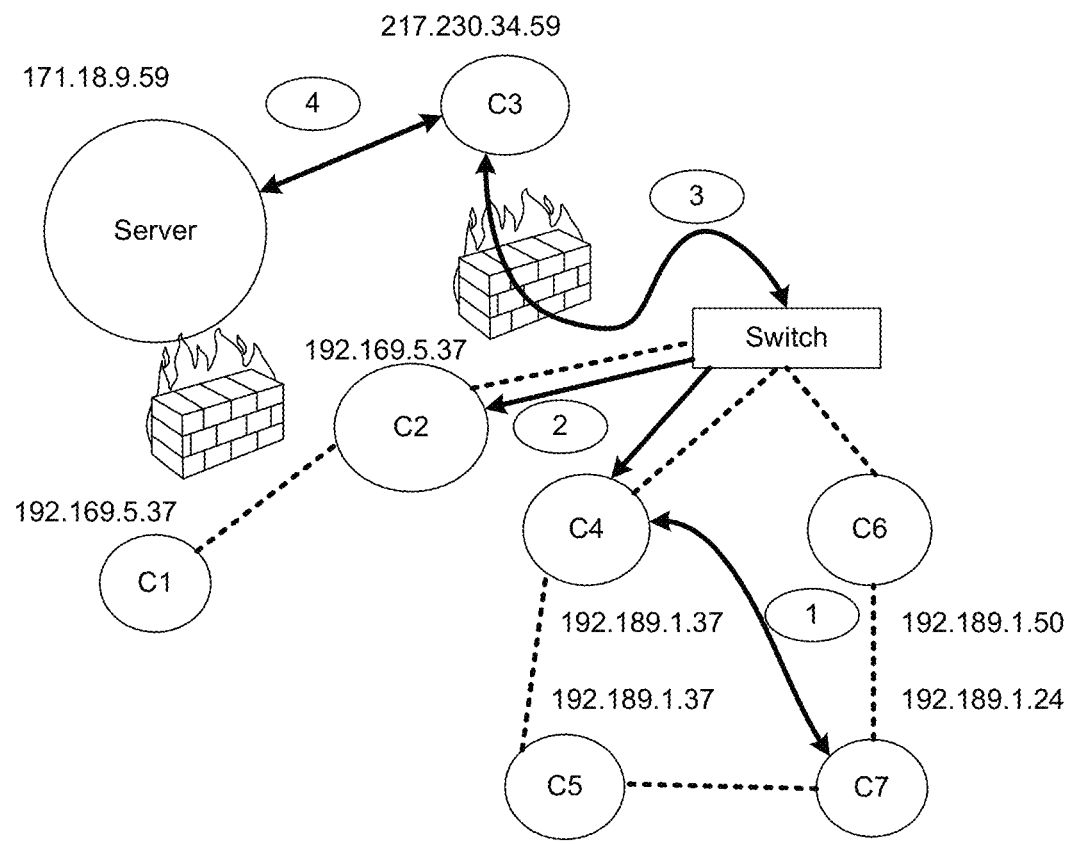
FIG. 9 is a block diagram, of a plurality of nodes, illustrating how communications can occur between clients that are on the same or different subnets in accordance with one or more embodiments of the invention.

In some cases, a first client communicating, e.g. sending a file, to a second client may be behind the same firewall as the second client. In this case, the most efficient solution would be for the communication to happen directly over the LAN to which the two clients are connected. Although other configurations are possible, the two most common cases are clients that are on the same or different subnets. FIG. 9 is a block diagram, of a plurality of nodes, illustrating each of these cases.

With respect to the case where two clients are on the same subnet, preferably a communicating client will compare its internal and external IP addresses to a target client's internal and external IP addresses to determine that an internal connection is possible. In one or more preferred implementation, such internal and external IP addresses are preferably extracted when a client contacts a server to provide login and presence data (described in more detail hereinbelow), and updated contact list information is preferably downloaded as well. If a client determines that an internal connection is possible, such an internal connection will preferably be utilized as it will frequently be the fastest since no external equipment is needed to complete the communication.

With respect to the case where two clients are on different subnets, a communicating client preferably utilizes internal and external IP addresses (obtained from the server) to determine if the client can communicate directly with a target client, or if a software router needs to be utilized. If it is determined that a software router needs to be utilized, the client preferably first attempts to locate another client inside the LAN to act as a software router, then chooses other clients that might be outside the LAN to provide a connection. In at least some preferred implementations utilizing multiple routing protocols (such as, for example, Optimum Shortest Path First (OSPF)) to provide routing capabilities at the client, the client would be able to traverse the different subnets and provide a direct connection.

A preferred system for such a described direct connection includes one or more end-user devices having client software loaded thereon, an IP server, or control server, having server software loaded thereon, and one or more networks (such as, for example Internet, Intranet or Extranet supported by Ethernet, Mobile Phone data networks, e.g. CDMA, WiMAX, GSM, WCDMA, LTE, and others, wireless networks, e.g. Bluetooth, WiFi, and other wireless data networks) for communication.

In a preferred implementation, client software installed at an end-user device is configured to communicate with an IP server, which associates, for example in a database, the IP address of the end-user device with a unique identification of a user, such as an email address, telephone number, or other unique identification. The client then periodically "checks in" with the IP server and conveys its IP address to the server, for example by providing its IP address together with the unique identification of the user. In a preferred implementation, this checking in occurs when the client is "turned on", e.g., when the end-user device is turned on or when the client software is loaded, as well as when the IP address has changed, and/or upon the occurrence of any other network event that would change the path between the client and server, and/or in accordance with other configured or determined events, times, or timelines, which may be user-configurable.

By virtue of the process of collecting, and updating, the current IP address of a user, other users may communicate with that user as the user moves from place to place. The IP server thus acts as a registry providing updated IP addresses associated with users. This capability also enables multiple device delivery of content to multiple end-user devices a user designates or owns.

This checking in and maintenance of information at a server allows for the maintenance of presence information for end-user devices. In one or more preferred implementations, such presence information, and/or address information and unique identification are also maintained at other end-user devices via use of a contact list. In a preferred implementation, an end-user device can utilize a contact list comprising contacts, each of which might be associated with a particular end-user device and/or a particular unique identification of a user. When a client checks in with a server, information regarding each of its contacts, e.g., presence information or address information, can be automatically downloaded to the client.

In a preferred implementation, clients can log into and out of servers, or a service comprising a plurality of servers, and one or more servers keep track of login and logout states of clients. These login and logout states for a particular client can also be communicated to other clients having that particular client on their contact list.

Just as a server can share client information with another client, a client can share information regarding a different client with a server. In a preferred implementation, if a client communicates with another client and receives updated information regarding that other client, it may then communicate such updated information to a server, which, in at least some preferred implementations, may obviate the need for such other client to check in with the server.

Figure 10:
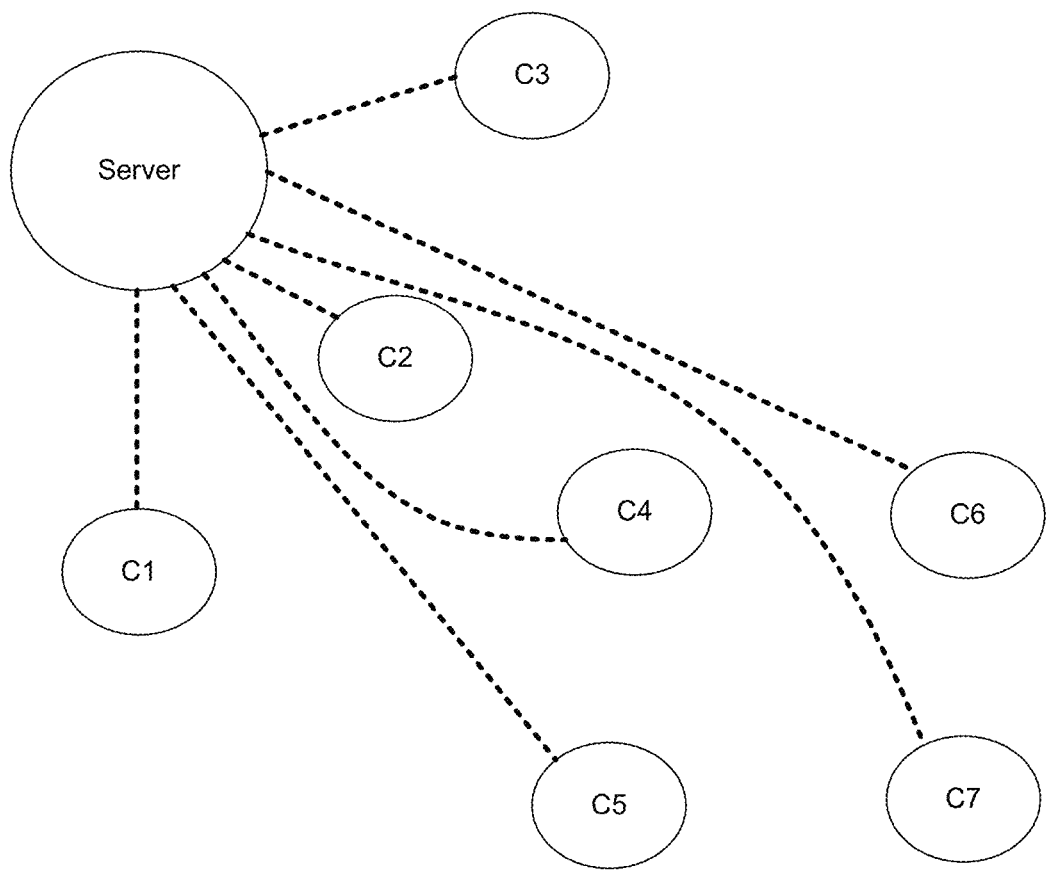
FIG. 10 is a block diagram of an exemplary network comprising a server and seven clients in accordance with one or more embodiments of the invention.

FIG. 10 is a block diagram illustrating an exemplary network comprising a server and seven clients (C1-C7). In FIG. 10, each client first logs in to the server. Once login has been authenticated, the contact list for each client is updated with current information from the server. Each client keeps detailed contact information in a local database about how to communicate with each client in its contact list. The information included in the database comprises IP addresses (internal and external), net masks, available ports, and other pertinent networking information.

Figure 11:
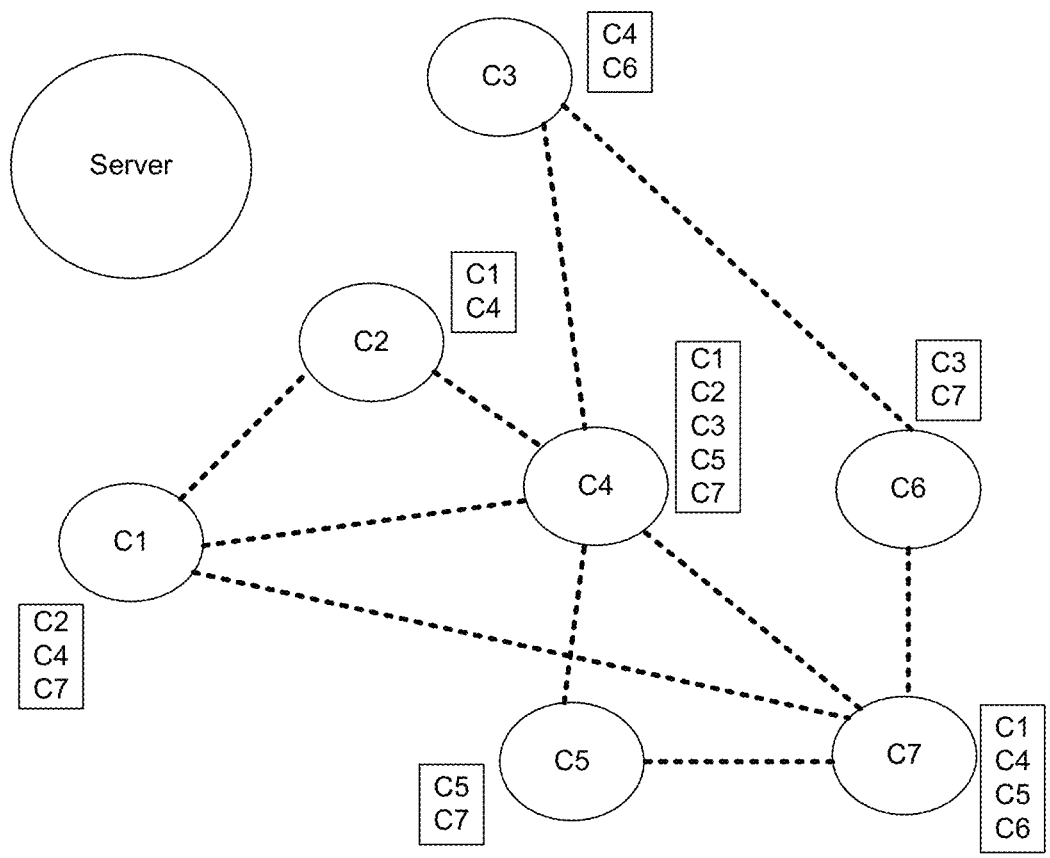
FIG. 11 is a block diagram illustrating exemplary communications between clients in the network of FIG. 10 following login and authentication in accordance with one or more embodiments of the invention.

Since each client knows how to communicate with the other clients in its contact list, it maintains presence information for these other clients. FIG. 11 is a block diagram illustrating exemplary communications between clients in the network of FIG. 10 following login and authentication. Preferably, information regarding the clients is communicated to the server periodically by the clients to keep the server updated. In a preferred implementation, each client is configured to communicate information, e.g., presence information, regarding other clients in its contact list.

Figure 12:
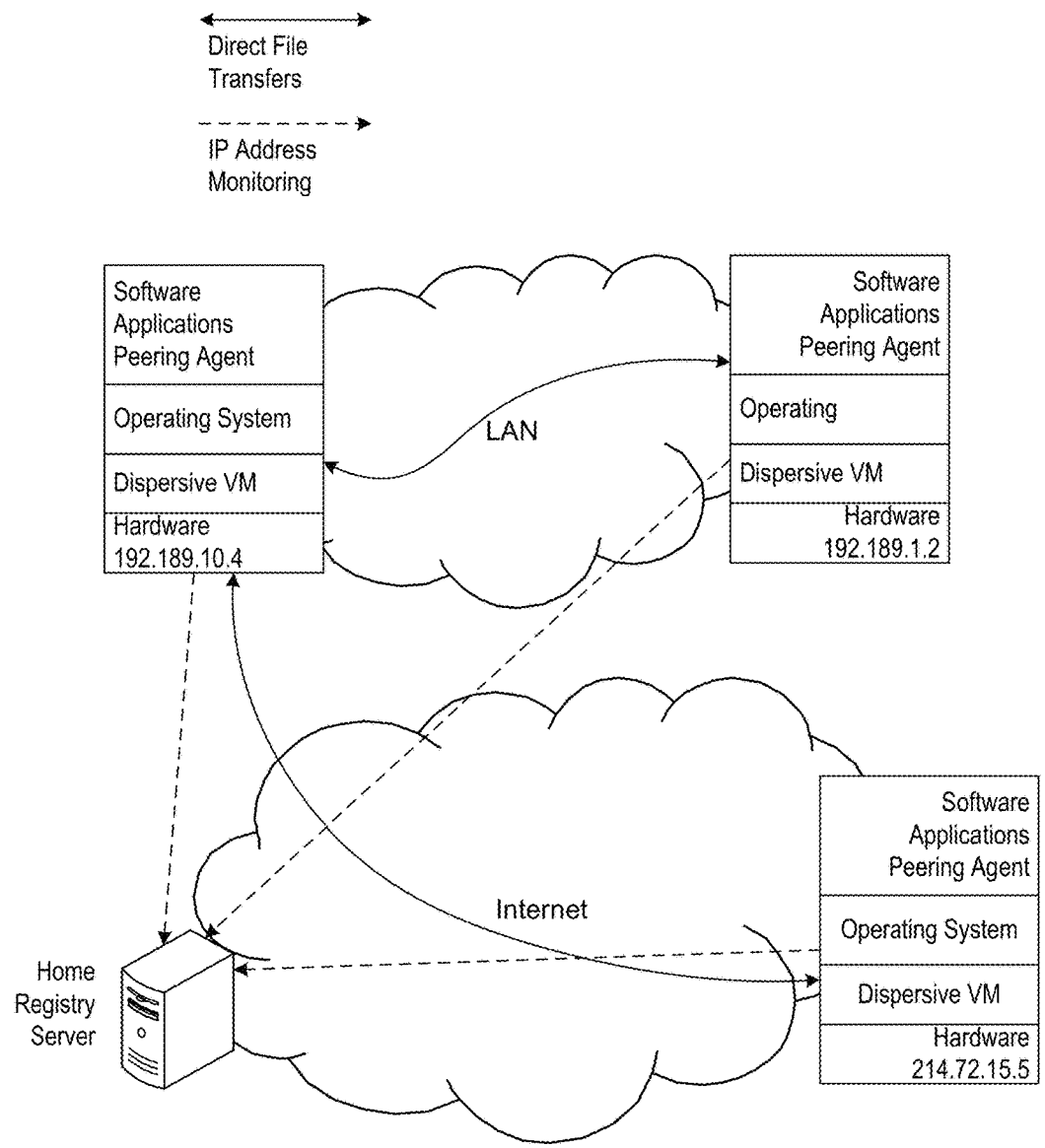
FIG. 12 is a block diagram illustrating a server functioning as a home registry server in the context of file transfers between clients in accordance with one or more embodiments of the invention.

Preferably, the server maintains comprehensive information for clients, and acts similarly to a Home Locator Registry (HLR) for a mobile phone system. Thus, when a client wants to connect to another client that is not in its contact list, the server can provide information corresponding to that other client, although in at least some implementations yet another client might instead provide that information. In some preferred implementations, the client requesting a connection can then add the other client to his contact list. FIG. 12 is a block diagram illustrating such a server functioning as an HLR in the context of file transfers between clients.

Because each client keeps detailed contact information, in a local database, about how to communicate with each client in its contact list, communication between clients can preferably still occur even if the server is not available. However, in at least some preferred implementations, if a client requests a connection to another client that is not on its contact list, the request must go to the server for authorization.

Preferably, such functionality is utilized in combination with virtualized routing capability at clients as described hereinabove. Such virtualized routing at a client can be utilized in combination with network architecture designed for a system utilizing client routing, and/or with more traditional network infrastructure.

For example, although routing protocols are commonly fixed via hardware routers on the Internet, a router on a client can enable the ability to reach multiple routers on a network. The benefit of this capability is that multiple packets can be sent along multiple paths, thereby improving the overall quality of a connection. While multiple completely independent routes can't be guaranteed, performance can be monitored to measure the benefit of virtualized routing at a client. A router at the client also enables networking over various subnets, switches and other logical networking structures. Further, protocols can be utilized that optimize local area networking such as what would be needed for Bluetooth and WiFi.

It will be appreciated that, currently, Internet communications utilize sessions, and that upon being dropped, e.g. due to a lost connection, a new session must be initialized.

By contrast, in a preferred implementation, rather than having to initiate a new session, for example upon obtaining a new IP address, a new session is created and data is transferred from the old session to the new session while maintaining the state of the old session. In this way, a near-seamless transition is presented to a user between an old session and a new session.

For example, a user might be connected via their mobile device to a WiFi connection while they are on the move. Mobile devices add a significant amount of complexity to an application. The application must worry about the movement of a user and the efficiency of an implementation to provide the user with a satisfactory experience. Mobile devices are usually equipped with a broad-band communication channel, typically provided by the carrier, via a protocol such as WCDMA, CDMA2000, GSM with EDGE, and WiMAX. Other radios, such as WiFi and Bluetooth, may also be built into the mobile device. These devices could be used to improve the overall performance of the network but are seldom combined to best utilize the available resources to create the best overall experience.

The control provided by virtual dispersive routing can be used to help solve issues that are occurring with the convergence of wireless and Internet. The Internet is a fairly static connection and must adapt to mobile situations, hand-off network connections (e.g., mobile, WiFi, Bluetooth) and power control. The use of virtualized routing at a client can help to make these transitions appear seamless to an end user.

Returning to the example of a user connected via their mobile device to a WiFi connection while they are on the move, the user might move out of range of the WiFi connection, but still be in range of a cellular connection. Rather than simply dropping their session, a new session is preferably created, and data from the old session copied over, together with the state of the old session. In this way, although the end-user device is now connected via a cellular connection, rather than via a WiFi connection, the user's experience was not interrupted.

That is, once a different connection is established using other communication protocols, a mobile hand-off can occur. Supporting soft hand-off requires that the connection is established prior to the shifting of the hand-off to ensure that data is not lost. One or more preferred implementations support multiple virtualized routing capabilities that can enable detection and establishment of connections over Bluetooth and WiFi. In the case of Bluetooth, a routing algorithm can be used to enable direct communication between people in the same room. In the case of WiFi, a routing algorithm such as OSPF can be used to enable connections between people on different subnets. WiFi could also be used to enable communication back to the "open" Internet to reduce network load on the carrier network.

In some preferred implementations, in order to maintain seamless connection for applications requiring higher service quality, such as voice and conferencing, multiple connections are preferably maintained locally and over a WAN. Once it is possible to utilize such connections, the trade-offs for cost, service quality and responsiveness can be controlled. Since routing is performed at the client, the application on the client can be used to control the priority of application packets, thereby providing a Quality of Service ("QoS") functionality. The ability to control multiple routes also contributes to the control of QoS.

More specifically, QoS pertains to the ability to give certain communications priority over other communications. In terms of the Internet, it implies that transmission rates, error rates and other networking characteristics can be controlled, improved, and to some degree guaranteed in advance. QoS is a primary concern for applications such as voice, video distribution, conferencing and other multimedia applications where bandwidth requirements can be significant. Using protocols such as Resource Reservation Protocol ("RSVP") and Common Open Policy Service ("COPS") can expedite packets through a gateway and routers based on policies implemented in advance. Unfortunately, the setup of these protocols has usually heretofore been out of reach of an application.

However, in at least some preferred implementations utilizing virtual dispersive routing, focus can be placed on using limited resources in an efficient way to provide an optimum user experience. If a user has multiple applications open simultaneously, the communication requirements of a video conferencing application can receive priority over a web surfing application, because routing is performed at the client and can take into account such application needs. Further, software routers (described hereinabove) can be utilized to replicate packets to other nodes for uplink limited clients. When quality of the link is important, additional copies of the packets can be sent multiple routes utilizing the router on the client.

Exemplary One Client to One Client Communication

As described hereinabove, virtualized routing capabilities can be utilized in direct communications between two clients. An exemplary implementation is now described in which direct connections between end-user devices having virtualized routing capabilities are utilized in a file transfer context.

Figure 13:
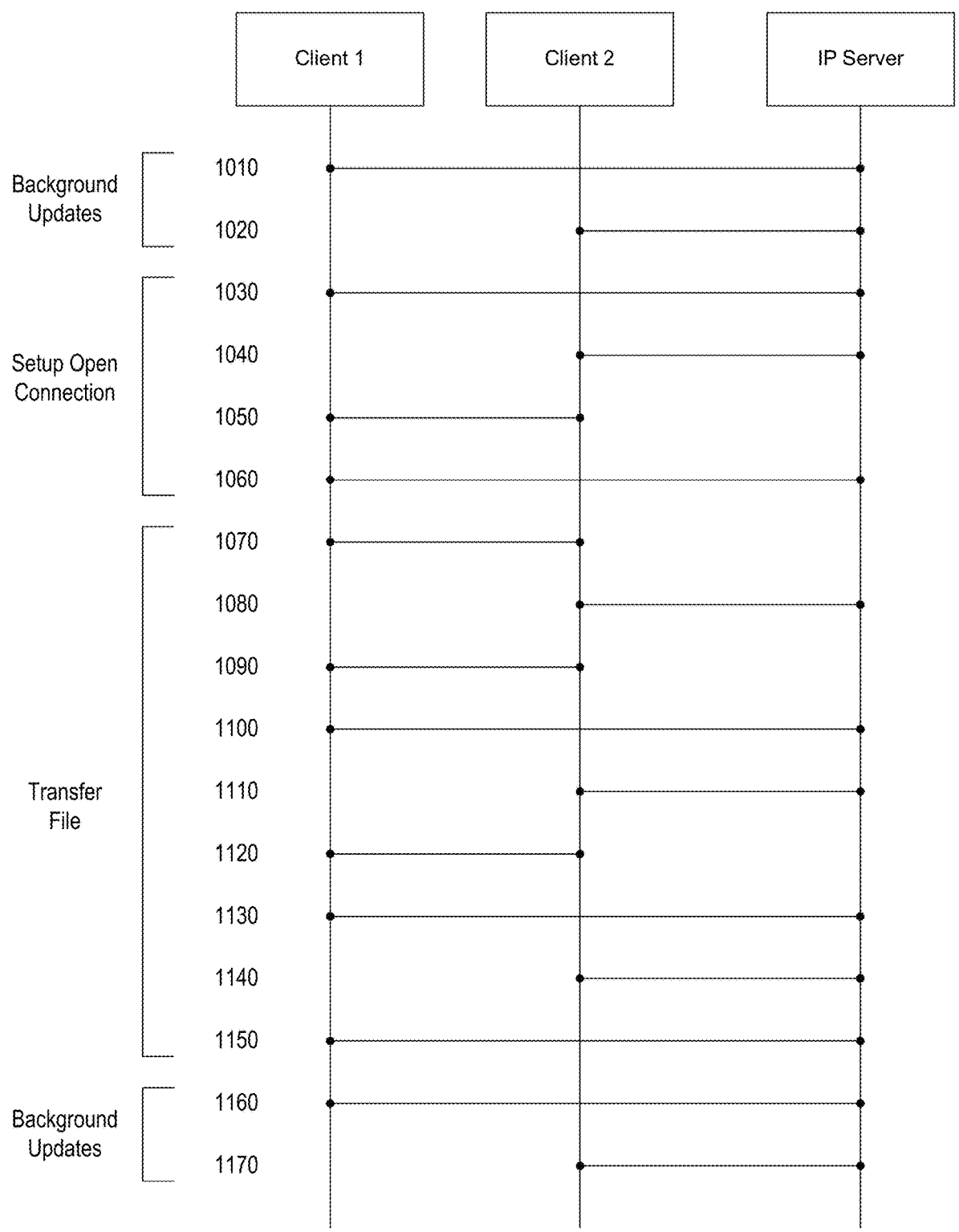
FIG. 13 illustrates an exemplary process for direct transfer of a file from a first client to a second client in accordance with one or more embodiments of the invention.

FIG. 13 illustrates an exemplary file transfer use scenario between two clients. As described above, each client is in communication with an IP server, or home registry server, for example to communicate its IP address to the IP server. Such communications are exemplified by steps 1010 and 1020.

In use, a first client communicates to an IP server a request to connect to a particular client, user, or end-user device at step 1030. The IP server, or control server, determines whether or not the other client, user, or end-user device is available, e.g. online, and, if so, looks up the current IP address or addresses associated with the specified client, user, or end-user device. If the client, user, or end-user device is either not online or has left the network, a connection failure message is sent. If the client, user, or end-user device is online, the IP server will take action based upon a pre-selected preference setting. Preferably, each user may choose to accept connection requests automatically, to require a confirmation of acceptance, or to require some other authentication information, such as an authentication certificate, in order to accept a connection request. If the connection request is accepted, either automatically or manually, the IP server enables the transfer, e.g. by communicating to the second client that the first client has a file for transfer, as exemplified by step 1040.

Preferably, the IP server notifies each client involved in the transfer of required security levels and protocols, such as, for example, hashing algorithms used to confirm that received packets have not been altered. The IP server also insures that the client software at each end-user device has not been tampered, altered, or hacked.

The clients complete a messaging "handshake" and then begin transfer of a file. More specifically, the second client requests a connection with the first client at step 1050, the first client notifies the IP server of its status, e.g. that it is beginning a transfer, at step 1060, the first client grants the second client's request at step 1070, and the second client notifies the IP server of its status, e.g. that its connection request was accepted, at step 1080. The file transfer begins at step 1090.

Periodically, both clients will update the server on the status of the download, as illustrated by exemplary steps 1100 and 1110. The server will keep track of the file transfer and compare the information received from both clients for completeness and security. Once the file transfer is completed, at step 1120, a status is sent of each client to the IP server at steps 1130 and 1140, and the connection is terminated at step 1150. The clients continue to update their availability with the IP server for future file transfers, as illustrated by exemplary steps 1160 and 1170.

It will be appreciated that because one of the problems with the TCP/IP protocol is that significant timing delays can occur between communications, using a virtual machine advantageously allows messages to be sent at the lowest levels of the stack between virtual machines of different clients, thus helping insure that communications are not delayed. Further, the inclusion of local routing capabilities enables each client to setup another communication link, if needed, for example to continue a stalled download. Further still, because preferably both clients include such routing capability, either client can reinitiate a separate communication to the other client, thus helping insure that TCP/IP packet delay timeouts do not draw out the communication.

Additionally, to facilitate more robust transfers, one of the clients can instruct the other to open other TCP/IP connections independent of the server link. For example, a first client may receive an IP address for a second client via the IP server, and the second client could then communicate additional IP addresses to the first client and communicate duplicate packets via connections established with these additional IP addresses, thus increasing the reliability of the link. Additionally, the client could send multiple packets over separate IP addresses to insure a different starting point for transmission, and thus insure unique paths. It will be appreciated that this might advantageously allow for the continuing transfer of packets even if one of the connection paths fails. Notably, each path is closed upon completion of the transmission.

Exemplary Many Clients to Many Clients Implementation

An exemplary implementation is now described in which direct connections between end-user devices having virtualized routing capabilities are utilized for data distribution, e.g., in a telecommunications context.

It will be appreciated that in some traditional applications, one or more conventional servers act to collate and process data streams, e.g., containing audio and/or video, from a plurality of clients, and then distribute the processed data to the clients. By way of contrast, in a preferred implementation, an end-user device can instead establish a direct connection with another end-user device, and communicate data directly to the other end-user device, rather communicating through a conventional server. In such implementations, this transmitted data can be directly processed by either a communicating end-user device, a receiving end-user device, or both, rather than by a conventional server.

As described above, a first end-user device can establish a direct connection, via the use of virtualization, with not just one other end-user device, but with multiple other end-user devices. The first end-user device provides each of the other end-user devices with a data stream, e.g. an audio and/or video data stream, thus effectively acting as a server by "serving" such data stream to each of the other end-user devices. For example, in a video conference context, each of a plurality of end-user devices involved in a video conference will serve its own video and audio streams, and receive video and audio streams served by each of the other end-user devices. Thus, each end-user device can be characterized as functioning as both a server and a client, possibly at the same time, i.e. as a multiplexed client/server.

Notably, however, although the end-user devices assume some functionality more traditionally assumed by a conventional server, a control server is preferably still used to oversee the establishment and maintenance of connections between end-user devices. Unlike in a traditional implementation, however, it is preferred that little to no data processing is handled at this control server, and that data streams between end-user devices are not routed through the control server.

Instead, the control server preferably primarily provides authentication and security functionality. Preferably, the control server keeps track of a unique identification of each end-user device, software loaded on each end-user device, and an IP address of each end-user device. Additionally, the control server preferably controls which end-user devices can communicate, and at what times they may communicate.

Each end-user device preferably continually provides information to the control server, including: a status of the end-user device, whether the end-user device is receiving data, whether the end-user device has lost its connection, an application status, application data, whether software at the end-user device has been tampered with, a rate of one or more communication links, and a packet error rate of one or more communication links.

Exemplary Implementation Illustrating Use with Conventional Servers

In some preferred implementations, direct connections between end-user devices having virtualized routing capabilities are utilized in combination with one or more conventional file servers, such as, for example, in a media server application. Specifically, it will be appreciated that the conventional downloading of data, such as a video file, from a server is an intensive process that utilizes precious server processing, memory, and bandwidth. In preferred implementations, some of the strain of this process is offloaded from such a conventional server to one or more end-user devices having virtualized routing capabilities. This architecture decreases the processing, memory requirements and bandwidth loads on a media or other data server. FIG. 14 illustrates the reduction in resource requirements for a file that is being downloaded from a data server when some of the strain of multiple download requests is transferred off of the data server in accordance with such preferred implementations.

Figure 15:
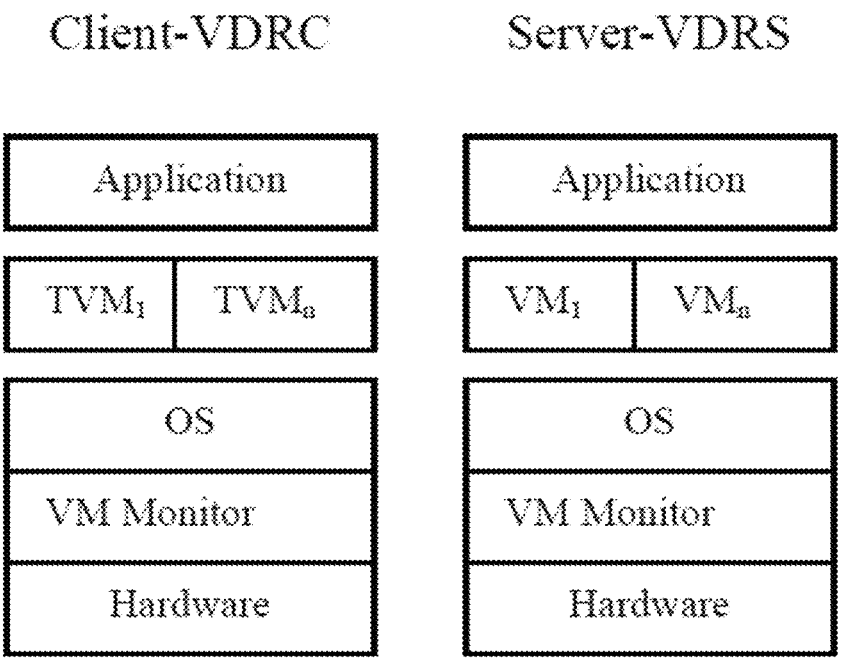
FIG. 15 illustrates client and server architectures in accordance with one or more embodiments of the invention.

In a preferred implementation, a plurality of end-user devices comprise VDR clients, and a control server comprises a VDR server, each respectively including the architecture illustrated in FIG. 15.

Figure 16:
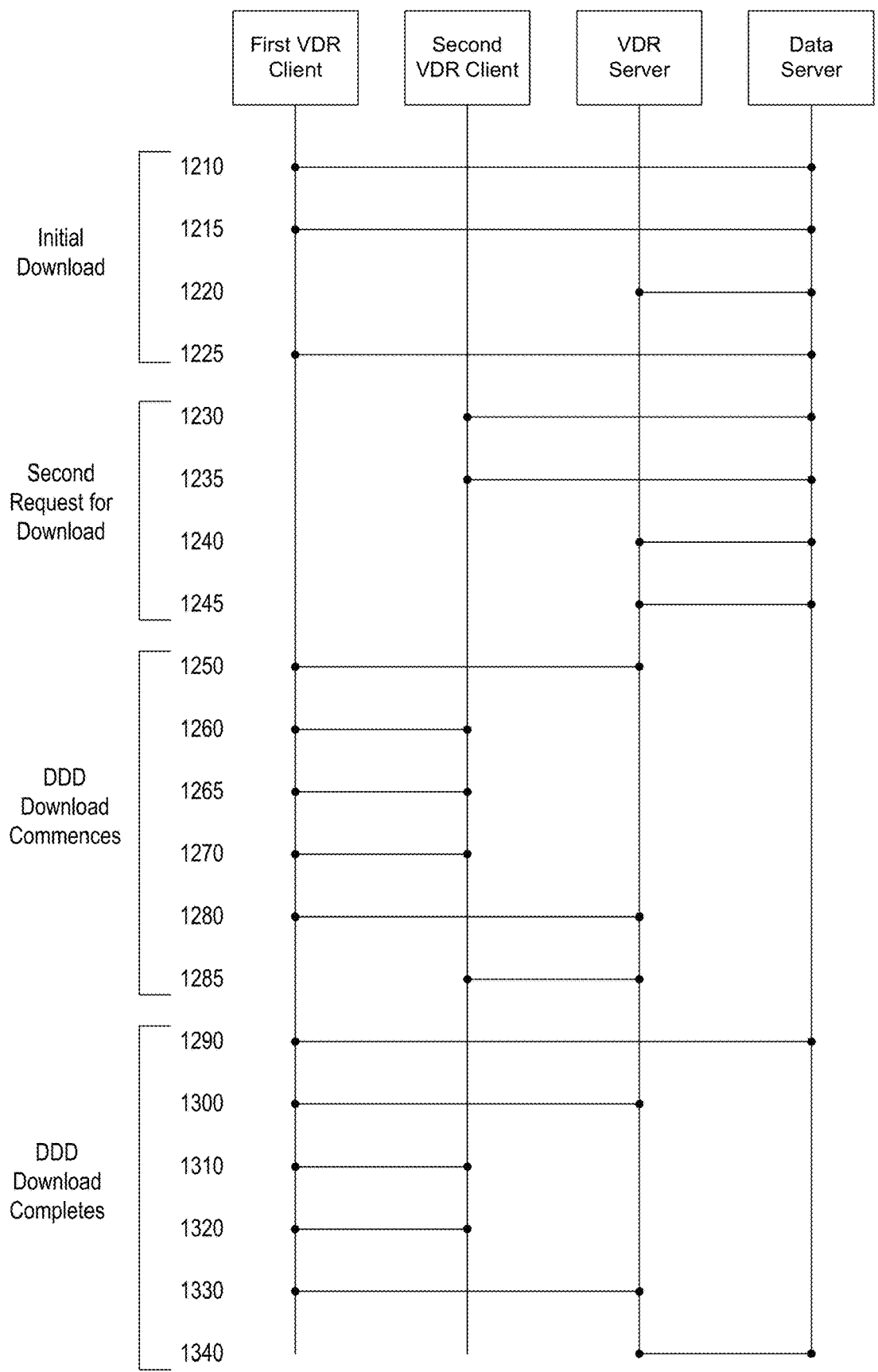
FIG. 16 illustrates an exemplary process for downloading a file to a client in accordance with one or more embodiments of the invention.

FIG. 16 illustrates an exemplary process for downloading data to two VDR clients that was originally stored on a media server and, more generically, data server. Notably, the process involves not just the two VDR clients and the data server, but also a control server, or VDR server, as well.

The process begins when the first VDR client requests download of data from the data server at step 1210, followed by a corresponding TCP/IP handshake at step 1215. Subsequently, the data server alerts the VDR server of the download at step 1220. The VDR records the activity of the first VDR client along with necessary identification and contact information for the first VDR client. The data server follows the typical download procedure and begins the download to the first VDR client at step 1225.

Thereafter, a second VDR client requests the same data from the data server at step 1230, followed by a corresponding TCP/IP handshake at step 1235. At step 1240, the data server alerts the VDR server to the download request by the second VDR client. The VDR server determines that a VDR client is active, gathers addressing information for the second VDR client, and notifies the data server that it will handle the download at step 1245. Notably, a VDR client is active as long as its connection is active. It will be appreciated that several methodologies may be used to determine how long a client stays active. In at least some implementations, a client is shut down, i.e. rendered inactive, immediately after a file is transferred, which may represent the most efficient use of resources. In a preferred implementation, a timer is utilized, and the client remains active for a user-specified number of minutes following activity. Alternatively, a client's connection could be left open until the user wants to close it, or until a network timeout occurs.

At step 1250, the VDR server communicates to the first VDR client and configures it for download capability to the second VDR client, e.g. using the obtained addressing information for the second VDR client. The second VDR client initiates communication with the first VDR client for download of the data from the first VDR client at step 1260, followed by a corresponding TCP/IP handshake at step 1265, and the download then begins at step 1270.

Notably, the first VDR client, like most clients, has bandwidth available on the uplink when downloading content. It is believed that a typical personal computer, as of the filing date of this application, can handle 3-5 uploads without significant burdening or performance degradation.

In a preferred implementation, communication between the first and second VDR clients is accomplished between "Thin Virtual Machines" (TVM) of each VDR client. Each TVM is characterized as a "thin" virtual machine because each preferably generally includes only the functionality necessary to support virtualized networking, and, preferably, optimizes the resources needed to support the virtualization of the Network Interface Card (NIC). As will be appreciated from the description hereinabove, each TVM enables each application to have a separate virtual interface to the NIC. This functionality enables customized security capabilities that can be added to each application interface individually.

At steps 1280 and 1285, the VDR clients convey status information, e.g. concerning the download, to the VDR server. At step 1290, the first VDR client completes its download of the data from the data server. The first VDR client continues the download to the second VDR client, however. While the download continues, status information is sent to the VDR server from each VDR client, as exemplified by step 1300. Further, the first and second VDR clients continue to communicate via the virtual machine interface to detect connection issues and re-route packets.

The download continues at step 1310. At step 1320, the second VDR client completes its download, and each VDR client notifies the server of such success, as exemplified by step 1330. The VDR server, in turn, notifies the data server that the download to the second VDR client was completed successfully at step 1340.

If, instead of being completed successfully, the second VDR client's download of the data had not completed, the second VDR client would have contacted the VDR server for another download opportunity.

Figure 17:
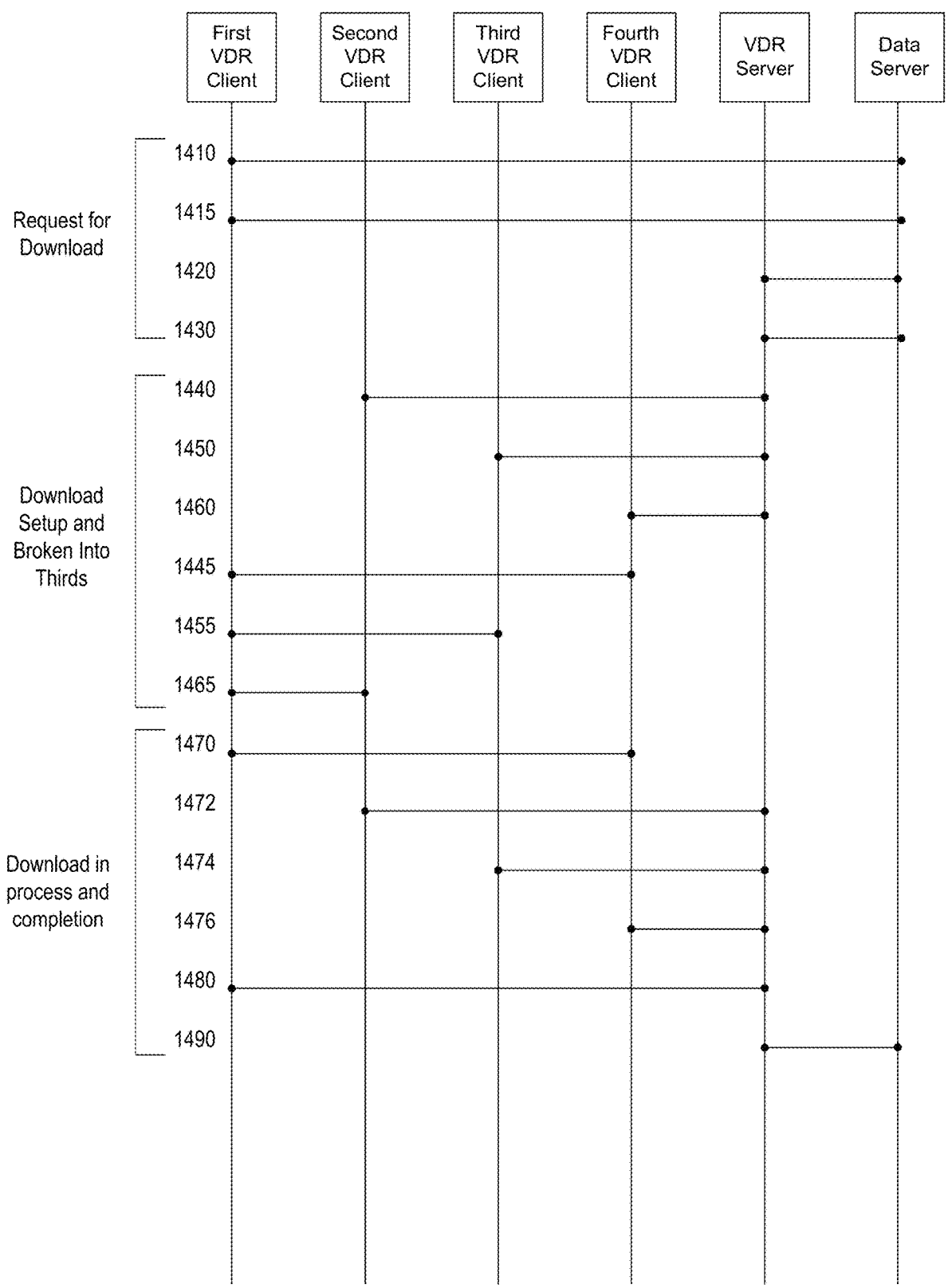
FIG. 17 illustrates another exemplary processes for downloading a file to a client in accordance with one or more embodiments of the invention.

FIG. 17 illustrates another exemplary process where, rather than downloading data from one other VDR client, data is downloaded from a plurality of VDR clients, thus increasing the speed of download.

More specifically, a data file is broken into fragments, and each fragment is downloaded to a target VDR client from a different source VDR client using a different connection. In FIG. 17, the process begins when, at step 1410, a first VDR client communicates a download request to a data server, followed by a corresponding TCP/IP handshake at step 1415. At step 1420, the data server alerts the VDR server that a download has been requested. The VDR server determines that multiple VDR clients are available to download the requested data from, and, at step 1430, the VDR server informs the data server that it will handle the download request. At steps 1440, 1450, and 1460, respectively, the VDR server communicates to second, third, and fourth VDR clients and passes addressing information corresponding to the first VDR client to each. The VDR server assigns each VDR client the portion of the data file that that VDR client will download to the first VDR client.

The first VDR client then downloads, at steps 1445, 1455, and 1465 respectively, the assigned portions of the data file from each of the other VDR clients. As exemplified by illustration of steps 1470, 1472, 1474 and 1476, each VDR client reports, to the VDR server, status information on any downloads it is a part of, to ensure each download is progressing as planned. If a connection is lost, the VDR server can act to correct the problem. Once the first VDR client has completed the download of the data file, it communicates such completion to the VDR server and each other VDR client, as exemplified by illustration of step 1480. Subsequently, the VDR server notifies the data server that the download was completed at step 1490.

Security

As described herein, in one or more preferred implementations, virtualization of networking is utilized. Virtualization of networking comprises using a virtual machine to intercept packets as a computing device receives packets from network interface hardware. The use of a virtual machine provides several advantages, such as intercepting packets prior to such packets being sent to an application for analysis, providing an earlier point for encryption to be employed at a device to device level, and enabling a swap/recovery mechanism if packets are being hacked.

Figure 18:
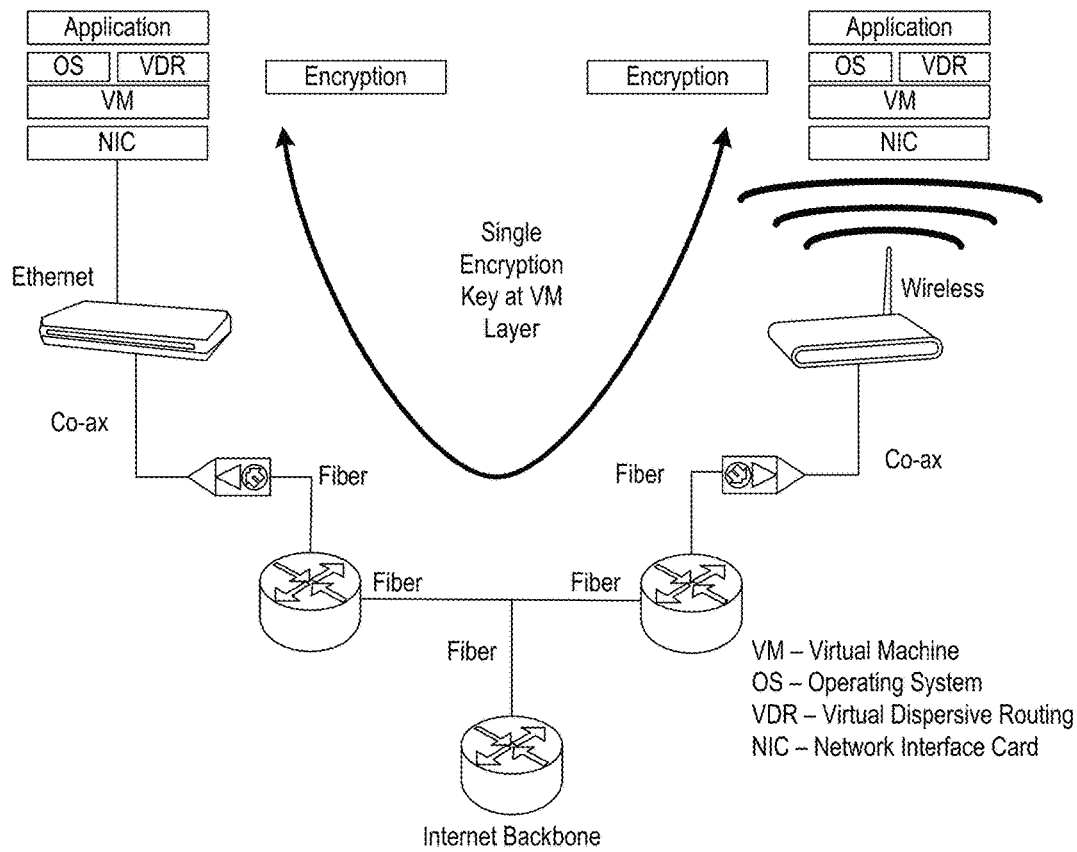
FIG. 18 is a block diagram illustrating an implementation of end to end encryption below the operating system level in accordance with one or more embodiments of the invention.

In some preferred implementations, a virtual machine on a client can also message at layer two of a network stack to another client's virtual machine. This enables synchronization of the communication state machines and additional authentication opportunities. Such device-to-device connection provides the architecture to implement end-to-end encryption below the OS level, as illustrated in the block diagram of FIG. 18.

Preferably, in at least some implementations, clients at end-user devices are alerted by a control server of an impending transfer and utilize a secure protocol such as public key encryption, AES (Advanced Encryption Standard), or SSL (Secure Socket Layer). Packets to be transferred are preferably intercepted by a virtual machine of a first client, prior to being sent to the network interface of that client, and encrypted. Following receipt, the packets coming out of the network interface are then intercepted by a virtual machine of the other client and decrypted.

Preferably, strong security is achieved by employing a single encryption key that is passed between the two end-user devices controlled at layer 2 and 3 of the OSI (Open Source Interface) stack model. Regardless of whether the file is transported via Ethernet, WiFi, mobile phone data networks, or other wired or wireless technologies, the file is protected since it is decrypted at the router level of the destination before the data is passed to the application.

Verifying the authenticity of a received file is an important capability. When files are transferred from one device to another, the files are subject to many network attacks that include Sybil attacks, man-in-the-middle attacks, and other Internet cyber attacks. Due to issues such as source routing and IP spoofing, routers have been set up to be anonymous as they pass packets, but it also makes them susceptible to cyber attacks.

In addition to enabling the use of such end-to-end encryption, the utilization of virtual machines enables "beneath OS" control, so that application updates do not modify software that could compromise an application, and encapsulation at the application level enabling separate network connection capabilities.

Further, because virtual dispersive routing in accordance with one or more preferred implementations can affect the path a communication takes to a destination, a network watermark can be created that takes into account path, timing, number of hops, host IDs, bandwidth, and other networking characteristics. These characteristics can be communicated via virtual machine communication, attached to packets, or sent to a server for recording. Verification of a proper network watermark can be used to determine whether or not to accept a transfer or authenticate a source and destination. In one or more preferred implementations, network watermarks are utilized in accordance with the disclosure contained in USPA Pub. No. 2009/0316682, which is hereby incorporated herein by reference.

Figure 19:
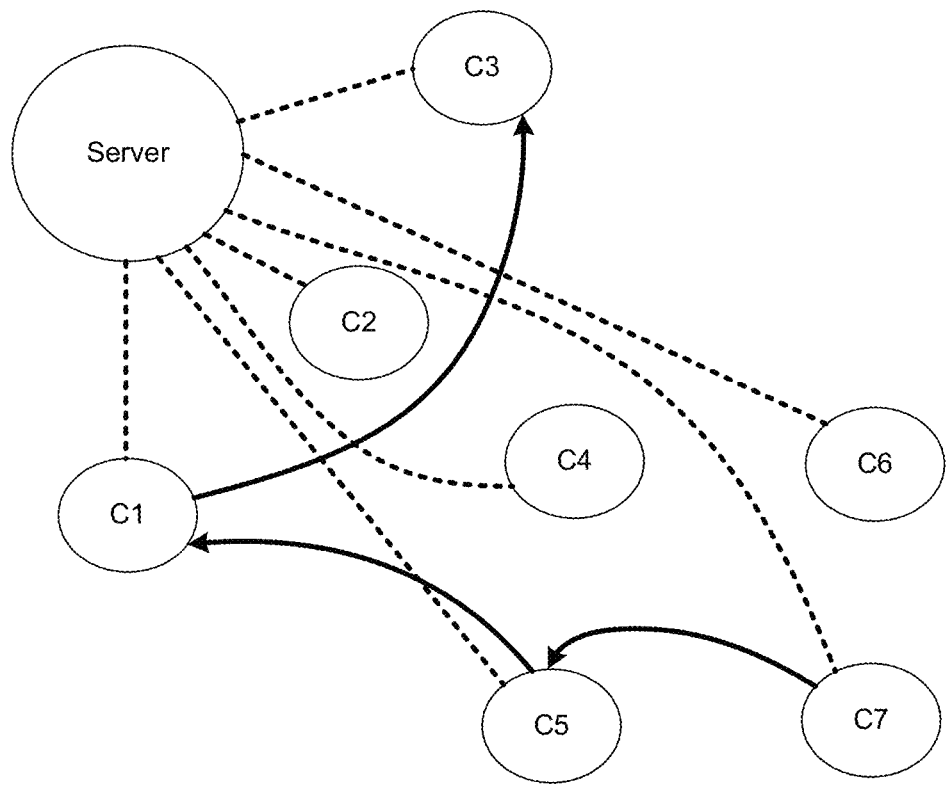
FIG. 19 is a block diagram of an exemplary network illustrating a network communication sent from client C7 to client C3 along a network path including clients C5 and C1 in accordance with one or more embodiments of the invention.

FIG. 19 is a block diagram, of an exemplary network, illustrating a network communication from client C7 to client C3 which passes through clients C5 and C1. As illustrated therein, a network watermark representing this communication may include a record of nodes the communication passes through, ports used for communication, and the time it took for each communication between nodes.

In some preferred implementations, network watermarks are utilized to enable an independent node to verify that a file transfer has taken place. In some preferred implementations, use of network watermarks also is utilized to confirm that a file has not been corrupted and that varying ports and IP addresses have been used to secure a file transfer. Preferably, network watermarks can be monitored during a transfer at the virtual machine level, thus providing an added level of security. Further, in some preferred implementations, if software is modified on either a sending node or a receiving node, independent nodes can preferably still verify that a transfer occurred and provide an independent record as proof of transfer.

Virtualization of routing at a client also enables the ability to trap hacking and rogue activity. For example, if a hacker attacks the client, the encapsulation provided by use of a virtual machine can be utilized to minimize the damage and enable a "hot swap" of a virtual connection. In some preferred implementations, a connection can be swapped in less than 300 ms. Such a hot swap enables a client to continue to communicate to a target client while also enabling the hand-off of a tampered connection to a server for analysis.

Figure 20:
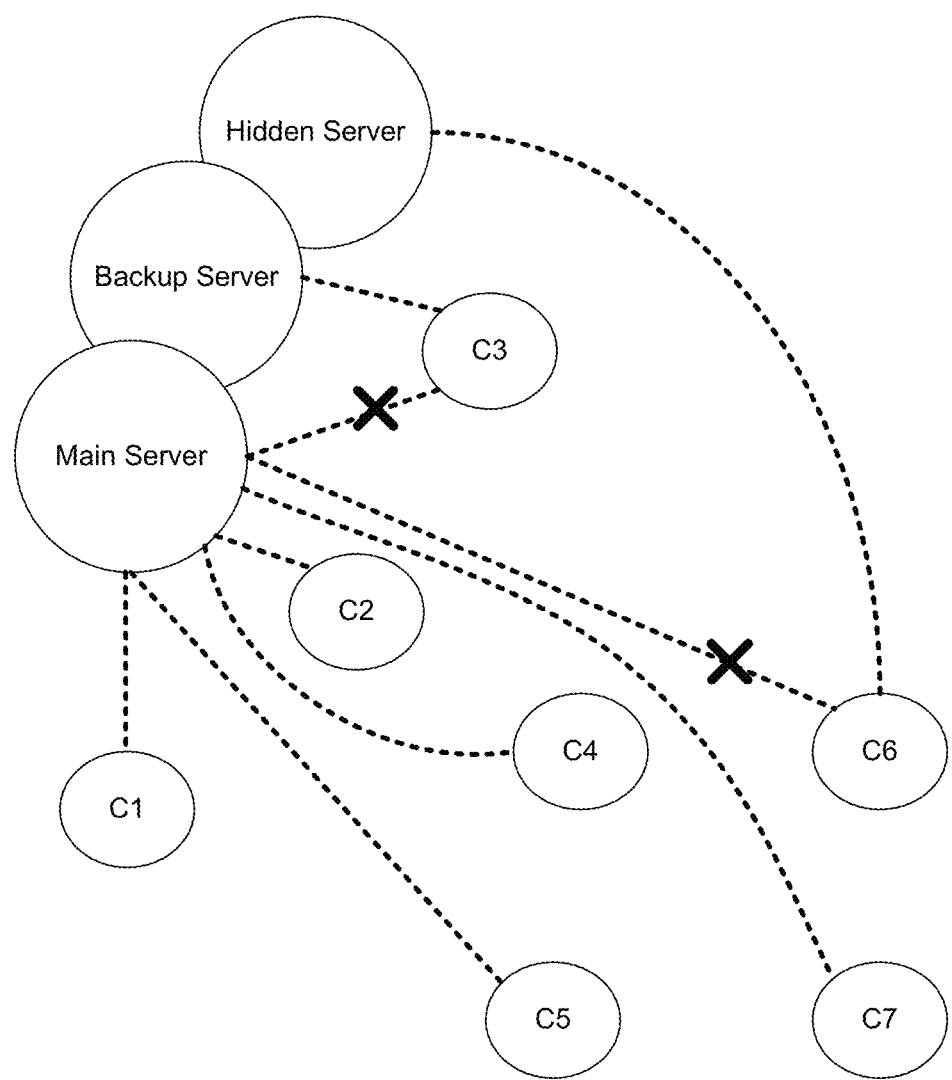
FIG. 20 is a block diagram of an exemplary network comprising a main server, a backup server, and a hidden or unlisted server, as well as clients C1 through C7, in accordance with one or more embodiments of the invention.

Similarly, virtualization provides advantages in communications with a server as well. It will be appreciated that server-centric solutions are vulnerable to Denial of Service ("DoS") attacks, Distributed Denial of Service ("DDoS") attacks, and other network attacks. An exemplary scenario illustrating one or more such advantages will now be outlined with reference to FIG. 20, which is a block diagram of an exemplary network comprising a main server, a backup server, and a hidden, or unlisted, server, as well as clients C1 through C7. In use, the main server may become too busy, for example due to a network attack, and, thereafter, connections may be denied by the main server since it is too busy to service requests. In at least some preferred implementations, based on application needs and the types of attacks, a node like C3 could immediately communicate to the backup server to continue its application after it is unable to communicate with the main server. Similarly, C6 could be instructed to communicate with the unlisted server after it is denied service with the main server.

When hackers attack a client, they tend to exploit incorrect configurations, errors in update release and other anomalies. In some cases they will even utilize "backdoors" left from previous attacks. Detecting hacking is not easy, especially for inexperienced or non-technical users. The ability of a virtual machine to intercept packets prior to delivery to an application can represent a unique advantage in at least some implementations. For example, hashing and encryption algorithms can be run to determine if packets have been modified. If a "hack" is suspected on a connection, the connection can be isolated and re-routed to a server that analyzes the hack in real-time. Since routing is virtualized at the client, the client can communicate to the other virtual machine with which it was communicating that it is changing its IP address and can re-establish another connection automatically.

Figure 21A:
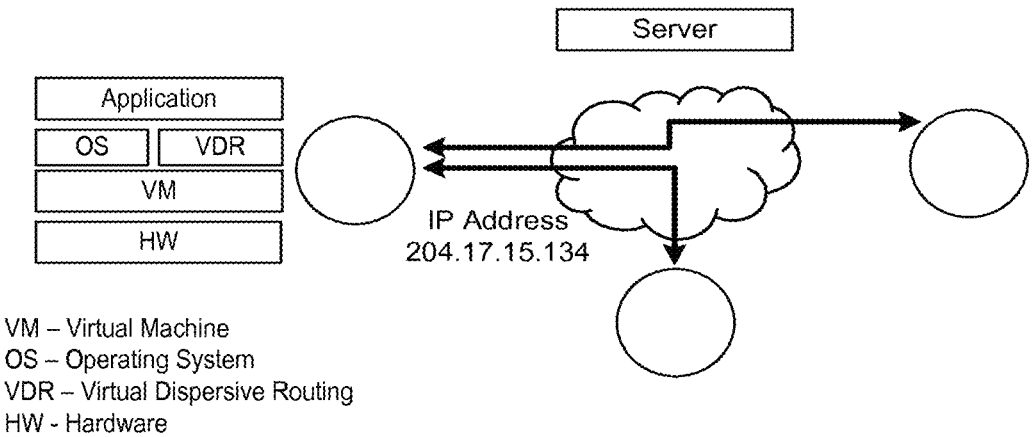
FIGS. 21A and 21B are block diagrams of an exemplary network illustrating a process in which a client communicates to another client with which it was communicating that it is changing its IP address and in which it re-establishes another connection automatically.
Figure 21B:
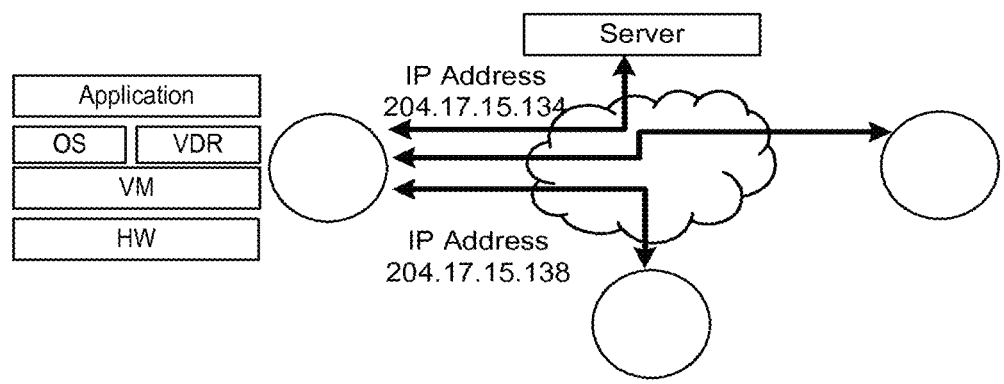

FIGS. 21A and 21B are block diagrams of an exemplary network illustrating such a process. Initially, as illustrated in FIG. 21A, a first client device utilizing virtualized routing is communicating with a second client device that is also utilizing virtualized routing. The communications to the first client for the connection with the second client are targeted at IP address 204.17.15.134. Thereafter, as illustrated in FIG. 21B, the first client detects a potential attack through that connection, and initiates a second connection with the second client utilizing IP address 204.17.15.138. The client additionally reroutes the suspect connection associated with IP address 204.17.15.134 to a server for analysis.

Figure 22A:
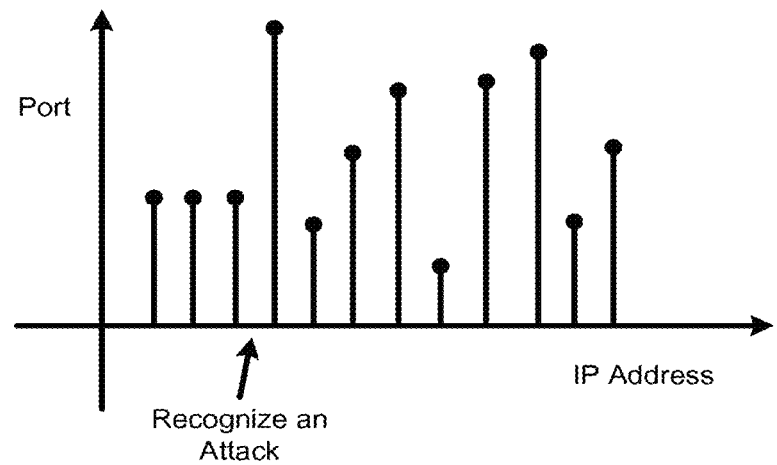
FIGS. 22A and 22B are graphical representations illustrating how IP addresses and ports for communications with other devices can be varied, in a manner analogous to frequency hop radios, in virtualized dispersive routing implementations of one or more embodiments of the invention.
Figure 22B:
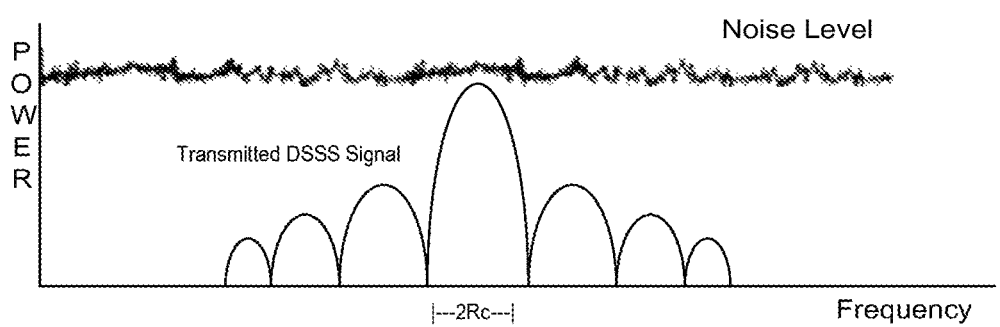

Such varying of IP addresses, and ports, for communications with other devices can be utilized in virtualized dispersive routing implementations in a manner analogous to frequency hop radios. FIGS. 22A and 22B illustrate the similarities. For example, client devices configured to function as multiplexed client servers can utilize synchronized IP hopping and port spreading.

Lastly, although systems, methods, and apparatus are described herein largely in the context of end-user devices having virtualized routing capabilities, it will be appreciated that at least some implementations may be practiced in the absence of such virtualized routing capabilities.

Notably, virtualized routing capabilities, such as, for example, those presented by a VDR client, may be advantageous even in communicating with a client that does not enjoy such capabilities, e.g., a non-VDR client. In a preferred method, a VDR client in communication with a non-VDR client searches incoming packets for viruses or other anomalies, and, if such other anomalies are found, the VDR client can break off communications and re-establish a new connection.

Network Architecture

In one or more preferred implementations, virtual dispersive routing is utilized in a peer-to-peer (P2P) context, either alone or in combination with other P2P technology, to achieve desired platform performance, e.g., to take P2P networking to a whole new level of efficiency, performance, security and privacy. For example, as described herein, this combination of technologies can reduce or eliminate the need to go outside a LAN, and provide direct communication between devices. Further, such combination can enable single key encryption from client to client at a virtual machine layer, provide control over QoS by enabling independent routing possibilities, provide an ability to support multiple communication interfaces such as WiFi, mobile, and Ethernet simultaneously, enable performance of dynamic hand-off capabilities, and provide support of secure and private communications.

In some preferred implementations, routers are utilized which interface with clients and servers so that they can take advantage of more efficient routing topology. Further, in some preferred implementations, hardware is utilized that includes virtualization hardware, e.g. virtualization hardware built into CPU chipsets. Further still, in some preferred implementations, multiple processors are utilized such that one or more processors can be utilized to run complex routing algorithms. In one or more preferred implementations, hardware representing combined router and server hardware is utilized. In some preferred implementations, protocols are utilized that are less "chatty" when in wireless mode.

It is believed that many of these advantages arising from use of dispersive networking would make material improvements in Facebook and other social networking phenomena that are utilized by hundreds of millions of users on the Internet.

Smart Grid Implementations

Modern utility networks, and particularly electrical distribution systems, are making increased use of digital and other technology. For example, electricity may be delivered from suppliers to consumers using two-way digital communications to control appliances at the consumers' residences. Such a system, sometimes referred to hereinafter as a "smart grid," delivers energy more efficiently, reduces costs, and increases reliability as compared to conventional systems. A smart grid may overlay the ordinary electric grid with networked metering systems, controllable sensing, measuring and actuating devices, and control of energy using devices to support energy independence, global warming and emergency resilience issues.

When a smart grid is utilized, its integrity is critical to the economic and social stability of the country. If the smart grid is hacked, significant damage can be inflicted on the physical grid, on the economy and to the confidence of the people who use it. A secure and efficient network that maintains control at the individual components of the smart grid helps to ensure that a catastrophe can be avoided.

In one or more implementations, direct connections between end-user devices having virtualized routing capabilities are utilized in a smart grid context. Currently, control of the electric grid is spread among the various power companies and their consumers. If a smart grid is centrally controlled, outside forces could gain control of the electric grid and shut it down or attempt to damage it. To maintain this balance, the use of virtual dispersive routing and networking securely distributes control of the consumer residence appliance between the power supplier and the consumer.

In particular, virtual dispersive routing and networking can provide direct control of the consumer appliances. As described more fully elsewhere, including in FIG. 18, separate virtual machines may be used to create a safe area and safe networking environment that can be accessed via a separate IP address and/or port. Applications from the suppliers can control the consumer appliances but with override capabilities still provided to the consumers. Virtual dispersive routing and networking can provide the ability of the appliance controls to determine if a server has connected to the appliance or if a consumer connected directly to it. In at least some implementations, the secure direct connection is provided by signaling from a virtual thin client that primarily includes, in addition to a virtual machine, a signaling mechanism and other networking features. Thin virtual machines and clients making use of thin virtual machines are described elsewhere herein. Other levels of access can be supplied for maintenance and other services. The secure direct connection enables the Consumer to safely connect to the appliance. A button can be pressed on the appliance to enable the connection from the Consumer.

Consumers may access and control the appliance, which has a built-in communications system such as Bluetooth, WiFi, mobile phone, Ethernet or other networking capability, via a secure direct connection. It will be appreciated that VDR may preferably be used to facilitate such connection and communication.

Figure 24:
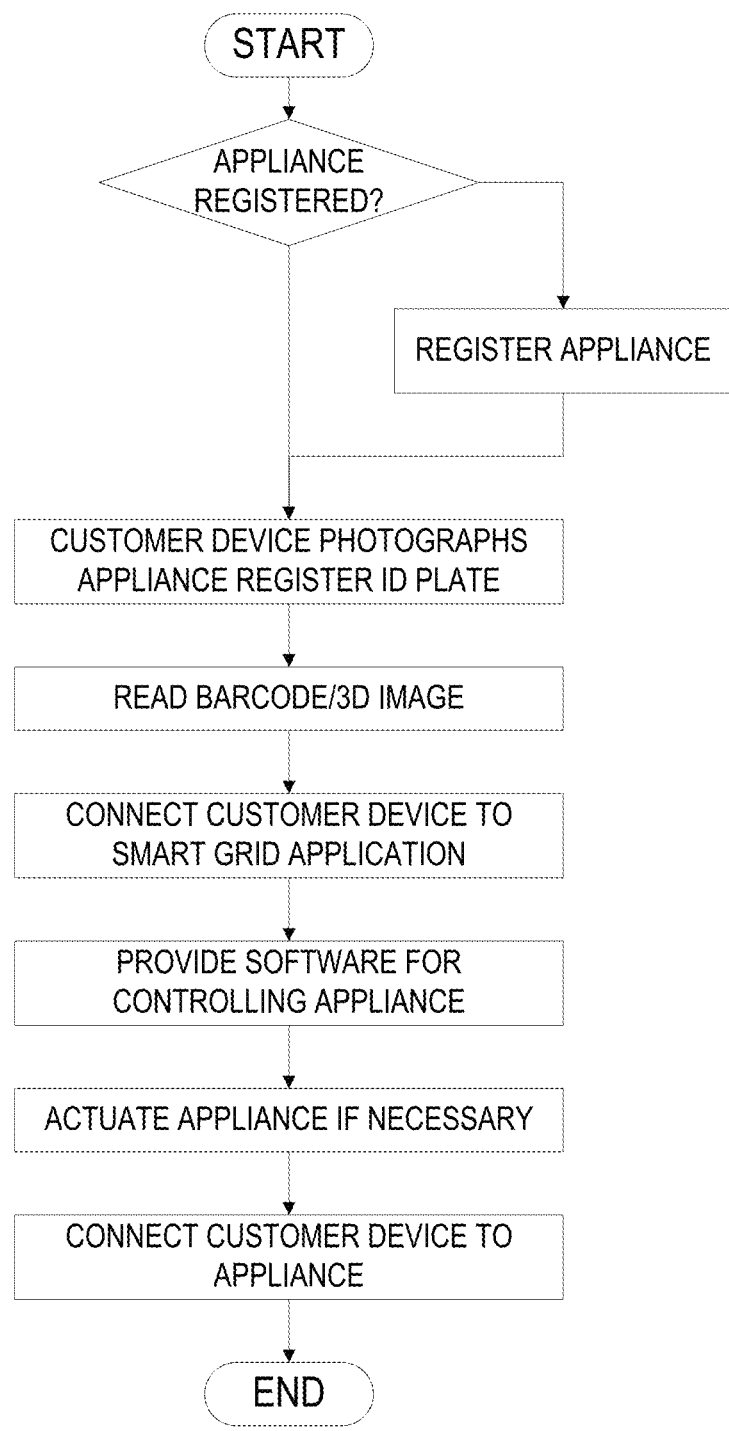
FIG. 24 is a flowchart illustrating a method of connecting a consumer device to an appliance in accordance with one or more preferred embodiments or implementations of the present invention.

FIG. 24 is a flowchart illustrating a method of connecting a consumer device to an appliance in accordance with one or more preferred embodiments or implementations of the present invention. As shown therein, it is first determined whether the appliance has been registered with a corresponding smart grid application. The appliance is preferably pre-registered at the factory, but if not, or if some condition occurs requiring re-registration, then a registration step is carried out.

Figure 25:
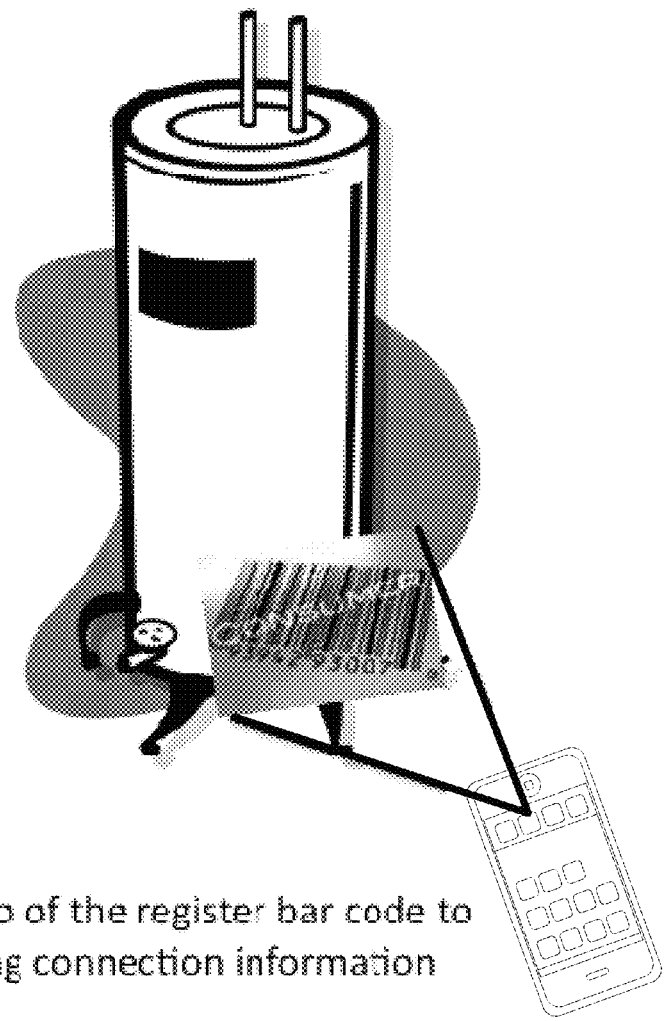
FIG. 25 is a schematic illustration of a step of photographing, imaging or otherwise reading the ID plate of an appliance as part of the method of FIG. 24.

Next, using a device such as a smartphone, the consumer takes a photograph or otherwise reads or images an ID plate on or accompanying the appliance. FIG. 25 is a schematic illustration of a step of photographing, imaging or otherwise reading the ID plate of an appliance as part of the method of FIG. 24. The register ID, which may be in the form of a barcode, may be used to look up the necessary networking information. Software may be used to read the barcode or 3D image and to connect the consumer device to the smart grid application. In some implementations, the smart grid application provides software to the consumer device to control the appliance. In some implementations, software may also or alternatively be provided by the appliance itself. It may also be necessary for a button or other input on the appliance to be pushed or otherwise actuated to ready the appliance for connection and communications. Finally, the consumer device is connected directly to the appliance. The secure direct connection enables the consumer to safely access and communicate with the appliance.

Social Media Implementations

Social networking websites, like Facebook and Twitter, have become some of the most prevalent sites used worldwide. However, such sites use server farms having large numbers of servers to store their information and data for their users. This causes high costs due to traffic, high energy costs and the need for more servers. This topology also suffers from problems such as slow connections because of the simultaneous access of information at the server farms, which can temporarily shut down the system and accounts for much of the delay in loading websites from the Internet. Even worse, server farms may be shut down entirely under denial of service attacks making the application unavailable to users altogether.

Figure 26:
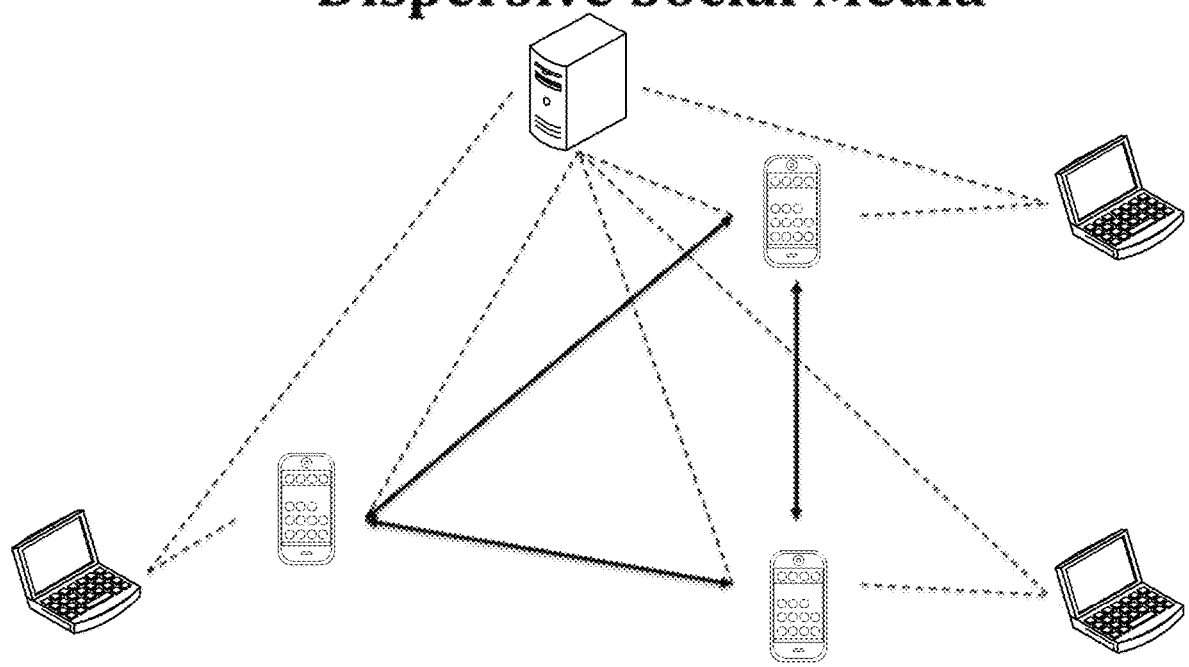
FIG. 26 is a block diagram of representing the use and management of social media in accordance with one or more preferred embodiments or implementations of the present invention.

FIG. 26 is a block diagram representing the use and management of social media in accordance with one or more preferred embodiments or implementations of the present invention. Rather than store and service all social media user data primarily from the servers, such data is instead stored and managed by the user devices, which only requires minimal involvement from the server. Thus, the use of servers is generally eliminated except for their use managing presence and in backing up information on the client's profile.

In operation, a user device having social media data first contacts a server, sometimes referred to as a "presence" server, to see who is available to add as a friend. The user sends an invitation message to one or more chosen "friends" (client targets) via the presence server. In some implementations, such invitation messages may alternatively or additionally be sent via another device in the network, since a client can be a presence server as well. The presence server forwards the message to the targeted client along with the networking information on how to communicate with the initiating client. If the initiating client is offline, the networking information will be sent to the client when it comes back online. The clients will communicate when both are online. Subsequent communication then generally takes place directly between peer devices. In this regard, it will be appreciated that VDR may preferably be used to facilitate such connection and communication.

Once linked to one or more friends (fellow users), each user hosts his own social media content on his own computer, smartphone, or other user device. An application on the device is utilized to control which social content is sent to which friend and when. In at least some implementations, the content may be provided in the form of a web page personalized for each friend. As more and more devices begin operating in this way, a paradigm shift will occur where the client is in an "always on" scenario and the feature where "friend" devices are updated will be required less often. Ultimately, hosting the social media content in this way enables the user to have full control over their information provided on the page, provides a useful interface to communicate with others and provides a means for sharing information and other media with friends.

The functionality described herein may be implemented using VDR, and preferably through the use of clients that utilize virtual machines. In particular, the clients may be "virtual thin clients" that each primarily include, in addition to a virtual machine, a signaling mechanism and other networking features. Thin virtual machines and clients making use of thin virtual machines are described elsewhere herein. This technology enables local control of the firewall to enable communication to devices directly. The virtual thin client controls signaling between end user devices, which in turn enables stronger security via networking and covert exchange of information between virtual thin clients at each client. The transfer of information is more efficient since the updates goes directly to the friends and can be updated as the user comes on line.

The approach described herein includes a number of features. The capability to delete information off the pages sent to other users' devices (only from their pages of information) maintains control of the user's information. The user can transfer short messages, voice messages and video messages, set up conference calls, and utilize other media methods of communication. The users can set up alerts indicating the presence of other friends and providing information as to their activities as such activities pertain to the information put on their device and as the information is disseminated. The direct communication of the applications via the virtualized peering network enables the information to reside under the control of the users. The information can be backed up on servers and other devices that the user owns such as their mobile phone and computer (laptop, desktop and other computing devices) just as other information is currently backed up to external hard drives and others storage devices. Networked backup services like Mozy and MobileMe from Apple are examples.

Advantageously, use of VDR in this context results in the creation of a virtual peering network designed to enable local control of the user profile for the benefit of staying in touch with others. The user has complete control of their profile and what is shared with others rather than having a template and minimal control over the things that are included in their profile in a server-centric network. The application would allow people to talk, message, conference, stream media, and the like. Such an approach may be infinitely scalable since the resources to add a user's device are provided by the user device, results in dispersive update of users by friends and by the users themselves, and provides the ability to spread information across multiple devices.

Improved Telecommunications Implementations

Telecommunications carriers are rolling out more and more data driven devices. The heavy load of data is causing major congestion on their back-end networks. One important way to minimize this heavy load is to minimize the traffic that is directed around the network. In a switch environment, resources are dedicated to sending traffic throughout the network, and the number of connections that can be made is limited by the size of the switch.

Figure 27:
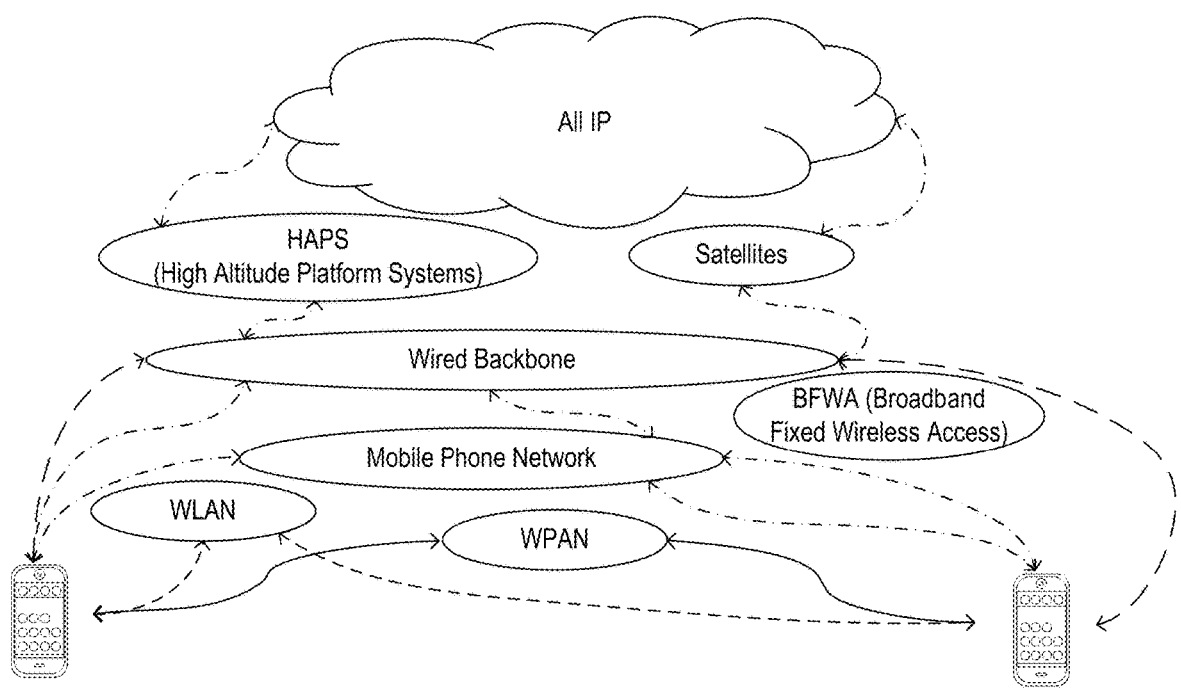
FIG. 27 is a block diagram representing a telecommunications topology for improving efficiency in accordance with one or more preferred embodiments or implementations of the present invention.

In one or more implementations, direct connections between end-user devices (such as phones and smartphones) having virtualized routing capabilities are utilized in context of improving the efficiency of the backbone of a telecommunications network. FIG. 27 is a block diagram representing a telecommunications topology for improving efficiency in accordance with one or more preferred embodiments or implementations of the present invention. With reference thereto, an application using VDR can be used to improve the efficiency of the backbone of a network by controlling the flow of packets over the resources of the network. In cases where the communication is local, a server, sometimes referred to as a "presence" server, can detect that the devices are located together by determining that the external IP address for the devices is the same and providing the internal IP addresses to the clients. The VMs (virtual machines) message over to the device to determine the connection quality and determine the ability of the network to support the required services. Network services are queried by the client's VM to determine its ability to connect to the network in other ways. Examples of other possibilities include WPAN (such as Bluetooth, Ultra-wide Band, and the like) and WLAN (such as WiFi, both local and municipal, and the like).

Connections shown in FIG. 27 include a direct connection through a WPAN and/or the WLAN directly to the other device. These connections would virtually eliminate all traffic over the carrier backbone, thereby reducing network traffic and enabling the clients (i.e. mobile phones) to connect directly via the base station. An important aspect of using these networks is to use the client to determine the accessibility of the networks and to supply connection information to the presence server and "friend" clients. The passage of the information enables the clients to connect, leveraging local client resources such as Bluetooth and WiFi without significantly using the carrier resources. Messaging between the VMs will still be used to maintain QoS (Quality of Service) for the user's application.

Servers and other clients are used to force network communications to be carried out in ways that will be advantageous to the carrier. By using the SWRT (SoftWare RouTer) and other routing protocols such as OSPF (Optimum Shortest Path First), the use of a particular network enables a switching of physical hardware, thereby enabling traffic to be dynamically diverted to other networks at the carrier's disposal. Network watermark, described elsewhere herein and in any material incorporated herein by reference, may be utilized to monitor the connections and to ensure that path was used and may further be kept for historical records. The choice of network can be driven via economics, loading, efficiency, and the like.

In some implementations, peer-to-peer communications are used for efficiency of connections. In some implementations, virtualization is used to provide security for communications, including protection against hacking, protection against man-in-the-middle attacks, and the use of a single encryption key.

Advantageously, use of VDR in this context would reduce traffic in the network in a variety of ways. The single encryption key doubles throughput for secure communications. Direct IP connections enable direct communication over the base station for local/short distance calls. Internet oriented equipment and control QoS may be leveraged, and LANs and PANs may be leveraged to minimize traffic over the backbone. In at least some implementations, only presence traffic is sent over the network. The use of multiple connections enables efficient release of resources. Furthermore, these improvements are maintained as the network is scaled (and hardware added with each new device), in that the control of traffic at the client means that congestion issues are dramatically reduced.

Gaming Implementations

In one or more preferred implementations, direct connections between end-user devices having virtualized routing capabilities are utilized in a gaming context, such as, for example, in a massively multiplayer online role playing game (MMORPG) application.

It will be appreciated that traditional MMORPGs handle the majority of processing for a game world-wide at conventional servers. In a preferred implementation, some of this processing work is offloaded to end-user devices having virtualized routing capabilities. For example, each end-user device preferably functions as a server for serving an avatar associated with a user to other end-user devices whose users are disposed, in the game world, in close proximity. In this way, the processing associated with such avatars is largely offloaded from the server.

This offloading, and other similar offloading, reduces the resources required by an MMORPG server. Notably, however, although the end-user devices assume some functionality more traditionally assumed by a conventional server in MMORPG applications, a control server is preferably still used to oversee the establishment and monitor connections between end-user devices.

The control server preferably provides authentication and security functionality. Preferably, the control server keeps track of a unique identification of each end-user device, software loaded on each end-user device, and an IP address of each end-user device. Additionally, the control server preferably controls what actions each client can take.

Each end-user device preferably continually provides information to the control server, including: a status of the end-user device, whether the end-user device has lost its connection, an application status, application data, whether software at the end-user device has been tampered with, a rate of one or more communication links, a packet error rate of one or more communication links, a game state, a character state, and coordinates of the character's location in the game world.

It will be appreciated that voice conferencing can be an important part of the massive multiplayer experience, and, in accordance with one or more preferred embodiments, functionality and implementation similar to that outlined in an audio conferencing context is utilized in a massively multiplayer gaming context as well.

Notably, in such implementations, a client both receives information from other clients, for example in the form of avatar information, and additionally receives information from a content server, which may also comprise control server functionality.

Retail Transaction Implementations

When a customer purchases a product from a bricks-and-mortar store, the transaction passes through a multitude of middlemen before it finally reaches or is processed by the customer's bank. This is also true for the retailer and merchant. As a result, the customer's payment takes much longer to appear in the merchant's bank when a transaction is made in or from the store. Furthermore, the use of middlemen inevitably adds cost to the transaction and reduces overall security.

Figure 28:
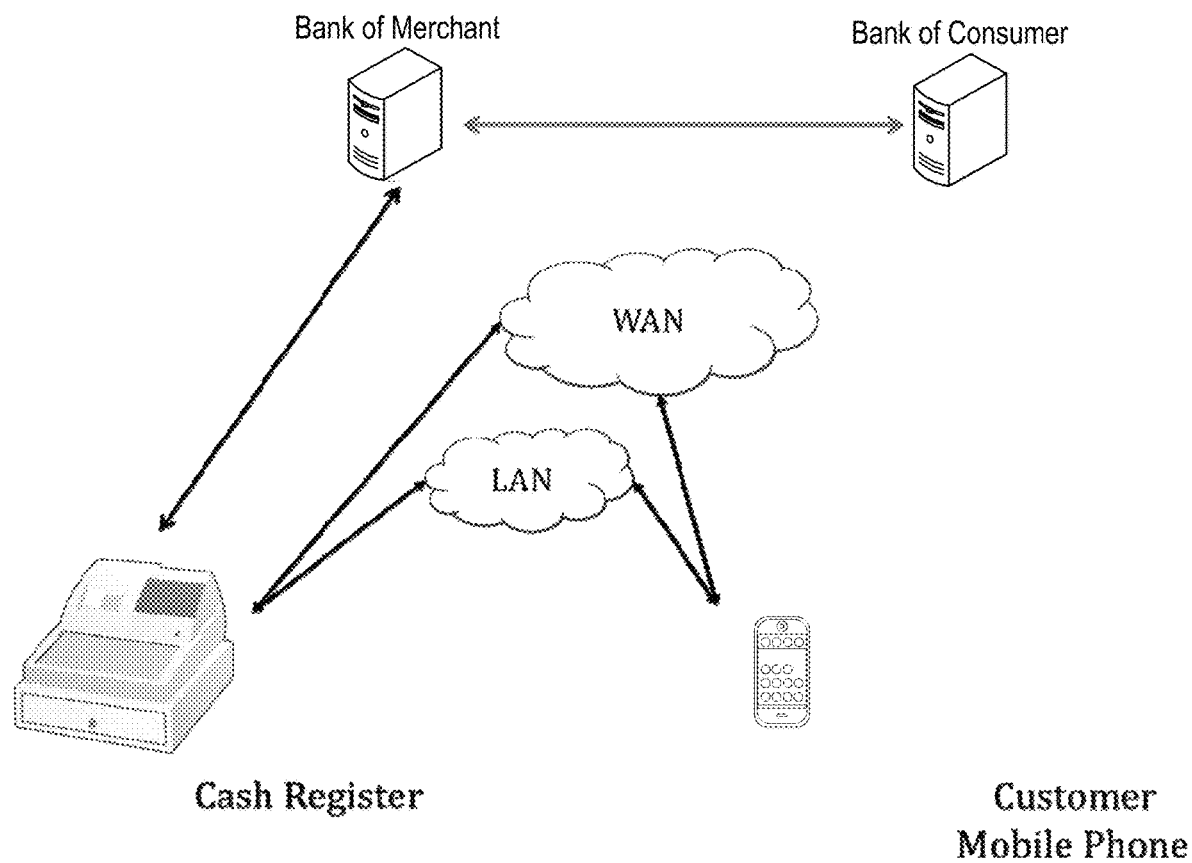
FIG. 28 is a block diagram representing a retail transaction in accordance with one or more preferred embodiments or implementations of the present invention.
Figure 29:
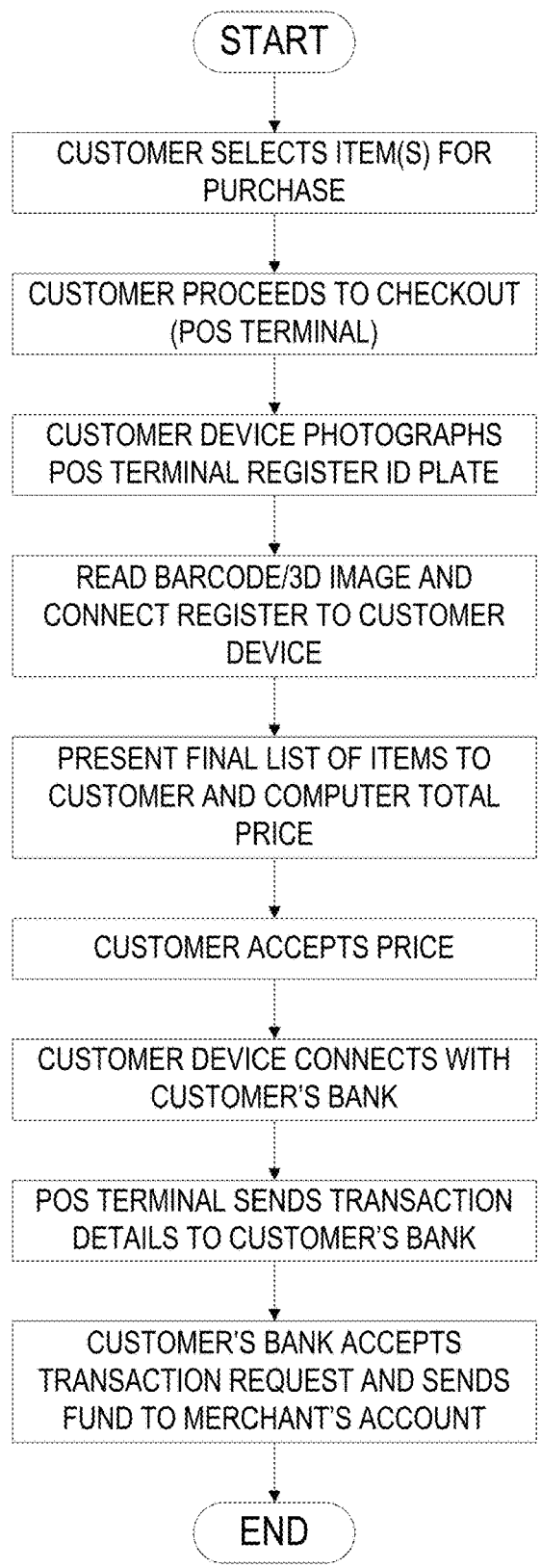
FIG. 29 is a flowchart illustrating steps of the retail transaction represented in FIG. 28.
Figure 30:
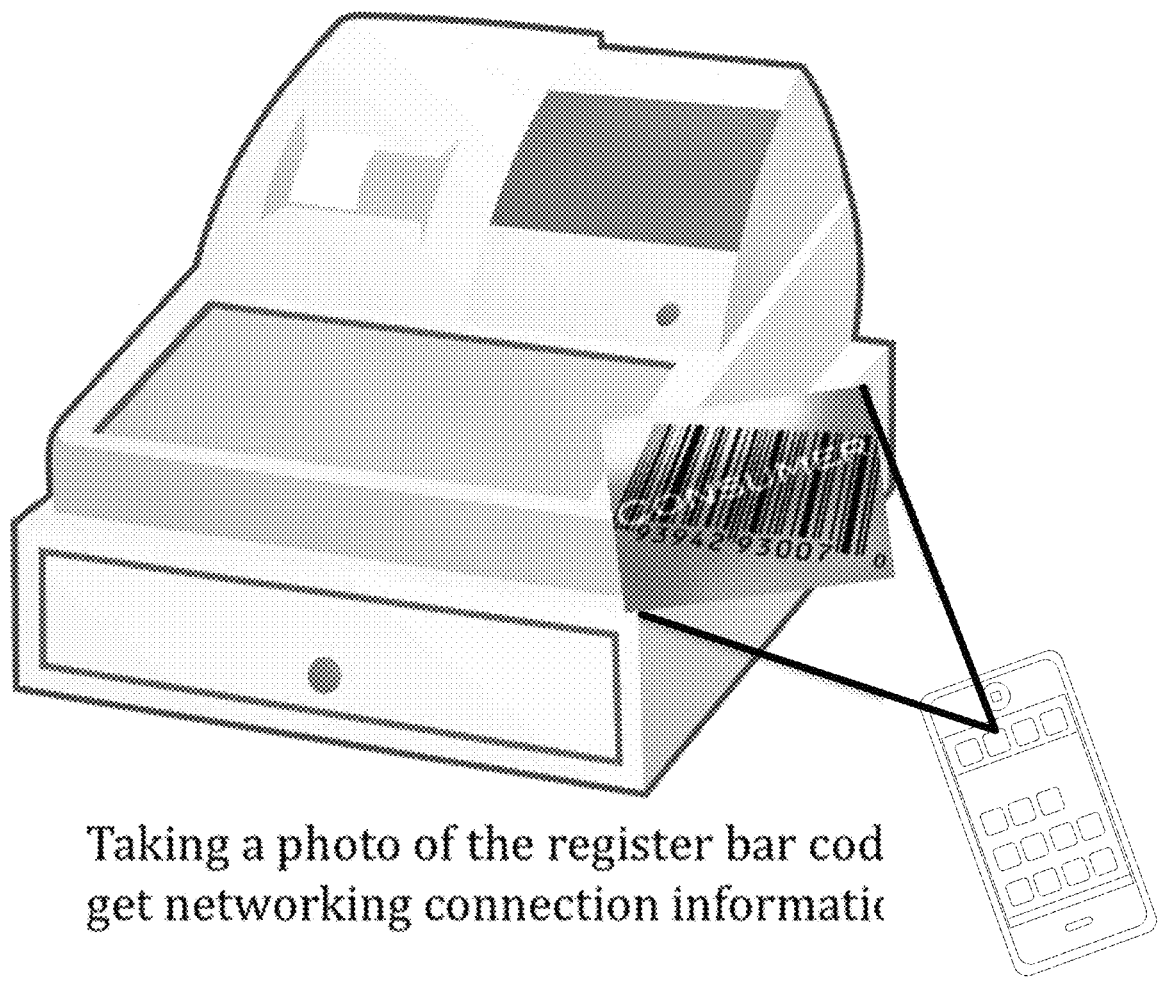
FIG. 30 is a schematic illustration of a step of photographing, imaging or otherwise reading a POS terminal ID plate.

In one or more implementations, direct connections between end-user devices having virtualized routing capabilities are utilized in a financial transaction context, such as, for example, in a retail transaction. FIG. 28 is a block diagram representing a retail transaction in accordance with one or more preferred embodiments or implementations of the present invention, and FIG. 29 is a flowchart illustrating steps of the retail transaction represented in FIG. 28. As shown therein, a customer visits the store and selects one or more items for purchase. When all items are selected, the customer proceeds to the checkout area, where a register or other point of sale (POS) terminal is located. Using a device such as a smartphone, the customer takes a photograph or otherwise reads or images an ID plate on or accompanying the POS terminal. FIG. 30 is a schematic illustration of a step of photographing, imaging or otherwise reading the POS terminal ID plate. The register ID, which may be in the form of a barcode, may be used to look up the necessary networking information. Software may be used to read the barcode or 3D image and thereby connect the POS terminal directly to the customer device. It will be appreciated that VDR may preferably be used to facilitate such connection and communication.

With the connection between POS terminal and customer device (smartphone) in place, the items being purchased are scanned or otherwise processed normally. As each item is processed, details such as the item name, price and the like may be presented to the customer via the customer device. Once all items are processed, a total proposed transaction amount (purchase price) may be presented to the customer via the customer device, preferably in conjunction with a complete list of the items being purchased. The customer signals his approval of the transaction via user input, which may include "clicking" an accept button, providing a fingerprint or other biometric information, or the like.

Once the customer has approved the transaction, the customer device connects with the customer's bank to initiate transfer of the transaction amount to the merchant. Meanwhile, the POS terminal sends details of the transaction via the network to the customer's bank. Based on the information received, the customer's bank accepts the transaction and sends the necessary funds to the merchant's account.

Advantageously, use of VDR in this context would reduce the number of middlemen through which a transaction would pass and would also allow the customer to use their smartphone as a form of payment mechanism. Furthermore, this would allow customers to have real-time price checking, via their smartphone, for the items being purchased and also gives them an electronic receipt. The data in the electronic receipt may be harvested or mined for subsequent use, such as in the customer's accounting software. The process may obviate the need for credit card companies to be involved in retail transactions because such transactions would be immediate. Removing these and other entities from the process helps lower costs, directly or indirectly benefiting both customers and merchants.

Improved security is provided in a number of ways. The process allows customers to connect directly to their account for payment, thus adding security that is lost when conventional credit cards are used. Instead of a transaction going through a credit card company, the customer device connects to either a WAN or LAN, which creates more security, especially by using a LAN. A LAN is much safer and allows a firewall to be in place for only people in that area to have access to or behind. By taking a picture of a bar code at the register of the store, the customer device can verify the IP address of the store and gains the network information necessary to make a purchase. Fingerprinting and other biometrics would also allow consumers to make transactions more safely and securely. An image of the user can be sent by the user's smartphone (communication device) with the purchase for the merchant's records. The image could be compared with an image supplied by a security camera for authentication.

Virtual Check Implementations

Although the internet has enabled many transactions to be converted from a traditional physical implementation to an electronic replication thereof, the use of internet-based checks as a payment methodology has continued to be difficult to achieve. The basic problem has been how to securely send checks via the Internet and print them with consent from the sender that it was properly received. Some of the issues that must be resolved are the possibilities of interception of a check, printing the same check more than once, copies of the check being stolen, and the commission of fraud by the receiver.

Figure 31:
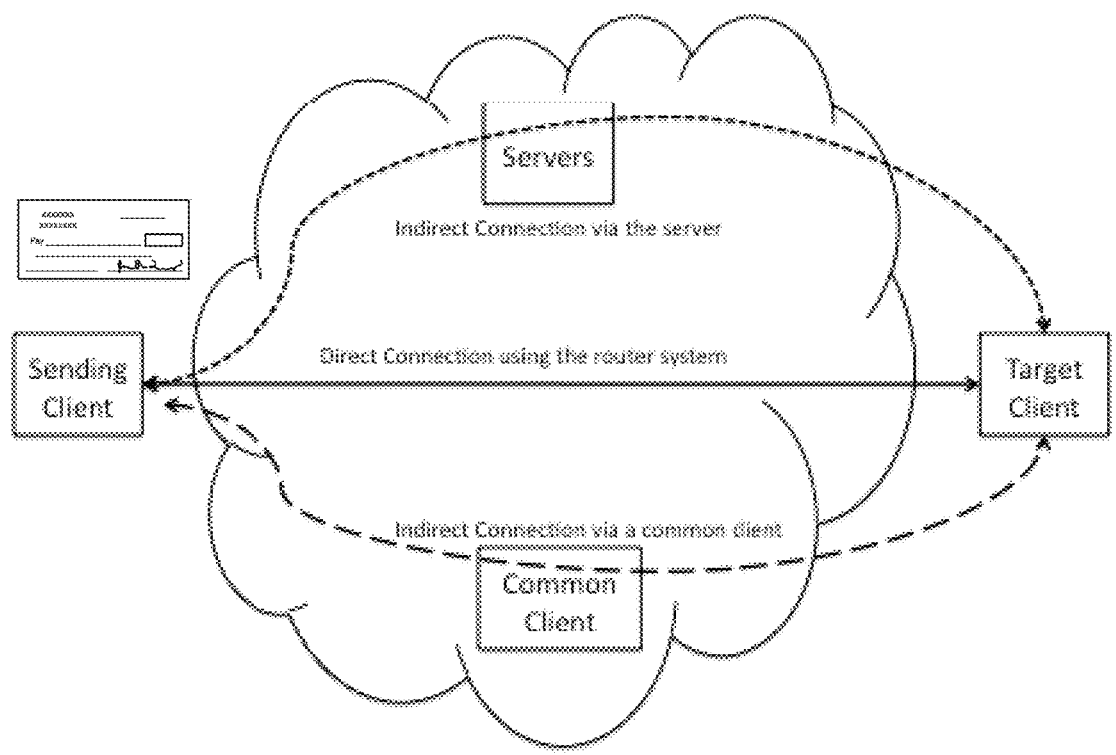
FIG. 31 is a block diagram representing the secure transfer of a check image in accordance with one or more preferred embodiments or implementations of the present invention.
Figure 32:
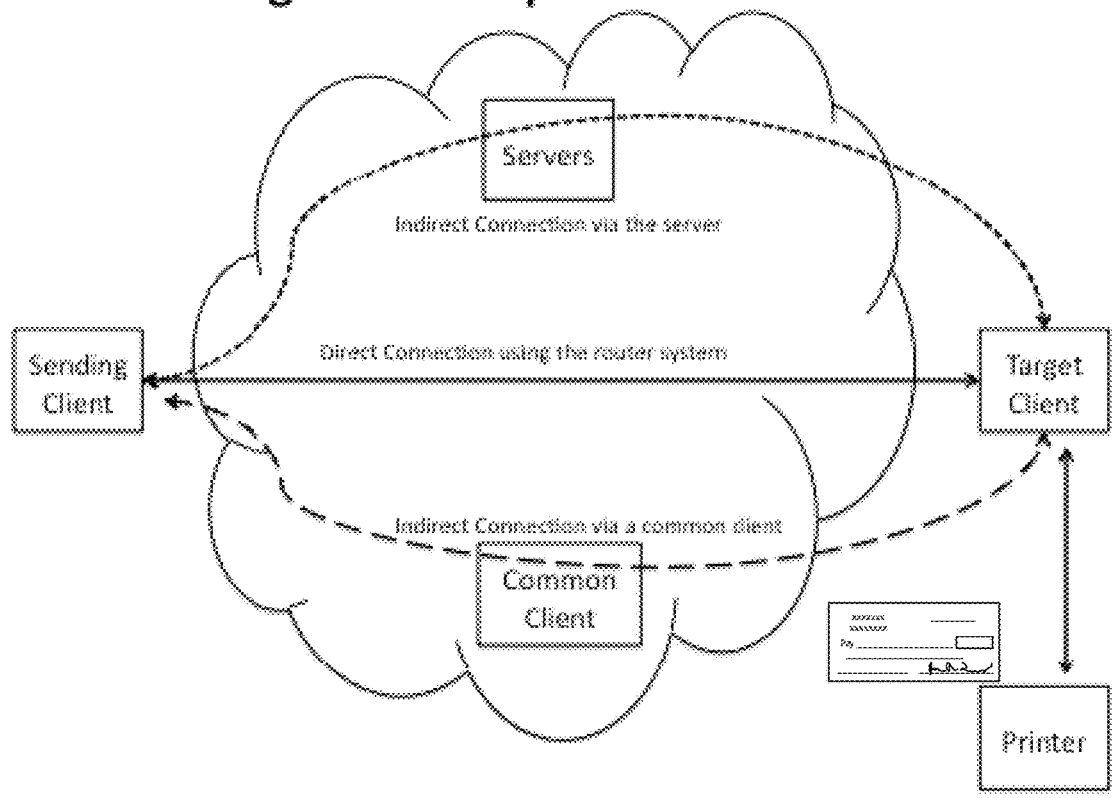
FIG. 32 is a block diagram representing the printing of a check image received using the approach of FIG. 31.

In order to achieve internet transmission of checks, there are two basic steps that must be performed: (1) a secure transfer of the check image, and (2) ensuring single secure printing. FIG. 31 is a block diagram representing the secure transfer of a check image in accordance with one or more preferred embodiments or implementations of the present invention, and FIG. 32 is a block diagram representing the printing of a check image received using the approach of FIG. 31.

In one or more implementations, direct connections between end-user devices having virtualized routing capabilities are utilized in the secure transmission of a check image that may then be printed by the recipient and cashed, deposited or otherwise used in the same way as a conventional check. To achieve the secure transmission, VDR may be used for direct peering of or connection between the sending client and the target client. First, a data file representing the check image is created. The file is preferably split into parts and transmitted over two or more, and preferably multiple, different connections. Using VDR, the clients agree on the transmission paths for the check file and it breakup between multiple connections. As shown in FIG. 31, connections may include direct connections between the two devices, indirect connections via a server, and indirect connections via a common client.

Breaking the check image into multiple parts and sending them separately provides considerable security. Additional security may be provided through the use of a network watermark, described elsewhere herein and in any material incorporated herein by reference, which may be based on transmission, timing and the like and embedded in the check image or parts of the check image file. Still greater security, encryption keys can be embedded in the virtual check.

Once the entire virtual check file has been received by the target client, the check may be printed. At this point, VDR may again be used for direct peering of or connection between the two clients. A direct network connection is made again between the target and sending Client. Confirmation of the printing is sent from the target client to the sending client, and once again a network watermark may be utilized. Once the virtual check printing confirmation has been received, the sending client combines the network watermark from the confirmation with the network watermark from sending the check, thereby disabling the printing of other checks from the image.

It will be appreciated that copy fraud remains a possibility, but the target client would have to perpetrate the act or a compromise of the target client's hardware would be required. Other commonly used practices such as special paper and watermarks can be used to combat these issues.

Personal Private Networking Implementations

Figure 33:
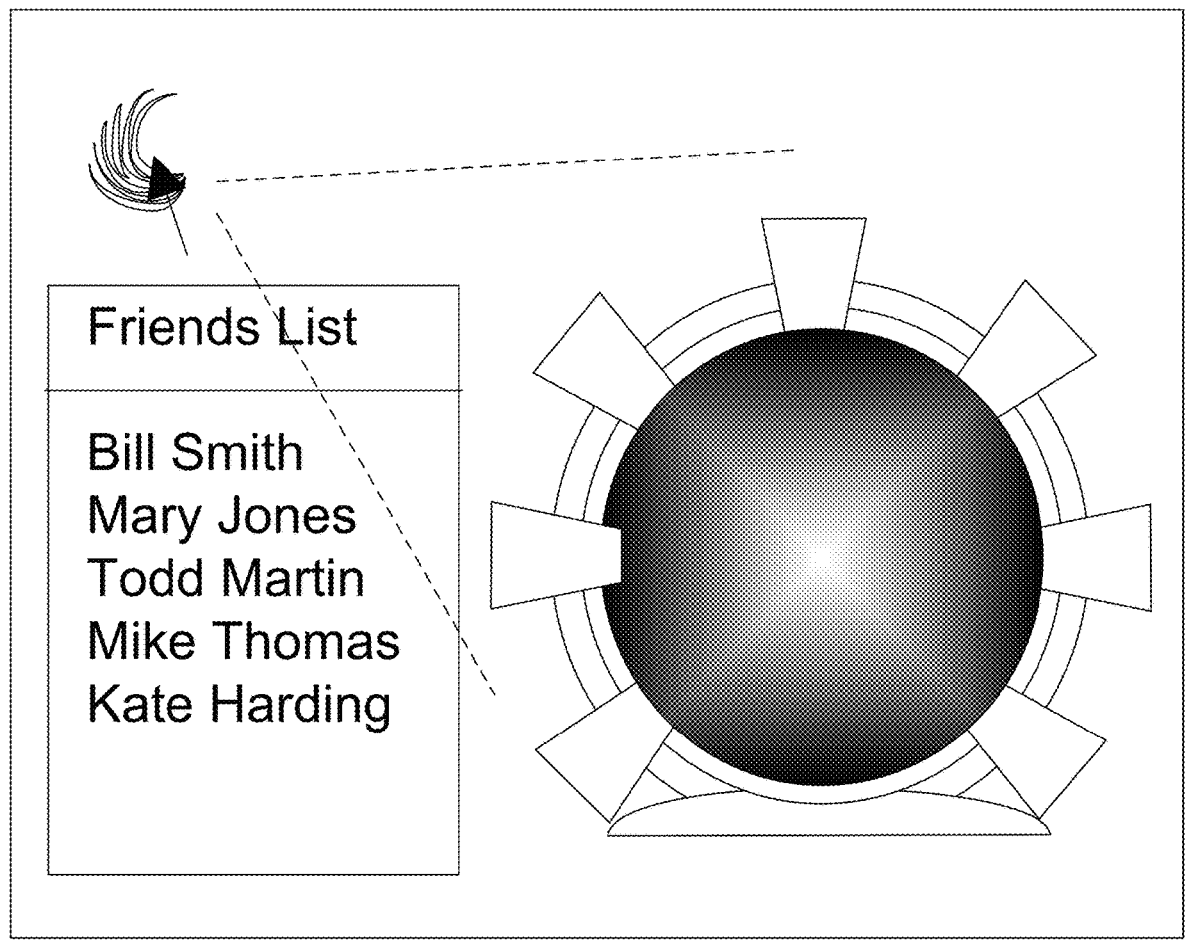
FIG. 33 illustrates a user interface for an exemplary file sharing application in accordance with a preferred implementation.

As described above, in one or more preferred implementations, a file sharing application utilizes virtual dispersive routing to effect file transfers. FIG. 33 illustrates a user interface for an exemplary file sharing application in accordance with a preferred implementation.

Preferably, a user will be able to maintain a "buddy list", or "Friends List" which represents a contact list for purposes of virtual dispersive routing methodologies as described hereinabove. A user interface preferably allows a user to add or delete friends/buddies/contacts from their contact list.

In some preferred implementations, to initiate a transfer, a user clicks on an application icon to open the user's contact list and a "Sharzing" window. In an exemplary implementation, bold texted names identify on-line contacts, while grey texted names indicate off-line contacts. When the blades of the graphical connection representation on the right side of the widow, i.e. the Sharzing, are shut, the Sharzing is inactive. Clicking on an on-line contact opens the blades and establishes a Sharzing connection. The user may then "drag and drop" a file onto the open Sharzing.

Once a Sharzing connection is established, multiple files can be transferred in either direction. Further, multiple Sharzings can be opened simultaneously to different users. Preferably, when a Sharzing is connected, wallpaper of the opposite PC that is being connected to is displayed. As a file is "dragged and dropped" on the Sharzing, the Sharzing displays the progress of the file transfer. Using a Sharzing skin, a Sharzing depiction can take on identities such as, for example, a futuristic StarGate motif. In the case where such a StarGate motif is used, flash wormhole turbulence may begin when a file is placed in the Sharzing, and, subsequently, an opening at the end of the wormhole may emerge to display an image of the file and/or the recipient's desktop wallpaper. Preferably, when the transferred file is visible on the destination desktop, the transfer is complete. The animation or video that plays during transfer of a file can be characterized as a "Zinger", and preferably is user configurable. In a preferred implementation, users can design their own Zingers, and make them available to an entity associated with the file sharing application, and/or to other users of the file sharing application. In at least some preferred implementation, an artist who submits such a custom Zinger may receive some compensation, e.g. fifty percent of revenue from sales of the submitted custom Zinger.

In one or more preferred implementations, encryption, such as, for example, public key encryption, is utilized to provide security for file transfers. In some preferred implementations, encryption is utilized based on a public key hidden in an image in accordance with technology disclosed in USPA Pub. No. 2008/0175377, which publication is hereby incorporated herein by reference.

For example, in a preferred implementation, a user might send a visual business card, and then share files utilizing a public key hidden in an image of the business card.

Virtual dispersive routing can be utilized for other personal private networking outside of a file sharing context as well. In one or more preferred implementations, an audio and video conferencing application utilizes virtual dispersive routing to establish direct connections between clients.

It will be appreciated that in traditional audio and video conferencing applications, one or more conventional servers act to collate and process audio and video streams from a plurality of clients, and then distribute the processed audio and video streams to the clients. By way of contrast, in a preferred implementation, an end-user device can instead establish a direct connection with another end-user device, and communicate audio and video directly to the other end-user device, rather than communicating through a conventional server. In such implementations, this transmitted audio and video can be directly processed by either a communicating end-user device, a receiving end-user device, or both, rather than by a conventional server.

As described above, via the use of virtualization, a first end-user device can establish a direct connection with not just one other end-user device, but with multiple other end-user devices. The first end-user device provides each other end-user device with its video and audio stream, thus effectively acting as a server by "serving" its video and audio stream to each other end-user device. Each of the other end-user devices involved in a video conference will receive such video and audio streams served by this first end-user device; however, each other end-user device will additionally serve its own video and audio streams.

In one or more preferred implementations, a user applications provides both file sharing and audio and video conferencing functionality.

Storage Area Networking Implementations

A storage area network (SAN) is a network created to interconnect one or more data storage devices, e.g. different forms of data storage devices, with one or more servers. In a conventional implementation of a SAN, cloud-based storage and processing are utilized. However, the use of such cloud-based storage and processing can present significant security and information fidelity issues. For example, data to be transferred may not transfer due to an error with a server or a storage device, or a hacker may attempt to break in through a public access point, such as a website. Further, breaches may occur when employees are careless or malicious, thereby allowing data to be copied or stolen from a database, or, perhaps worse, allowing data to be changed, or other actions taken that may case additional harm. Further still, sometimes a storage area network may fail to transfer files because only one route is available, which can increase risk if communications are attempted multiple times. Encryption is sometimes utilized to protect data in a SAN, but, given enough processing power, such encryption alone may not be enough.

Thus, storing information in a network, such as in cloud storage, is subject to theft and hacking, both where information is stored and as it is being transferred over the network.

In one or more preferred implementations, virtual dispersive routing technology is utilized in a storage context to form a dispersive SAN.

In preferred implementations, data is dispersed by being distributed to, and stored at, a plurality of devices. Preferably, virtual dispersive routing is utilized to effect such dispersed distribution of data. For example, data may be dispersed, via virtual dispersive routing, from a mobile phone and stored at a laptop, a desktop, another mobile phone, and a server. Thus, data may be distributed to multiple, physically separate places. Hacking such data at its place of storage would thus require hackers to hack multiple different devices at multiple, different sites to gather all of the data.

Similarly, as the data is distributed utilizing virtual dispersive routing, multiple routes would have to be hacked to gather all of the data. Further, the security functionality of virtual dispersive routing described herein would render hacking of transferred data more difficult.

Figure 34:
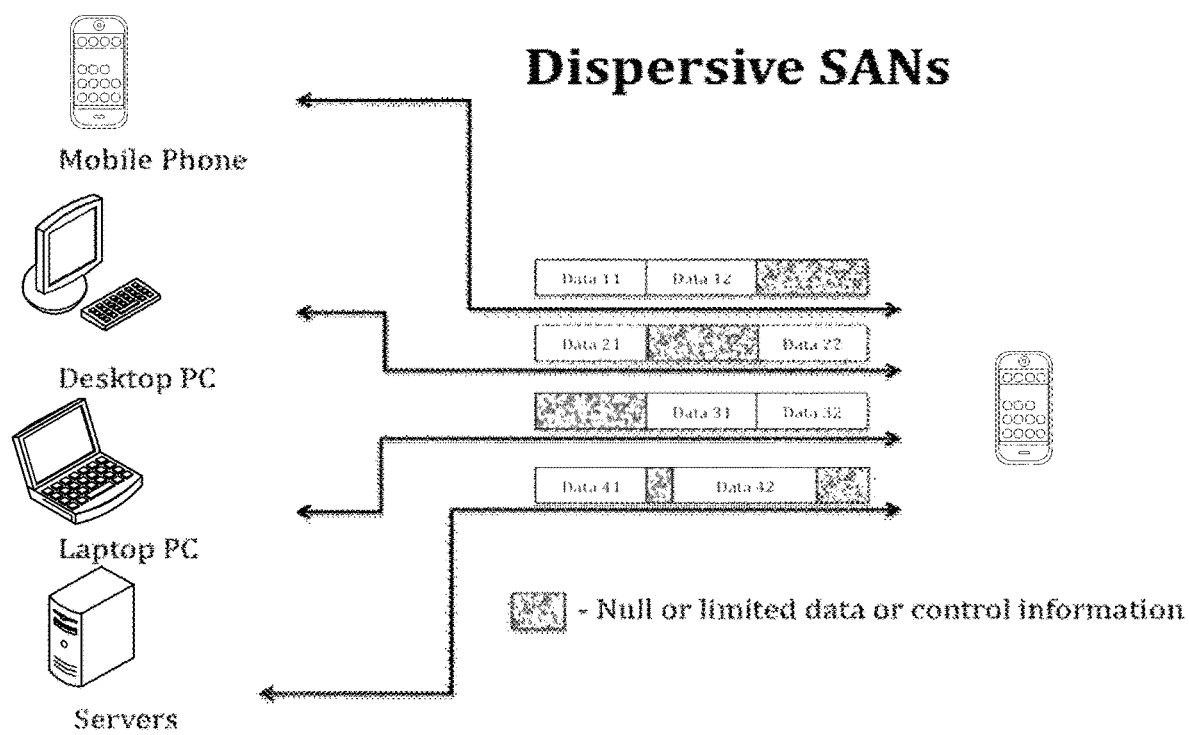

With respect to accessing data, a device accessing data preferably receives a plurality of data streams from each of the devices any portion of the data is stored on, as illustrated in FIG. 34. As illustrated in the figure, a device can receive a data stream from any device it is able to communicate with, e.g. using virtual dispersive routing. Such communications could occur over, for example, a public network, a private network, a wireless personal area network (WPAN), or a wireless local area network (WLAN). Preferably, the gaps between packets are controlled by virtual machine messaging so that timing of packets can be used as another mechanism to determine hacking, rerouting and other network attack techniques. Similarly, the sequence of data from each source and size of data transmitted is controlled by virtual machines, and by streaming data simultaneously from multiple sites, hacking can be further frustrated. By placing a signal on either side of a connection, virtual machines can signal to each other which route is the fastest and stripe data to be encoded across multiple sites. Further, direct connection between devices enables more efficient communications (e.g. with less overhead) and faster communications, and further obviates the need for authentication and data transfer via a server, unless an application specifies the use of a server.

In dividing storage of data across multiple devices, in at least some implementations some storage overlap may be utilized in that some, or all, portions of data may be stored at multiple devices, so that if one device is offline such data may still be accessible from another device. Preferably, decisions on whether to send data can be directed by a client based on the presence of devices available to participate in an information transfer. Preferably, virtual machine messaging is utilized to keep track of communications to ensure quality of service and the ability to abstract networking from an application.

In at least some preferred implementations, remote storage devices are utilized for storage in a manner similar to how hard drives might be utilized in a redundant array of independent disks (RAID). Such remote storage devices might be utilized in a manner akin to any standard level of RAID, or even more exotic flavors of RAID, and even in a manner akin to nested RAID.

Medical Implementations

In one or more preferred implementations, virtual dispersive routing technology is utilized in a medical context to provide access to medical records and data.

As described hereinabove, virtual dispersive routing can be utilized to form dispersive storage area networks (SANs). In a preferred implementation, such dispersive SANs are utilized in a medical context to provide access to medical records stored at disparate dispersed locations.

For example, several hospitals (and doctor's offices, etc.) in a region may each have their own servers with medical records, and other data, stored thereon. In a preferred implementation, users would be able to access medical records stored at any hospital's server via virtual dispersive routing. Further, in at least some preferred implementations, medical records may be segmented and dispersed to multiple physical servers, or devices, for enhanced security or redundancy, as described hereinabove with reference to dispersive SANs.

Preferably, such a system allows for the sharing of medical information while retaining storage of the information at its current location, e.g. a doctor's office storing patient records would not have to cede storage of such patient records to a central server or database just to ensure available access thereto by other users. Thus, as data can remain stored where it currently is, in some preferred implementations, no additional server or database infrastructure is needed to consolidate medical records or data.

Procurement Platform Implementations

Procurement platforms enable people to electronically purchase items and services over the web. Traditional procurement platforms provide a place for viewing the items being auctioned or sold, a method for choosing and purchasing items, a method of accepting payments, and a feedback mechanism to assess the reputation of the for subsequent review and consideration by future buyers and sellers. A more recent type of procurement platform uses an approach often referred to as a "reverse auction," where sellers can compete for sales by bidding on buyer requests for products or services, but otherwise provides functionality that may be similar to traditional platforms. Regardless of their type, conventional procurement platforms suffer from a number of drawbacks including, a need for large numbers of servers, the need for intermediaries to carry out the transfer of funds between buyers and sellers, the exposure of personal financial data and other data and the security risks posed thereby, and the like.

Figure 35:
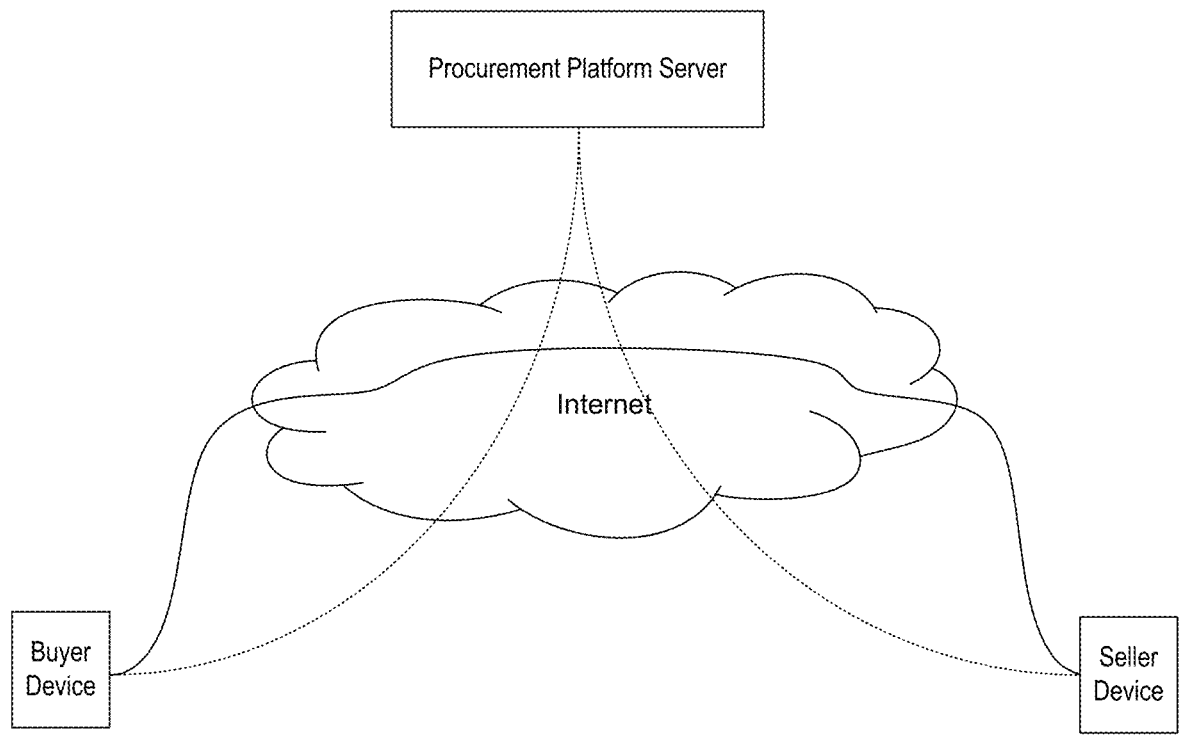
FIG. 35 is a block diagram of a client-centric procurement platform in accordance with one or more preferred embodiments or implementations of the present invention.

In one or more implementations, direct internet connections between buyer and seller devices having virtualized routing capabilities are utilized in a procurement platform context. FIG. 35 is a block diagram of a client-centric procurement platform in accordance with one or more preferred embodiments or implementations of the present invention. Use of VDR provides a secure platform for interaction between clients, thereby enabling the buyer and seller to communicate directly with each other's device without the need for servers. The list of goods may be maintained and controlled at the user's device, rather than at the server, thereby enabling, "up to the minute" notification to be provided to both buyer and seller.

In some implementations, payment may be accomplished using a virtual check as described elsewhere herein. Alternatively or in addition, in some implementations, a confirmation of sale step or process could use the direct connection between buyer and seller to trigger transfer of payment to a trusted third party to be held until the purchased goods or services are received and/or approved.

In some implementations, the platform provides several interfaces that could be handled at the seller device (for example, computer, mobile phone, and the like).

In some implementations, the items for sale may be offered on the client device either in conjunction with or without server involvement. Server involvement may provide, for example, additional payment options, off-line services, or the like.

Search Engine Implementations

In one or more preferred implementations, virtual dispersive routing is utilized to provide access to a web page, or pages, hosted by one or more user devices. For a device that is configured to utilize virtual dispersive routing, virtual dispersive routing can be utilized to establish one or more direct connections to transfer web page information to the device. For a device that is not configured to utilize virtual dispersive routing, a direct connection can be provided via an application server using a software router as described hereinabove. Alternatively, in at least some implementations, a browser plug-in could be downloaded and utilized to allow for the provision of optimal service.

Notably, search engines are often utilized to allow a user to locate web pages relevant to a particular query, and websites served via virtual dispersive routing may provide issues for conventional search engines.

Conventionally, to archive information on millions of web pages, a search engine employs special software called "spiders" (not to be confused with spiders comprising a connective link between an upper level and a lower level of a protocol stack as described herein) that build lists of words found on web sites, and pages within sites. These spiders usually start with the most popular servers and information rich pages. The spiders will traverse a site, following every link found within the site, and index information found within the site and encode it so that it can be stored efficiently at search engine servers.

Devices configured to communicate directly with one another via virtual dispersive routing can be characterized as forming a dispersive network. Such a dispersive network is challenging for a conventional search engine to access because, rather than having a server to query on a regular basis, information on clients may be behind firewalls, clients may have personal and private information that must be separated and protected, access to a client is preferably minimized so that the client is not impacted, and the access process must be very fast.

In a preferred implementation, public and private data of a client is separated via use of two or more virtual machines, one or more for public data, and one or more for private data. The use of separate virtual machines provides connection separation that makes it difficult for a hacker to access private information via a connection to a virtual machine hosting public data. Preferably, a virtual machine monitors fidelity of code and a level of security to insure that corruption has not occurred via a network or through a virus that was attacking directly on the device.

Figure 36:
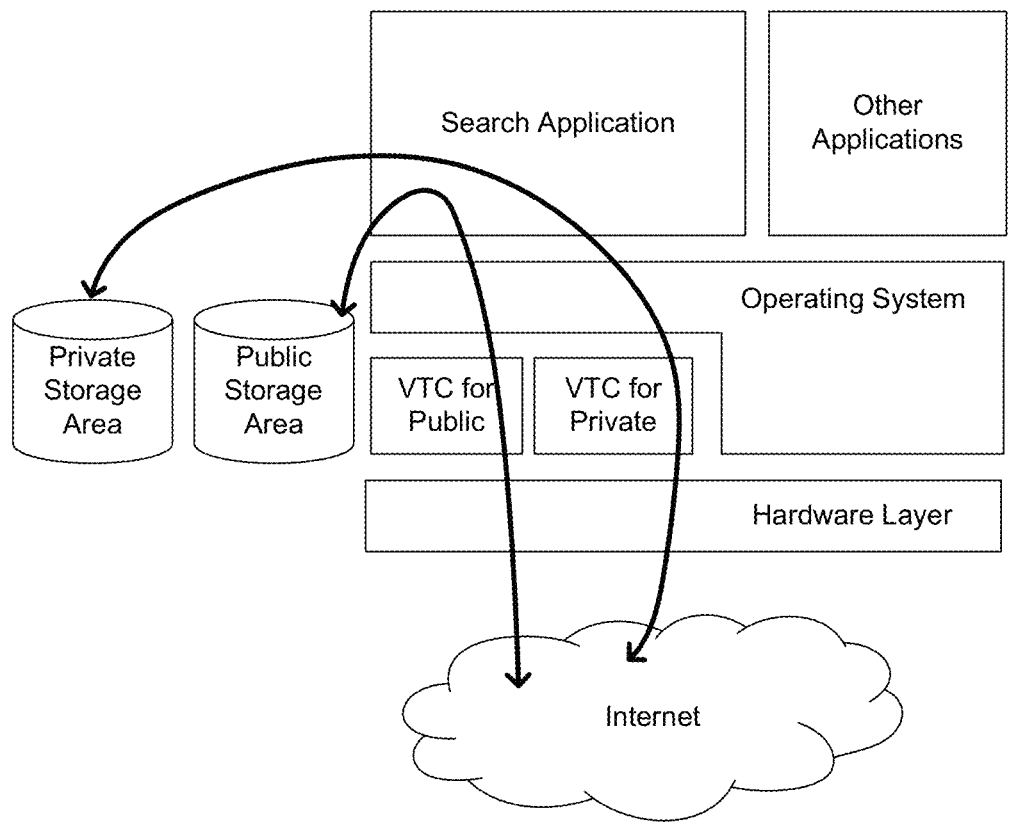
FIG. 36 is a block diagram representing search engine topology in accordance with one or more preferred embodiments or implementations of the present invention.

In one or more preferred implementations, a search application is utilized which is similar to a search engine spider in that it gathers information from content provided by a client so that the data can be sent to search engines such as, for example, Google and Bing. In implementations in which public and private data of a client is separated, such a search application preferably gathers data in a manner identified by a user, for example from both public and private data, as illustrated in FIG. 36, or from only public data (not illustrated). In at least some implementations, certain data can be configured to be provided to certain users, clients, devices, or groups of the same.

In at least some preferred implementations, in an always on paradigm, the client provides information in response to a query. In at least some preferred implementations, where data is accessed at a significant burden to a client or when a user wants information available when a client is not online, information can be uploaded via a connection provided by a Presence server, or IP server, to be made available to others. Thus, a user can generate, and potentially host, their own personal web page and have it be findable in a search by one or more major search engines.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method of transferring a social media file between first and second end-user devices via network communications, the social media file pertaining to a user of the first end-user device, comprising the steps of:
    (a) providing a social media application that allows users to control peer-to-peer dissemination of social media content;
    (b) maintaining, at a first end-user device having the social media application loaded thereon, social media data for a social media page of the user of the first end-user device, the social media file containing at least some of the social media data for the social media page of the user of the first end-user device;
    (c) first,
        (i) communicating by the social media application loaded on the first end-user device, to a server, network contact information of the first end-user device, and
        (ii) communicating by the social media application loaded on the second end-user device, to the server, network contact information of the second end-user device; and
    (d) thereafter, transferring the file from the first end-user device to the second end-user device by,
        (i) communicating, by the first end-user device, a request to the server to engage in a file transfer with the second end-user device by the first end-user device,
        (ii) communicating, by the server, the file transfer request received from the first end-user device,
        (iii) communicating, by the second end-user device, acceptance to the server of the request to engage in a file transfer with the first end-user device,
        (iv) communicating connection information, by the server, to the first and second end-user devices for enabling a network connection between the first and second end-user devices, and
        (v) initiating, by the first and second end-user devices, the file transfer based on the connection information received from the server.

2. The method of claim 1, wherein the social media file is a first social media file, and wherein the method further comprises transferring a second social media file from the first end-user device to a third end-user device, the second social media file also pertaining to the user but being different in content from the first social media file, the method comprising the further steps of:
    (a) first,
        (i) communicating by the first end-user device, to a server, network contact information of the first end-user device, and
        (ii) communicating by the third end-user device, to the server, network contact information of the third end-user device; and
    (b) thereafter, transferring the file from the first end-user device to the third end-user device by,
        (i) communicating, by the first end-user device, a request to the server to engage in a file transfer with the third end-user device by the first end-user device,
        (ii) communicating, by the server, the file transfer request received from the first end-user device,
        (iii) communicating, by the third end-user device, acceptance to the server of the request to engage in a file transfer with the first end-user device,
        (iv) communicating connection information, by the server, to the first and third end-user devices for enabling a network connection between the first and third end-user devices, and
        (v) initiating, by the first and third end-user devices, the file transfer based on the connection information received from the server.

3. The method of claim 2, wherein the user controls distribution and management of social media pertaining to the user, via the social media application loaded on the first end-user device, to multiple users.

4. The method of claim 1, wherein the first end user device comprises a personal computer.

5. The method of claim 1, wherein the first end user device comprises a desktop computer.

6. The method of claim 1, wherein the first end user device comprises a video game console.

7. The method of claim 1, wherein the first end user device comprises a laptop computer.

8. The method of claim 1, wherein the first end user device comprises a notebook computer.

9. The method of claim 1, wherein the first end user device comprises a mobile phone.

10. The method of claim 1, wherein the first end user device comprises a mobile electronic device.

11. The method of claim 1, wherein the second end user device comprises a personal computer.

12. The method of claim 1, wherein the second end user device comprises a desktop computer.

13. The method of claim 1, wherein the second end user device comprises a video game console.

14. The method of claim 1, wherein the second end user device comprises a laptop computer.

15. The method of claim 1, wherein the second end user device comprises a notebook computer.

16. The method of claim 1, wherein the second end user device comprises a mobile phone.

17. The method of claim 1, wherein the second end user device comprises a mobile electronic device.

18. A method of transferring social media content between first and second end-user devices via network communications, the social media content pertaining to a user of the first end-user device, comprising the steps of:
    (a) providing a social media application that allows users to control peer-to-peer dissemination of social media content;

(b) maintaining, at a first end-user device having the social media application loaded thereon, social media data for a social media page of the user of the first end-user device;

(c) communicating by the social media application loaded on the first end-user device, to a server, network contact information of the first end-user device;

(d) communicating by the social media application loaded on the second end-user device, to the server, network contact information of the second end-user device; and (b) thereafter, providing the social media page of the user of the first end-user device to a user of the second-end user device by
 (i) communicating, by the social media application loaded on the first end-user device to the server, an invitation message for the user of the second end-user device,
 (ii) communicating, by the server to the second-end user device, the invitation message received from the first end-user device, together with the network contact information for the first end-user device;
 (iii) establishing, using the network contact information communicated to the second end-user device, a network connection between the first-end user device and the second end-user device;
 (iv) communicating, from the social media application loaded on the first-end user device to the social media application loaded on the second end-user device, over the established network connection, the social media data for the social media page of the user of the first end-user device.

19. A method of transferring a social media file between first and second end-user devices via network communications, the social media file pertaining to a user of the first end-user device, comprising the steps of:

(a) providing a social media application that allows users to control peer-to-peer dissemination of social media content;

(b) maintaining, at a first end-user device having the social media application loaded thereon, social media data for a social media page of the user of the first end-user device, the social media file containing at least some of the social media data for the social media page of the user of the first end-user device;

(c) first,
 (i) communicating by the social media application loaded on the first end-user device, to a server, network contact information of the first end-user device, and
 (ii) communicating by the social media application loaded on the second end-user device, to the server, network contact information of the second end-user device; and (d) thereafter, transferring the file from the first end-user device to the second end-user device by,
 (i) communicating, by the first end-user device, a request to the server to engage in a file transfer with the second end-user device by the first end-user device,
 (ii) communicating, by the server, the file transfer request received from the first end-user device,
 (iii) communicating, by the second end-user device, acceptance to the server of the request to engage in a file transfer with the first end-user device,
 (iv) communicating connection information, by the server, to the first and second end-user devices for enabling a network connection between the first and second end-user devices,
 (v) spawning, at the first end-user device for the social media application loaded on the first device, a first virtual network connection that virtualizes network capabilities of the networking hardware of the first end-user device,
 (vi) spawning, at the second end-user device for the social media application loaded on the second device, a second virtual network connection that virtualizes network capabilities of the networking hardware of the second end-user device,
 (vii) establishing a connection between the first end-user device and the second end-user device utilizing the first and second virtual network connections,
 (viii) communicating the social media file from the first end-user device to the second end-user device over the established connection.

* * * * *